United States Patent [19]
Gates et al.

[11] Patent Number: 5,920,708
[45] Date of Patent: Jul. 6, 1999

[54] SERIAL PORT HAVING ONLY A SINGLE TERMINAL FOR INFORMATION TRANSFER TO AND FROM AN INTEGRATED CIRCUIT

[75] Inventors: Stillman F. Gates, Los Gatos; Christopher Burns, San Jose, both of Calif.

[73] Assignee: Adaptec, Inc., Milpitas, Calif.

[21] Appl. No.: 08/592,800

[22] Filed: Jan. 26, 1996

Related U.S. Application Data

[62] Division of application No. 08/482,529, Jun. 7, 1995, Pat. No. 5,826,068, which is a division of application No. 08/337,691, Nov. 9, 1994, abandoned.

[51] Int. Cl.⁶ .................................................. G06F 13/00
[52] U.S. Cl. ......................... 395/309; 395/280; 395/310; 395/822
[58] Field of Search ............................ 370/257; 395/822, 395/250, 310, 309

[56] References Cited

U.S. PATENT DOCUMENTS

| | | | |
|---|---|---|---|
| 4,438,491 | 3/1984 | Constant | 364/200 |
| 4,477,882 | 10/1984 | Schumacher et al. | 364/900 |
| 4,596,010 | 6/1986 | Beckner et al. | 370/60 |
| 4,597,077 | 6/1986 | Nelson et al. | 370/88 |
| 4,656,620 | 4/1987 | Cox | 370/58 |
| 4,811,277 | 3/1989 | May et al. | 370/94 |
| 4,955,305 | 9/1990 | Garnier et al. | 112/121.11 |
| 4,982,400 | 1/1991 | Ebersole | 370/85.15 |
| 4,984,190 | 1/1991 | Katori et al. | 364/900 |
| 5,226,040 | 7/1993 | Noble, III et al. | 370/257 |
| 5,233,350 | 8/1993 | Khim | 341/144 |
| 5,260,905 | 11/1993 | Mori | 365/230.05 |

(List continued on next page.)

FOREIGN PATENT DOCUMENTS

| | | |
|---|---|---|
| 0 619 548 | 10/1994 | European Pat. Off. . |
| 1 584 159 | 2/1981 | United Kingdom . |

OTHER PUBLICATIONS

Microsoft Press, "Computer Dictionary", Second Edition, The Comprehensive Standard for Business, School, Library, and Home, 1994, p. 285.

The TTL Data Book for Design Engineers, Second Edition, Texas Instruments Incorporated, 1981.

Data Book, Preliminary, AIC–7870 PCI Bus Master Single–Chip SCSI Host Adapter, Adaptec, pp. 1–1 through 1–8, 2–1 through 2–31, 8–1 through 8–11, Dec. 1993.

Data Book, Preliminary, AIC–7850 PCI Bus Master Single–Chip SCSI Host Adapter, Adaptec, pp. 1–3 through 1–6, 2–1 through 2–23, 8–1 through 8–11, Feb. 1994.

*Primary Examiner*—Tod R. Swann
*Assistant Examiner*—Fred F. Tzeng
*Attorney, Agent, or Firm*—Omkar K. Suryadevara; Skjerven, Morrill, MacPherson, Franklin & Friel, LLP

[57] ABSTRACT

A host adapter integrated circuit that contains data transfer modules has a serial port that uses a single serial port pin to communicate with a slave serial port input-output integrated circuit that interfaces to various resources that are included in a support circuit. The serial port forms a packet from each byte of information to be transferred from a module to the slave device by adding a start bit before the byte, followed by a parity bit at the end of the byte and followed by a stop bit. After transmitting the packet, the serial port waits for an acknowledge packet from the slave serial port input-output integrated circuit, for example for two clock cycles after transmission of the packet. For synchronous operation, a common oscillator drives the clock signal on the slave serial port input-output integrated circuit and host adapter integrated circuit. The serial port pin in the host adapter integrated circuit is connected to a shifter circuit in the serial port that serially clocks data from the serial port pin and passes the data parallelly to a bus in the host adapter integrated circuit and vice versa.

23 Claims, 30 Drawing Sheets

Microfiche Appendix Included
(3 Microfiche, 133 Pages)

U.S. PATENT DOCUMENTS

| | | | |
|---|---|---|---|
| 5,301,275 | 4/1994 | Vanbuskirk et al. | 395/250 |
| 5,319,754 | 6/1994 | Meinecke et al. | 395/310 |
| 5,402,014 | 3/1995 | Ziklik et al. | 326/37 |
| 5,404,527 | 4/1995 | Irwin et al. | 395/700 |
| 5,412,644 | 5/1995 | Herberle | 370/85.3 |
| 5,430,393 | 7/1995 | Shankar et al. | 327/142 |
| 5,537,558 | 7/1996 | Fletcher et al. | 395/309 |

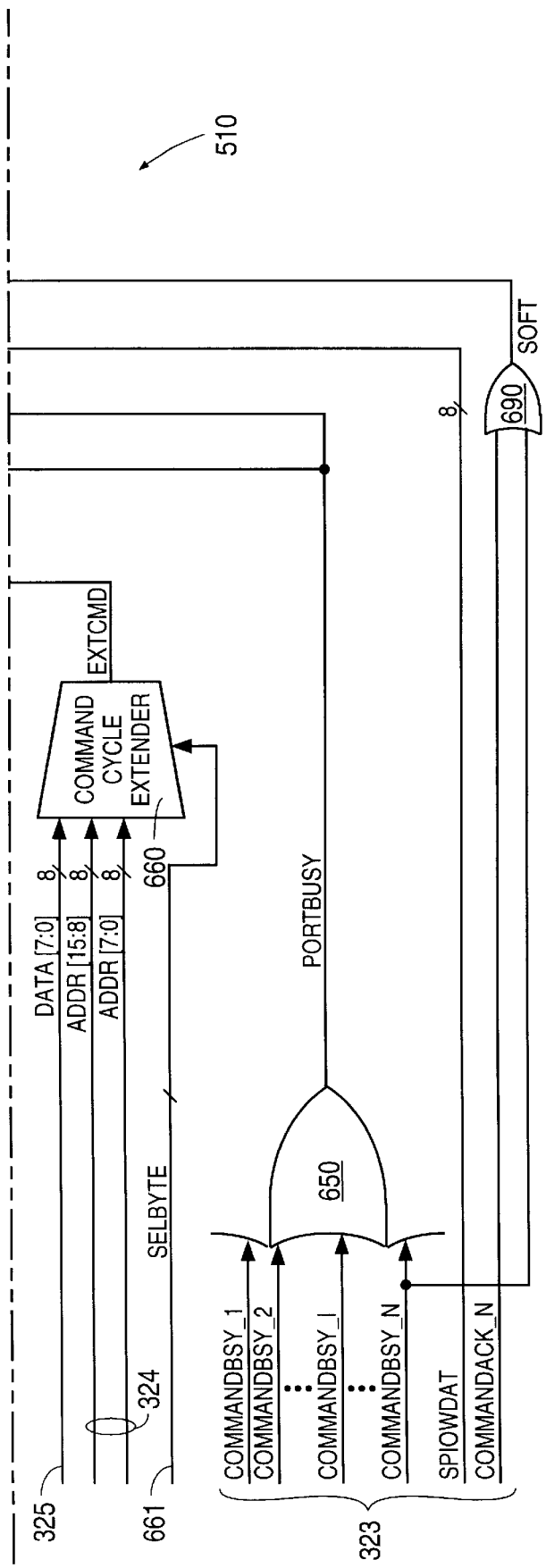
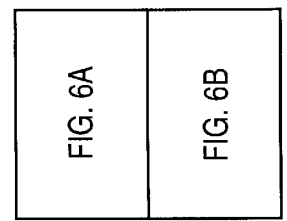
FIG. 6B

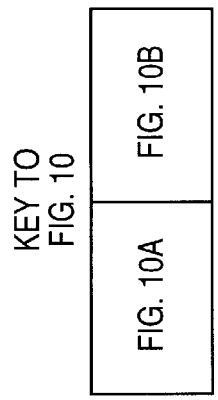
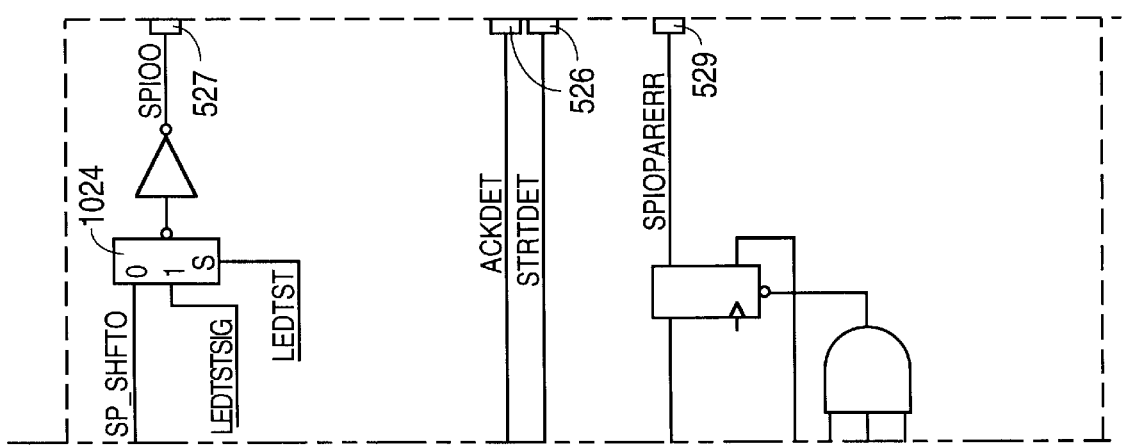

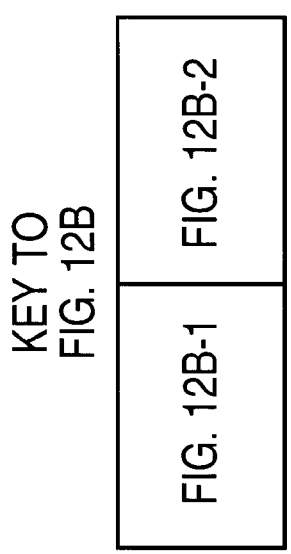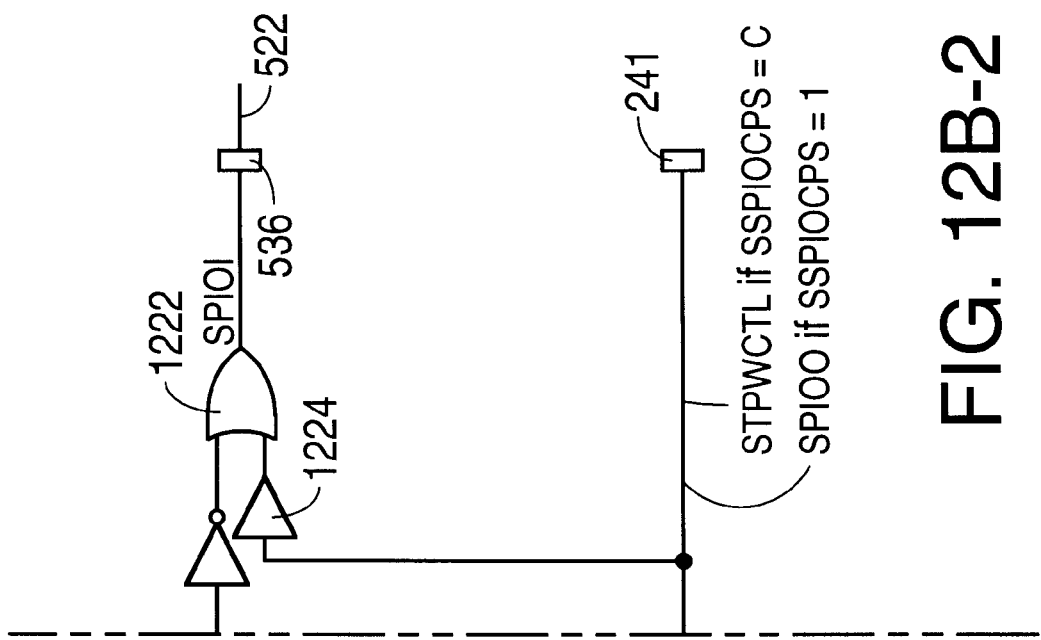

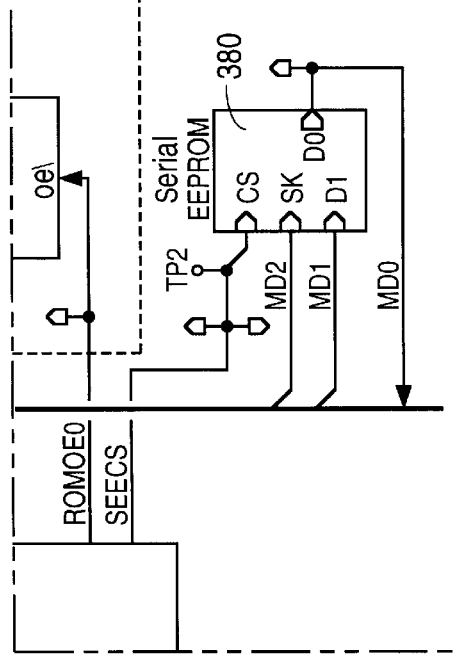
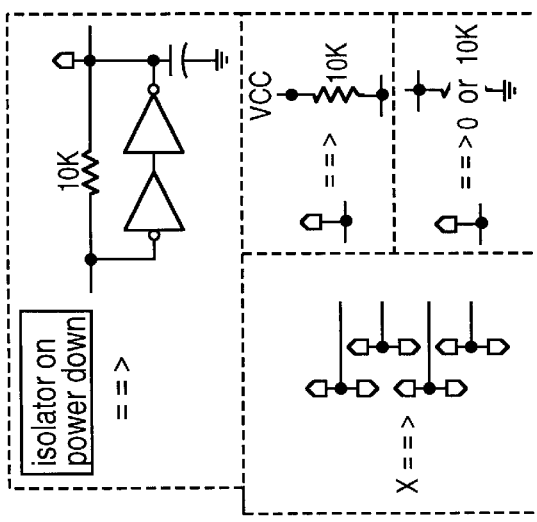
FIG. 16D

SERIAL PORT HAVING ONLY A SINGLE TERMINAL FOR INFORMATION TRANSFER TO AND FROM AN INTEGRATED CIRCUIT

CROSS-REFERENCE TO RELATED APPLICATIONS

This application is a division of application Ser. No. 08/482,529, filed Jun. 07, 1995 now U.S. Pat. No. 5,826,068, which in turn is a division of commonly assigned U.S. patent application Ser. No. 08/337,691 entitled "SERIAL PORT FOR A HOST ADAPTER INTEGRATED CIRCUIT USING A SINGLE TERMINAL" of Stillman Gates and Christopher Burns filed Nov. 9, 1994 and now abandoned.

BACKGROUND OF THE INVENTION

1. Reference to Microfiche Appendix

Microfiche Appendix A of 2 sheets and 75 frames and microfiche Appendix B of 1 sheet and 58 frames are part of the present disclosure, and are incorporated herein by reference in their entirety.

Microfiche Appendices A and B include VERILOG code listings for generating the modules for a serial port for a host adapter integrated circuit and a slave serial port input-output integrated circuit respectively.

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

2. Field of the Invention

The present invention is related generally to a serial port for an integrated circuit and in particular to a serial port for input and output of information to a circuit external to the integrated circuit using a single pin terminal of the integrated circuit.

3. Description of Related Art

As the number of functions performed by an integrated circuit, hereinafter IC, increases, typically the number of pins of the integrated circuit also increases. However, as a rule of thumb, a packaged integrated circuit with a large number of pins is more expensive to fabricate than an IC with relatively fewer pins. Also, a large number of pins adds to the cost of the board on which the IC is to be mounted. Packaged ICs with a large number of pins at the periphery cannot be used due to lack of real estate on the board. Packaged ICs with multiple rows of pins inside the periphery at the bottom of the package require additional layers in a board and increase complexity of interconnects on the board. The number of pins of an IC can also impose a limit on the number of functions that can be performed in the IC.

When an IC, such as host adapter 112A that interfaces an input-output bus, e.g. SCSI bus, to a host computer's system bus, e.g. PCI bus, (FIG. 1A) is mounted on a plug-in board 110, the number of pins needed by host adapter 112A is not constrained in a majority of cases. Host adapter 112A (FIG. 1A) has a number of pins, such as pins 112-1, 112-2, . . . 112-N to support an adapter read-only-memory 111 for basic input-output software, hereinafter BIOS of host adapter 112A.

External logic (not shown) is needed by some host adapters to support adapter read-only-memory 111. For example, "36C70 SCSI IC Technical Reference Manual" by Future Domain Corporation, 2801 McGraw Avenue, Irvine, Calif. 92714, November 1993, discloses a host adapter in which "[a] minimal amount of external glue logic is required to serialize the parallel ROM data" (page 3-1). During system start-up, the information from the adapter read-only-memory can be copied into system memory 170 for quick access by host processor 161, sometimes referred to as microprocessor 161.

In contrast, when a host adapter 112B (FIG. 1B) is mounted on a-mother board 160 of a personal computer, the number of pins of host adapter 112B can be limited to, for example, 100 pins due to less real estate available on mother board 160 as compared to plug-in board 110. Host adapter 112B eliminates the need for a connector that is otherwise necessary for a plug-in board. Host adapter 112B (FIG. 1B) does not have pins to access adapter read-only-memory 111, e.g. pins 112-1, 112-2, . . . 112-N of host adapter 112A (FIG. 1A). BIOS for host adapter 112B is loaded from processor read-only-memory 162 that also contains the system BIOS for microprocessor 161. Thus host adapter 112B is limited to performing only certain basic functions, such as data transfer between system bus 120 and input-output bus 140. Such a host adapter 112B cannot be used on plug-in board 110 e.g. if host adapter 112B does not support a read-only-memory.

A way is needed for a limited pin integrated circuit, such as host adapter 112B to use resources, such as a read-only-memory, without increasing the number of pins, so that the same host adapter 112B can be used on both a mother board and a plug-in board.

SUMMARY OF THE INVENTION

In accordance with the principles of this invention, a host adapter integrated circuit, henceforth "host adapter", has a novel single pin serial port. The serial port uses a single bidirectional pin, for transfer of information from and to a circuit, such as a support circuit that is external to the host adapter. The support circuit contains resources that support certain functions that are not available in the host adapter.

The serial port allows various modules of host adapter, to communicate with the support circuit through the single serial port pin. The serial port also allows software on a host processor that is connected to the host adapter by a system bus to communicate with resources in the support circuit. The serial port has no other pins that are connected to the support circuit for information transfer, such as control pins for interrupt signals or other control signals for handshaking or a data clock pin. In one embodiment, the host adapter serial port and the support circuit are operated synchronous with each other by a common clock signal that originates from an oscillator. A sequencer module in the host adapter buffers the common clock signal and passes the buffered clock signal to various modules of the host adapter, including the serial port.

One embodiment of a host adapter includes a master serial port input-output circuit that receives various internal signals from various modules of the host adapter and drives one or more command signals active onto a serial port command bus that is connected to the serial port. In response to an active command signal, the serial port generates a command byte, formats the command byte into a packet and then transmits the packet on the serial port pin.

The serial port forms a packet from any bytes of information to be transferred, such as a command byte, an address byte or a data byte by adding a start bit before the byte, followed by a parity bit after the byte and a stop bit after the parity bit. After transmitting one or more packets to the support circuit, the serial port waits for an acknowledge packet from the support circuit.

In response to active command signals, the serial port generates and transmits a command packet optionally followed by one or more address packets and data packets serially on the serial port pin that is coupled to the support circuit. The serial port receives all responses from the support circuit on the same serial port pin.

In one embodiment, the serial port executes a command cycle to implement a serial port input-output protocol of a packet sequence specific to the command byte being transferred. For example, in response to a command signal to write one or two bits, such as a command to turn on and off (1) a light emitting diode, or (2) bus termination of the input-output bus or to reset a slave serial port input-output circuit included in the support circuit, the serial port executes a bit write command cycle in which the serial port includes the bits to be transmitted in the command byte, transmits a packet containing the command byte and waits for an acknowledge packet following transmission of the packet.

In response to a command signal to write a byte, for example to a predetermined register, in addition to transmitting a packet containing a command byte, the serial port also transmits a packet containing a data byte and then waits for the acknowledge packet.

In response to a command signal to write a byte to a specific address, for example to an electrically erasable programmable read only memory, the serial port transmits a packet containing command byte, followed by one or more packets containing the address bytes, e.g. two packets for a 16-bit address, followed by a packet containing the data byte and then waits for the acknowledge packet.

Similarly, in response to a command signal to read a byte, for example from a predetermined register, the serial port transmits a packet containing the command byte and then waits for an acknowledge packet that is followed by a packet containing the data in the register.

To read a four-byte word from an address in memory, such as a random-access-memory the serial port transmits a packet containing the command byte followed by two packets containing the address bytes and then waits for an acknowledge packet followed by four packets containing data bytes.

The support circuit determines the number of packets expected from the serial port of the host adapter from the contents of the packet containing the command byte. After receiving all expected packets, the support circuit starts transmission of an acknowledge packet and while transmitting the acknowledge packet, performs the operation indicated by the command byte. On completion of the operation, the support circuit terminates transmission of the acknowledge packet and depending on the operation transmits one or more data packets if necessary.

The use of such a serial port to off-load various functions of a host adapter to a support circuit is a significant improvement over prior art integrated circuits because the serial port reduces the number of pins of a host adapter. Such a host adapter can be used on a plug-in board with a support circuit, such as a slave serial port input-out put circuit that provides various functions, such as support for an external read-only-memory. Instead of a slave serial port input-output circuit, a programmable logic circuit or a shift register can pass to the host adapter, for example, a device identification byte and byte of status of various resources accessible through the serial port. The same host adapter can also be used on a personal computer mother board to provide data transfer functions, without a support circuit.

In response to an active bit in a serial port control register, the serial port operates in a test mode in which the serial port passes an internal signal of the host adapter to the serial port pin. The serial port exits the test mode only when reset.

In one embodiment, in the absence of a support circuit, the serial port pin that is normally used for information transfer is used by the host adapter for a default internal signal, such as turning power for bus termination on and off, which further reduces the total number of pins. Such a host adapter results in lower cost due to a smaller number of pins, smaller die size and volume production for use on a mother board as well as a plug-in board. Such a host adapter also takes less space on a mother board and so reduces the overall system cost for supporting data transfer between a system bus and an input-output bus.

The use of such a predetermined protocol in which one integrated circuit always waits for another integrated circuit eliminates possibility of contention for serial port input-output line avoids collision of packets and so eliminates need for control lines, in addition to serial port input-output line between a serial port of a host adapter and a support circuit.

BRIEF DESCRIPTION OF THE DRAWINGS

FIGS. 4A–4I illustrate the sequence and timing of various packets generated and received by the serial port of FIG. 3.

DETAILED DESCRIPTION

Figure 1A:
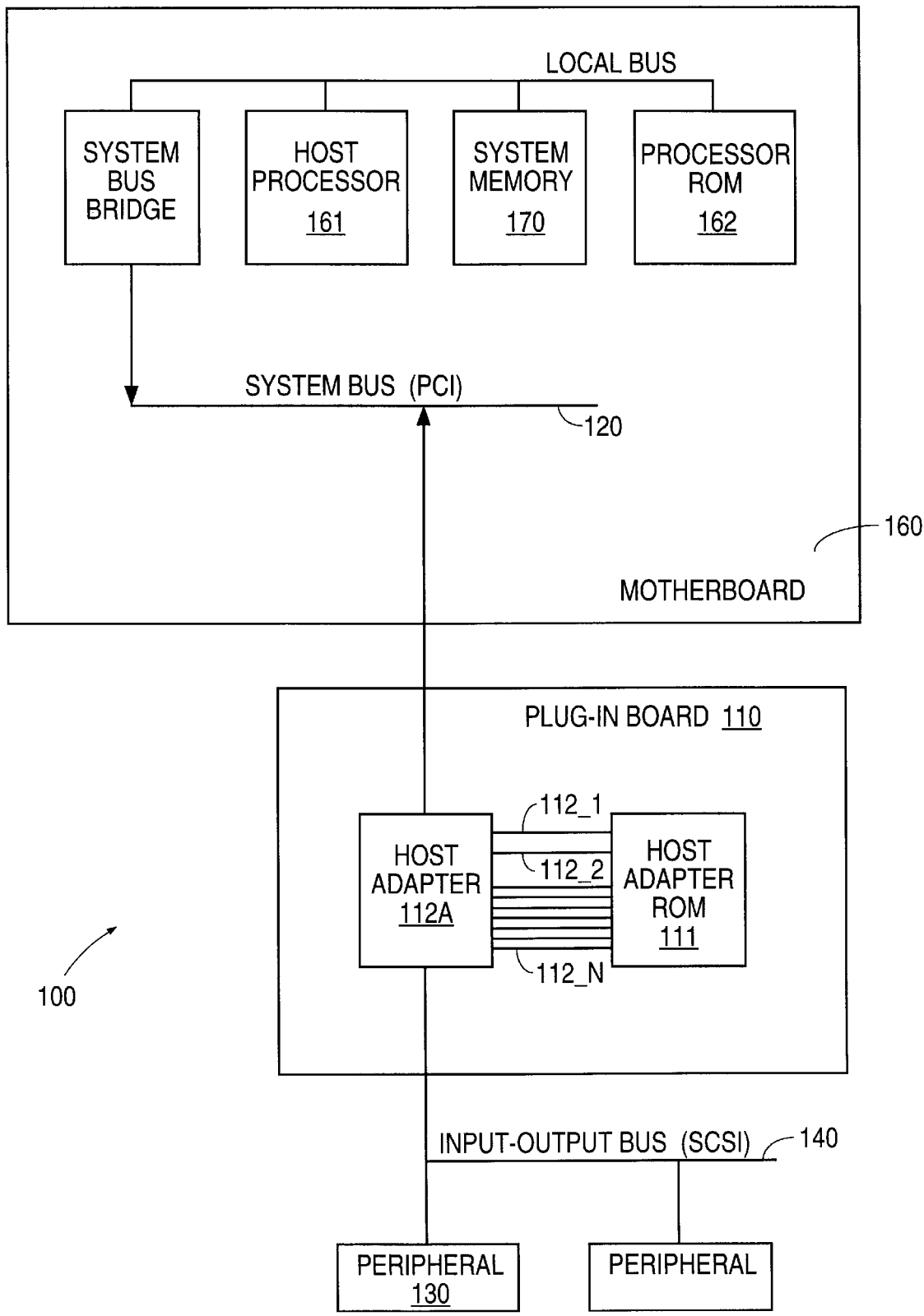
FIGS. 1A and 1B illustrate two prior art computer systems that use a host adapter for data transfer between an input-output bus and a system bus.
Figure 1B:
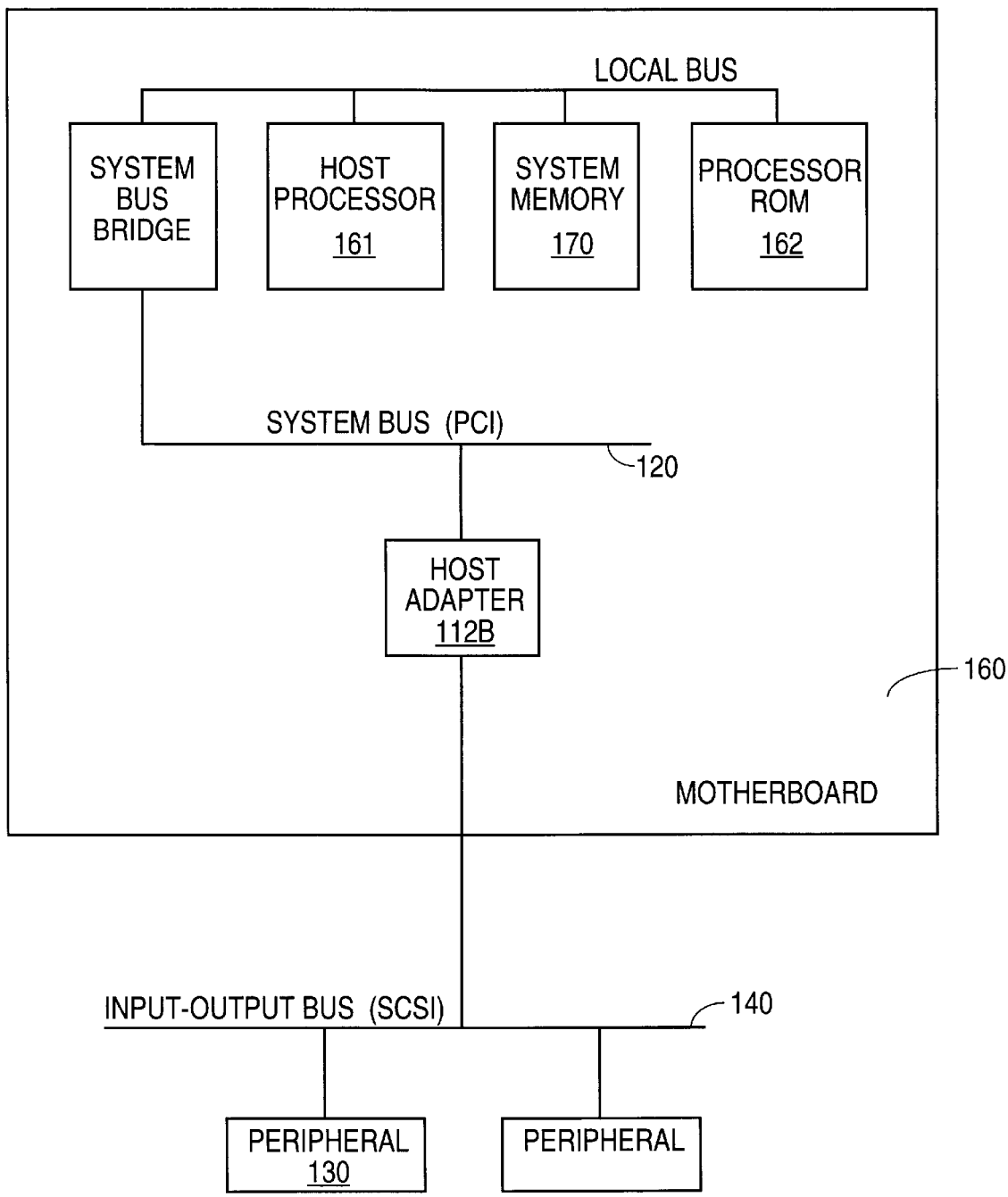

In accordance with the principles of this invention, a novel single pin serial port 230 (FIG. 2A) is included in an integrated circuit, such a host adapter 240. Serial port 230 uses a single serial port pin 241 of host adapter 240, for serial transfer of information from and to a circuit that is external to host adapter 240, such as support circuit 250. This is in sharp contrast to the normal serial port that typically requires at least three pins. Therefore, either the total number of integrated circuit pins can be reduced or additional pins are available for other functions.

Support circuit 250 includes a slave serial port-input output circuit 254 that interfaces with serial port 230, and that supports a number of functions using various external resources such as resources 251, 252 and 253. For example, serial port 230 can use support circuit 250 (1) to provide device identification data from an initialization resource, for example a programmable logic circuit, (2) basic-input-output software, henceforth "BIOS," from a memory resource, for example read only memory, henceforth "ROM", and (3) turn on and off a hardware resource, for example, a light emitting diode, henceforth "LED."

Serial port 230 interfaces with a master serial port input-output circuit 210 within host adapter 240 which controls use of various resources in support circuit 250 by various modules of data transfer circuit 220. Data transfer circuit 220 transfers data between system bus terminals 244 that are coupled to system bus 283 and input-output bus terminals 243 that are coupled to input-output bus 284. Data transfer circuit 220 has a number of modules, such as input-output bus module 221, FIFO module 222, sequencer module 223, and system bus module 225 that are all connected to each other by a data transfer bus 226 and all of which are described in, for example, and commonly assigned U.S. patent application Ser. No. 07/964,532, entitled "Intelligent SCSI Bus Host Adapter Integrated Circuit", filed on Oct. 15, 1992, by Craig A. Stuber et al., now U.S. Pat. No. 5,659,690 issued on Aug. 14, 1997, that is hereby incorporated by reference in its entirety. Memory module 224 is used to temporarily store various data values that are used by firmware in sequencer module 223.

When used with support circuit 250, host adapter 240 does not need certain pins, for example sixteen address pins, eight data pins and two control pins for accessing a ROM, other control pins for other resources, and power and ground pins that were otherwise necessary in prior art host adapters. The smaller number of pins allows use of host adapter 240 in applications that do not require ROM support, as described below in reference to FIG. 2B. Also, the smaller number of pins allows use of host adapter 240 in applications where the number of pins is limited for compatibility with other products.

Moreover, the use of only one pin, e.g. serial port pin 241, henceforth "pin 241" for serial communication with support circuit 250 is a significant enhancement over prior art host adapters, because serial port 230 reduces the number of pins for serial communication to the smallest possible number of pins, i.e., one pin. As is known to those skilled in the art, as integration on a chip increases, one of the limiting factors is the numbers of pins on the integrated circuit. The smaller number of pins of host adapter 240 facilitates smaller die size and smaller package size which lowers cost as compared to prior art host adapters.

To utilize a resource in support circuit 250, a module of data transfer circuit 220 instructs master serial port input-output circuit 210, on master input-output bus 245 that is connected to data transfer circuit 220, to access the resource through serial port 230. In response to instruction signals from a module of host adapter 240, master serial port input-output circuit 210 drives certain command signals active on serial port input-output bus 246 that connects serial port 230 to master serial port input-output circuit 210.

In response to the command signals, serial port 230 generates and serially transmits a command packet optionally followed by one or more address packets and data packets serially on pin 241 that is coupled to support circuit 250 by a serial port input-output line SPIO-, henceforth line SPIO-.

To indicate receipt of the information transmitted on pin 241, support circuit 250 transmits an acknowledge packet on line SPIO-. Support circuit 250 can transmit one or more packets on line SPIO- only in response to one or more packets from serial port 230, except that following a power-on reset, support circuit 250 transmits two packets containing initialization information. Non-receipt of the two initialization packets, within a predetermined time after power-on reset, indicates to serial port 230 to pass a default internal signal on line SPIO-, for example for input-output bus termination power control, instead of transmitting packets.

Serial port 230 can transmit on line SPIO- at any time that support circuit 250 is not allowed to transmit, for example after the two initialization packets. Such a predetermined protocol in which one integrated circuit always waits for another integrated circuit eliminates possibility of contention for line SPIO-, avoids collision of packets and so eliminates need for control lines, in addition to line SPIO-, between serial port 230 and support circuit 250.

Serial port 230 receives all responses from support circuit 250 on the same pin 241. During reception of the acknowledge packet at pin 241, serial port 230 drives an acknowledge detect signal active on serial port input-output bus 246.

In response to the active acknowledge detect signal, master serial port input-output circuit 210 drives a command acknowledge signal and a command busy signal active on master input-output bus 245 to indicate that the command cycle is in progress and the resource is busy, e.g. not available for another command cycle, until completion of the current command cycle.

Figure 2A:
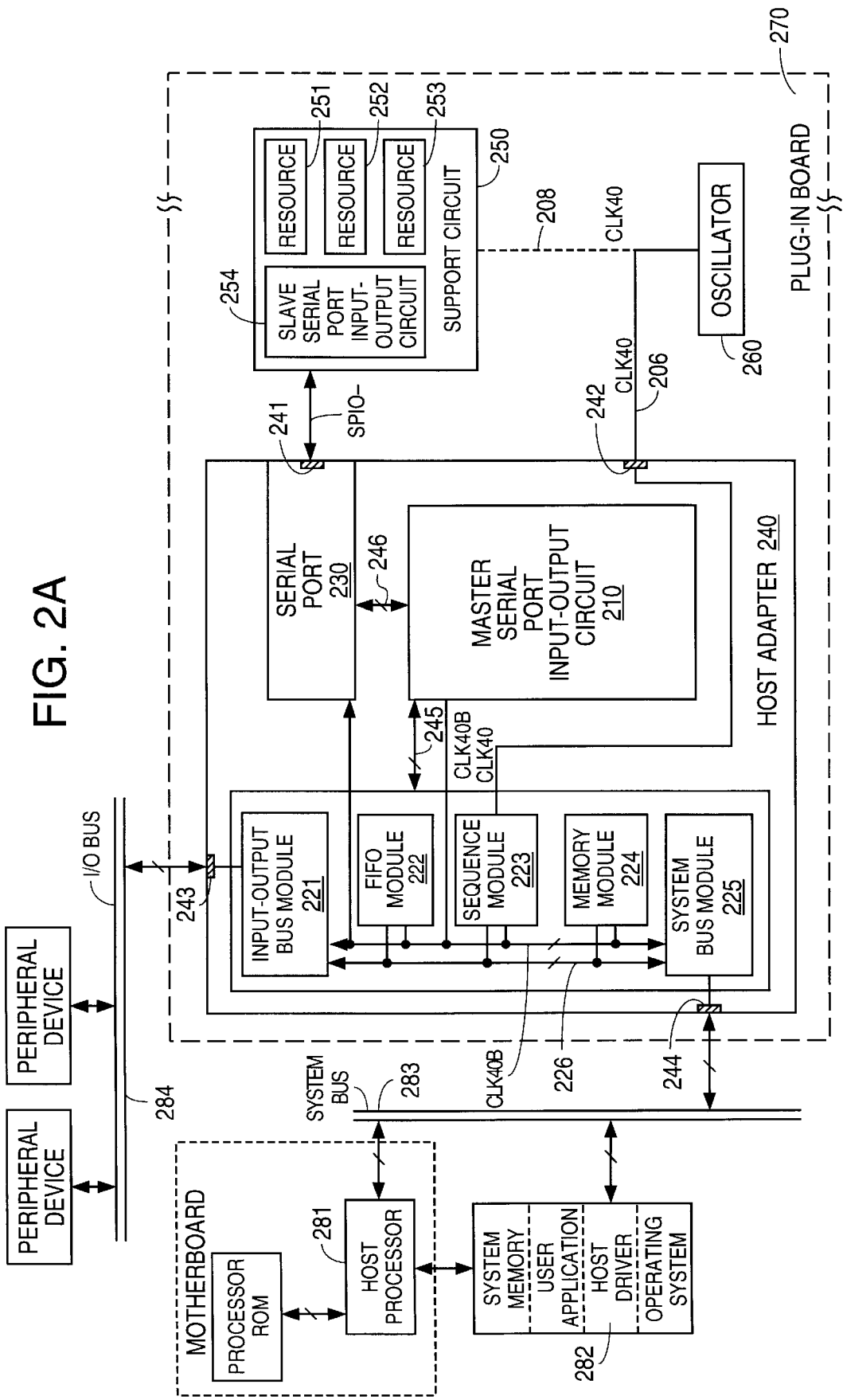
FIGS. 2A and 2B show illustrative high level block diagrams of two embodiments of a computer system including a host adapter of this invention.

In FIG. 2A, for synchronous operation of host adapter 240 and support circuit 250, an oscillator 260 drives a clock signal CLK40 on both (1) host adapter clock line 206 that is connected to clock terminal 242 of host adapter 240 and (2) support circuit clock line 208, shown dotted, that is connected to support circuit 250. Such a common oscillator eliminates the need for a data clock signal from host adapter 240 to support circuit 250. Clock terminal 242 of host adapter 240 provides a clock signal that is buffered by sequencer module 223 to all internal modules of host adapter 240. So clock terminal 242 is not utilized solely with serial port 230 as was done by certain prior art host adapters. Support circuit clock line 208 is not necessary if a bus terminator in support circuit 250 is directly coupled to pin 241.

Execution of a command cycle by (1) generation of packets from command signals, (2) transmission of the generated packets on a single pin 241, and (3) reception of the acknowledge packet on the same pin 241 eliminates the need for additional lines, such as one or more control lines for transferring interrupt signals or other handshaking signals and a clock line from serial port 230 to support circuit 250 and thereby facilitates a serial port having just one pin 241.

A single pin serial port 230 has the advantages of less pins on the two interconnected integrated circuits, less PCB etch routing, reduced timing constraints of multi-signal interface by elimination of signal-to-signal skew concerns, fewer signals, less noise and lower power requirements, than conventional serial ports.

Figure 2B:
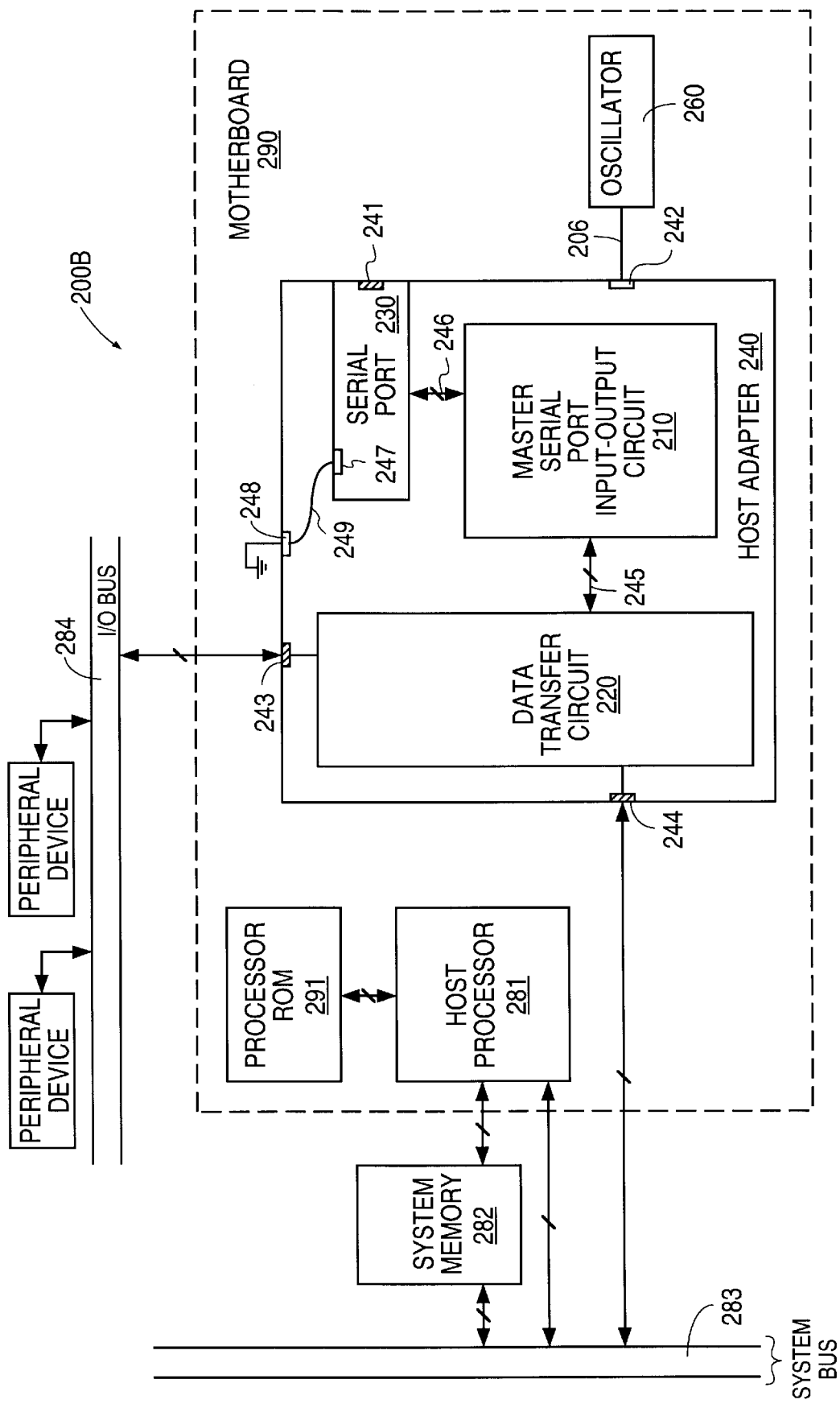

In another embodiment, the same host adapter 240 described above, is also used in applications in which support for read-only-memory is not needed, for example, on a mother board 290 (FIG. 2B). In FIG. 2B, BIOS for host adapter 240 is loaded from processor ROM 291 that also contains system BIOS for host processor 281. In this embodiment, serial port 230 drives a default internal signal on pin 241. This embodiment is accomplished within the IC package of host adapter 240 by a bond wire 249 that connects a serial port disable terminal 247 on the die of host adapter 240 to a ground pin 248 of the die.

Figure 12A:
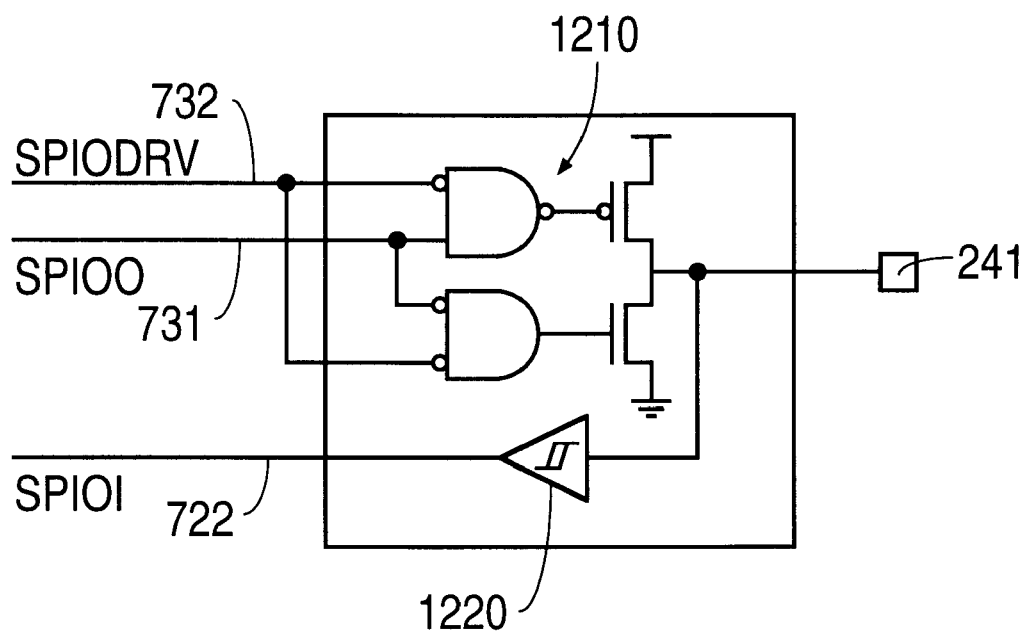
FIGS. 12A and 12B (including FIGS. 12B-1 and 12B-2) illustrate two alternative embodiments of the line controller of FIG. 4.
Figures 1, 12B:
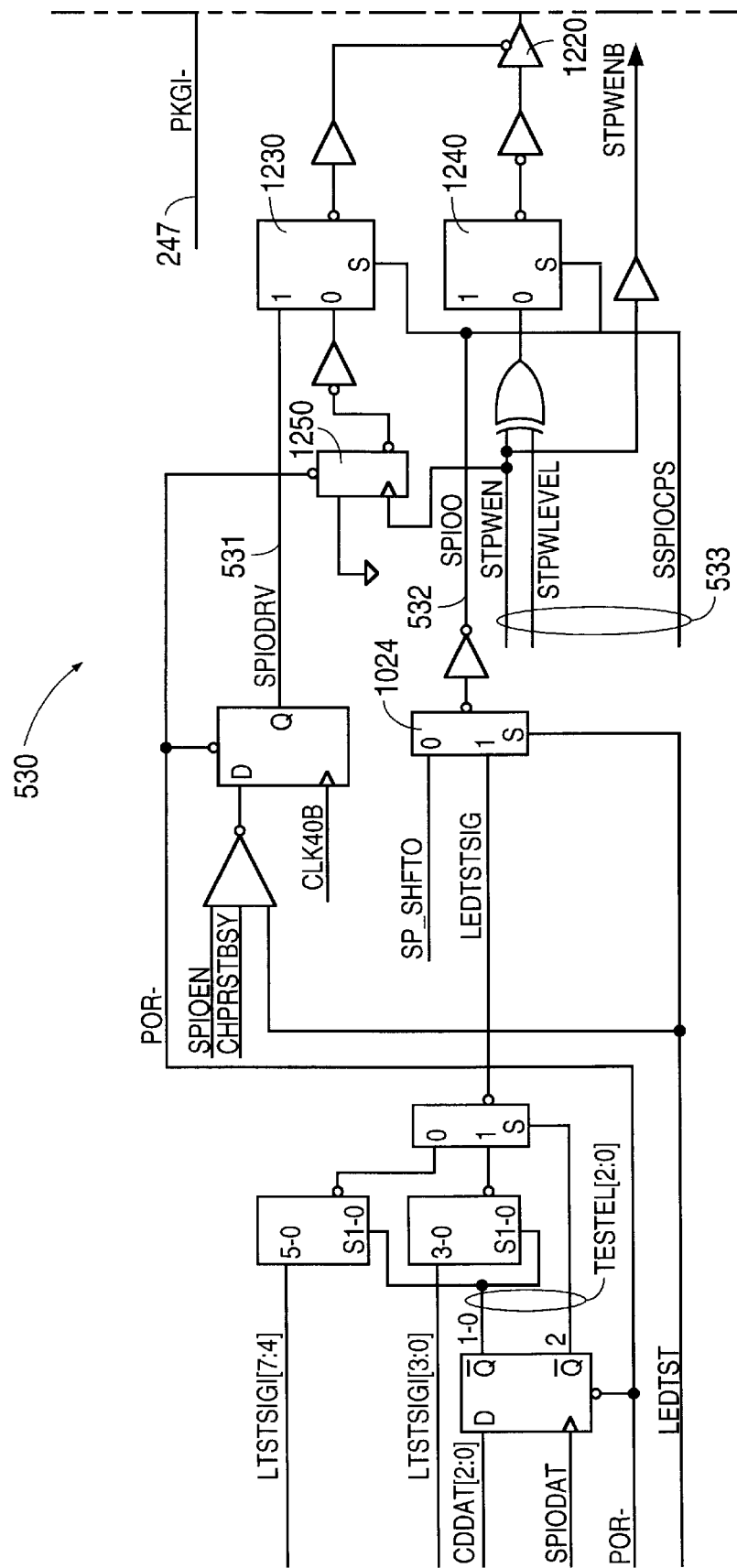
Figure 13:
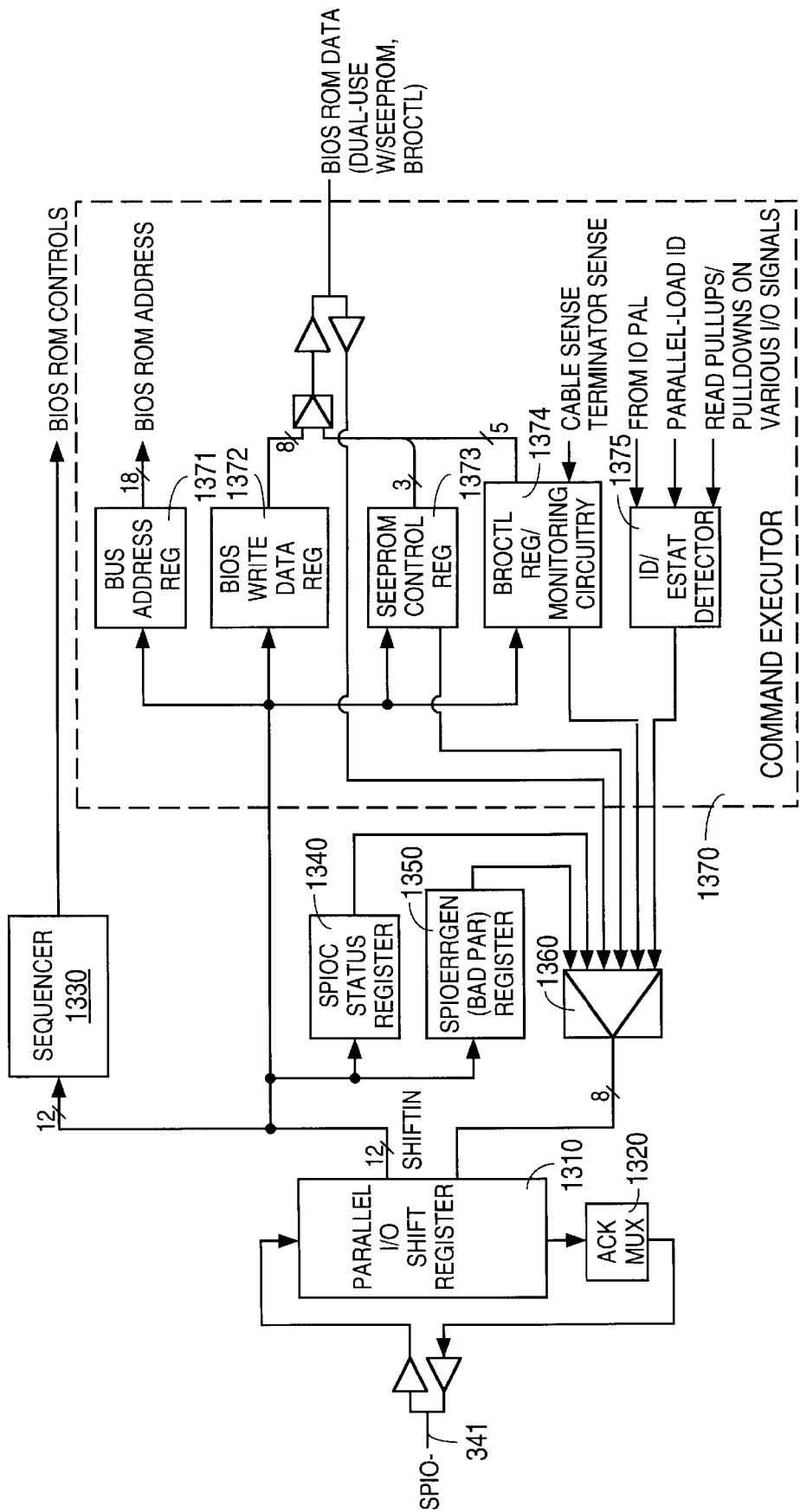
FIG. 13 shows an illustrative high level block diagram for the slave serial port input-output circuit of FIG. 3.

Disable terminal 247 is coupled to serial port command lines 323 (FIG. 3) and so inhibits serial port 230 from responding to command signals from master serial port input-output circuit 210 except for the default internal signal (as illustrated in FIG. 12B).

In such an inhibited state, pin 241 is used only by host adapter 240 for bus termination control, as described below in reference to FIG. 12B. When disable terminal 247 is left unconnected, serial port 230 is configured to transfer data between master serial port input-output circuit 210 and support circuit 250 as described above in reference to FIG. 2A.

Use of the same host adapter 240 on either a mother board 290 (FIG. 2B) or on a plug-in board 270 (FIG. 2A) results in lower costs due to volume production of a single die for both uses. Moreover, host adapter 240 also has smaller die-size, smaller number of terminals and therefore lower costs, all of which are important criteria for use on a mother board. Host adapter 240 also reduces the overall system cost of a computer system 200B (FIG. 2B), because host adapter 240 occupies less real estate than a conventional host adapter.

In response to various internal signals of host adapter 240, such as a read instruction signal or a write instruction signal from a hardware module, firmware, or software in data transfer circuit 220, an instruction router 311 (FIG. 3) in master serial port input-output circuit 210 passes the instruction signals to a resource controller, such as hardware resource controller 313, soft resource controller 314, initialization resource controller 315, and memory resource controller 316.

For example, in response to an internal signal on master serial input-output bus 245 to turn on or off a hardware resource, such as light emitting diode 350, hereinafter LED 350, instruction router 311 passes a write instruction signal on hardware bus 311H to a single byte write command controller, in hardware resource controller 313. In response to such a write instruction signal, the single byte write command controller drives one or more command signals active, e.g. a LED request signal LEDREQ (not shown) active to indicate a request for hardware resource LED 350 and a LED state signal LEDSTATE (not shown) active to indicate that LED 350 should be turned on, on serial port command bus 323 that is included in serial port input-output bus 246.

Command signals that are specific to a resource included in support circuit 250 have a reference numeral that is a combination of the command the resource. In general, for resource "X", reference numeral XREQ is a resource request signal for resource X; reference numeral XREAD is a read signal for resource X; reference numeral XSEND is a write signal for resource X; and reference numeral XBSY is a busy signal for resource X. Herein X can be any one of ROM, BRD, LED, SEE and SOFT, where "ROM" represents EEPROM 390; "BRD" represents board control logic 370; "LED" represents LED 350; "SEE" represents serial EEPROM 380; and "SOFT" represents soft resource 341.

Figure 4A:
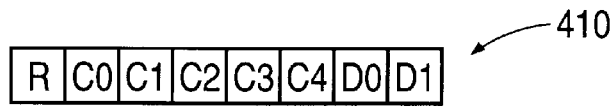

In response to active command signals, such as LED request signal LEDREQ and LED state signal LEDSTATE, command executor 320 executes a command cycle, such as a write-command cycle. In the command cycle a byte generator in command executor 320 first generates a command which in this embodiment is a command byte 410 (FIG. 4A).

In command byte 410, most significant bit R that is shifted out first is set for a read command cycle and cleared for a write command cycle. Bits C0 to C4 in command byte 410 are command bits that are used to encode various commands that can be transmitted by serial port 230 to support circuit 250. Among bits C0 to C4, bit C0 is the least significant bit. Bits D0 and D1 are data bits and bit D1 is the most significant bit in command byte 410.

Figure 3:
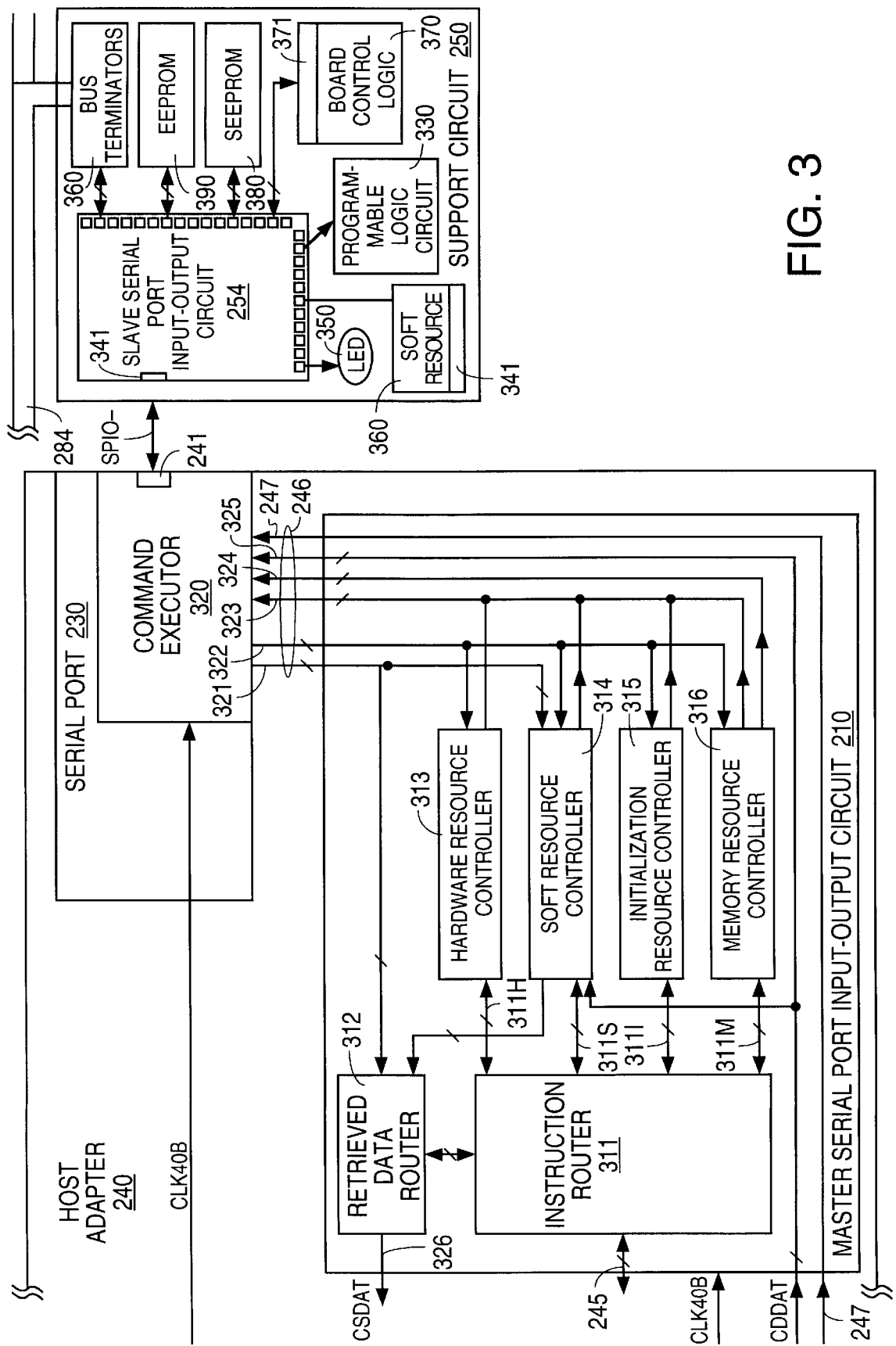
FIG. 3 shows an intermediate level block diagram for one embodiment of host adapter of FIGS. 2A and 2B.
Figure 4B:
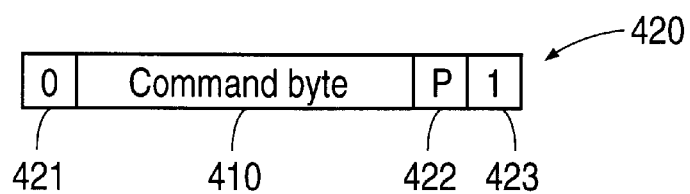

A converter in command executor 320 formats the command byte into a command packet, such as command packet 420 (FIG. 4B). In this embodiment, a start bit 421 is inserted at the start of the packet and is followed immediately by command byte 410. Command byte 410 is followed by a parity bit 422 and then a stop bit 423. A line controller included in command executor 320 serially transmits the command packet on pin 241 (FIG. 3) that is connected to a slave serial input-output circuit 254, also referred to as SSPIOC 254 in support circuit 250, by line SPIO-.

Figure 4C:
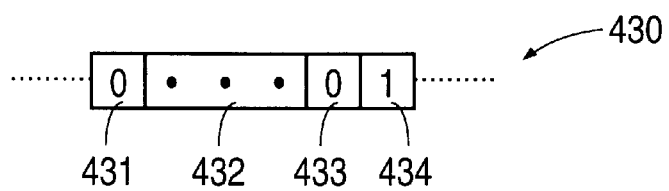

In the example for LED 350 described above, command executor 320 executes a bit write command cycle in which command executor 320 transmits a LED command packet 451 (FIG. 4E) that includes bit R "0", a command code "10000" for LED request signal LEDREQ in command code bits C0–C4 (FIG. 4A), the value of LED state signal LEDSTATE in data bit D0 and a constant e.g. 0 in data bit D1.

In general, command executor 320 forms a packet, such as a command packet, an address packet or a data packet by inserting a start bit 421 (FIG. 4B) having a first value that is followed by a command byte, an address byte or a data byte respectively, followed by a parity bit 422 which in turn is followed by a stop bit 423 having a second value different from the first value. In FIG. 4B, start bit 421 has a first value of a logical zero, hereinafter zero parity bit 422 is selected so that the transferred byte together with the parity bit has an odd parity, stop bit 423 has a second value of a logical one hereinafter one, and packet 420 is transmitted on line SPIO-. Line SPIO- is pulled up to a default value of one when line SPIO- is not being driven either by serial port 230 or by slave circuit 250. The identical value for the stop bit and for the default value of line SPIO- provides active negation that permits transmission of information across line SPIO- at higher speeds than possible without active negation. Active negation also prevents false detection of additional packets that can happen if line SPIO- is left at zero with only the pull-up resistor to take line SPIO- to one.

Figure 4D:
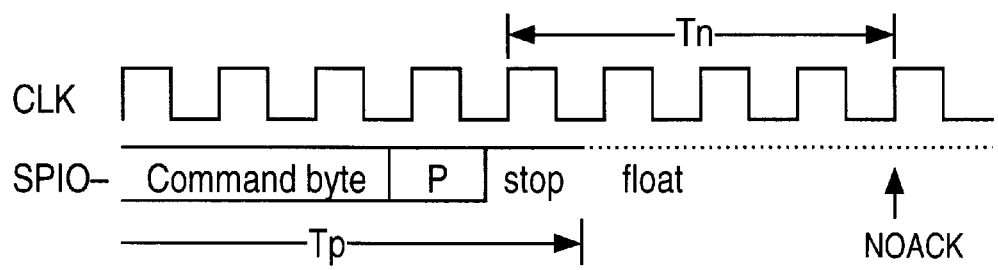
Figure 4E:
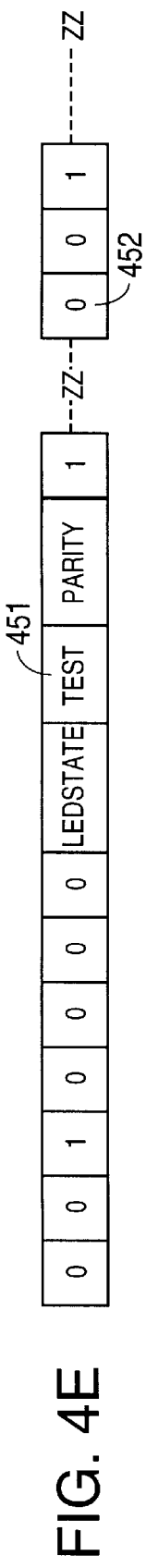

After a transmission time period Tp (FIG. 4D), that is associated with transmission of a packet, command executor 320, depending on the command cycle being executed, transmits additional address or data packets as described below and waits for an acknowledge packet 430 (FIG. 4C) that is described more completely below, during an acknowledge window time period Tn (FIG. 4D).

If command executor 320 does not receive a first bit of an acknowledge packet within acknowledge window time period Tn, command executor 320 sets a bit NOACK in an error register ERROR (not shown in FIG. 2A) of system bus module 225 and terminates the command cycle which in turn generates a target abort response to host processor 281, if the command packet transmitted on pin 241 originated from a command of host processor 281. In one embodiment, acknowledge window time period Tn is eight clock cycles after command executor 320 drives a stop bit on pin 241.

In general, in response to a command packet, such as LED command packet 451, slave serial port input-output circuit 254 starts transmission of an acknowledge packet 452 and performs the action indicated by command byte 410 retrieved from the command packet 420, for example send a one to LED 350 if the value of bit D0 is one, while continuing to transmit the acknowledge packet. On completion of the action indicated by command byte 410, slave serial port input-output circuit 254 completes transmission of acknowledge packet 430.

In general, slave serial port input-output circuit 254 waits for a first turnaround period of time and after receipt of a stop bit of the last packet expected from serial port 230, before transmission of an acknowledge packet. Serial port 230 also waits for the first turnaround time period to become sensitive to an active signal on line SPIO- from slave serial port input-output circuit 254. The first turnaround time period can be any predetermined time period e.g. one clock cycle, two clock cycles or any other number of clock cycles.

Serial port 230 waits for a second turnaround time period to send a command packet after receipt of a packet from slave serial port input-output circuit 254. The second turnaround time period can also be any predetermined time period one clock cycle, two clock cycles or any other number of clock cycles. In one embodiment, the first turnaround time period and the second turnaround time period are identical and are equal to two clock cycles.

In general, acknowledge packet 430 includes a first bit 431 and a second bit 433, both having the same first value followed by a third bit 434 having a second value that is different from the first value. Acknowledge packet 430 can include any number of optional bits between first bit 431 and second bit 433 all of which have the same first value, depending on the amount of time needed by slave serial port input-output circuit 254 to complete the action indicated by command byte 410. In the embodiment of FIG. 4C, first bit 431 and second bit 433 both have first value zero, and third bit 434 has second value one and a number of optional bits 432 of first value zero are inserted between first bit 431 and second bit 433.

In response to a start bit 431 of an acknowledge packet 430 received at pin 241, command executor 320 drives an acknowledge detect signal ACKDET active on acknowledge detect line 322 that is connected to each of hardware resource controller 313, software resource controller 314, initialization resource controller 315 and memory resource controller 316. Command executor 320 continues to drive the acknowledge detect signal active on acknowledge detect line 322 until receipt of third bit 434 on pin 241, at which point command executor 320 drives acknowledge detect signal ACKDET inactive and terminates the command cycle.

In the example for LED 350 described above, in response to an active acknowledge detect signal, the single byte write command controller in hardware resource controller 313 drives a set busy signal SETBSY (not shown) active to indicate that a serial port command cycle is in progress. When acknowledge detect signal goes inactive, hardware resource controller 313 drives set busy signal SETBSY inactive and waits for the next active instruction signal from instruction router 311.

While responding to an instruction signal, hardware resource controller 313 is insensitive to any additional instruction signals, for example for changing the state of LED 350. State change instruction signals for LED 350, that occur at a rate faster than the speed of serial transmission of a command packet on pin 241 and serial receipt of an acknowledge packet on the same pin 241, are lost. The state of LED 350 at the end of a series of state change instruction signals is the last state that was sent to slave serial port input-output circuit 254.

In one embodiment, instruction router 311 receives an internal signal LED- on master input-output bus 245 from a status switching circuit that is described in copending and commonly assigned U.S. patent application Ser. No. 08/301,458, Attorney Docket No. M-2933, entitled "Status Indicator for a Host Adapter" of Stillman F. Gates and Charles S. Fannin, filed on Sep. 7, 1994, that is incorporated by reference herein in its entirety. In one embodiment, a hardware module, or firmware or software of host adapter 240 turns on and off LED 350 as described for LED request signal LEDREQ in Table 1 below. Table 1 lists examples of conditions under which various command signals are generated by master serial port input-output circuit 210. Tables 2–9 list definitions of the bits of various registers in master serial port input-output circuit 210. Some of the bit definitions and signal values described herein are similar or identical to those described in "AIC-7870 PCI Bus Master Single-Chip SCSI Host Adapter Data Book-Preliminary" published in December 1993 available from Adaptec, Inc. 691 South Milpitas Boulevard, Milpitas Calif. 95035, that is incorporated by reference herein in its entirety.

TABLE 1

| Command Signal | Function |
| --- | --- |
| LEDREQ (write) | Turn on or off LED 350 |
| STPWREQ (write) | Turn on or off power to I/O bus terminators 360 |
| CHPRSTREQ (write) | Reset slave serial port input-output circuit 254 |
| BRDREQ (read or write) | Read from or write to board control register BRDCTL in board control logic 370. |
| SOFTREQ (read or write) | Read from or write to soft resource 340. |
| EIREAD (Read) | Receive identification byte IDDAT and external resource status byte ESTAT from SSPIOC 254 |
| ROMREQ (read or write) | Read ROM or EEPROM memory location or write to EEPROM memory location |
| SEEREQ (read or write) | Read from or write to serial EEPROM |

Signal LEDREQ (TABLE 1) is a write-only signal that controls the state of LED 350 that is connected to a pin LED# on SSPIOC 254. Signal LEDREQ can originate from three sources. A first source is automatic hardware action generated by changes in use state of input-output bus 284 e.g. from not busy with data transfers to busy or from not busy and available for data transfer to busy with data transfers, if slave present bit SSPIOCPS is active (e.g. one) in external resource status register SPIOCAP in instruction router 311 (TABLE 2) and bit DIAGLEDEN is not active in register SBLKCTL (e.g., bit 7 in reg. 1Fh is zero) in input-output bus module 221. In response to an LED command byte containing a D0 as a one to indicate use state charged from busy to not busy, slave serial port input-output circuit 254 drives a signal on pin LED# high. In response to an LED command byte containing bit D0 as a zero command to indicate use state charged from not busy to busy, slave serial port input-output circuit 254 drives the signal on pin LED# low. Bit D1 for an LED command byte is always zero.

A second source of signal LEDREQ is generated by changing the value of bit DIAGLEDON in register SBLKCTL (e.g. bit 6 in reg. 1Fh) in input-output bus module 221, provided bit SSPIOCPS in external resource status register SPIOCAP is active (e.g. one) and bit DIAGLEDEN in register SBLKCTL (bit 7 in reg 1Fh) is active (e.g. one). Also in this case bit D1 is always zero and slave serial port input-output circuit 254 asserts the signal on pin LED# low when bit D0 is zero e.g. bits DIAGLEDON and DIAGLEDEN are both one. Slave serial port input-output circuit 254 drives a signal on pin LED high when bit D0 is a one erg. bit DIAGLEDEN is a zero and bit DIAGLEDEN is a one or input-output bus 284 is not busy and bit DIAGLEDEN is a zero.

A third source of signal LEDREQ is generated by firmware or software using a pre-defined soft command byte to put serial port 230 in a test mode. This test mode is indicated by setting bit D1 one in the LED command cycle, and in this test mode, line SPIO- is used to bring out internal signals of host adapter 240 during system operation for real time debugging purposes. Once SSPIOC 254 receives a LED command packet with bit D1 at a one, the SSPIOC 254 stops responding to all command packets and simply passes the signal on line SPIO- as the signal on pin LED#.

The test mode is exited only by a reset signal RST# or by power-on reset. In the test mode, host adapter 240 multiplexes out internal signals onto line SPIO- depending on the value stored in bits TESTSEL [2:0] of register SPIODATA (1Dh), which bits while in test mode are assigned the function name of TESTSEL, with bits [7:3] reserved. The value of bits TESTSEL can be changed to select a different internal signal to drive line SPIO-. See TABLE 3 below for definition of bits TESTSEL [2:0].

TABLE 3

Serial Port Test Mode Assignment Definitions

| Value of bits TESTSEL (SPIODATA [2:0]) | Name of internal signal in data transfer circuit 220 |
| --- | --- |
| 7 or 6 | Unassigned |
| 5 | DFCACHES |
| 4 | DFCACHETHLA |
| 3 | PAUSE (not equal PAUSEACK) |
| 2 | MREQPEND |
| 1 | FRAME0- |
| 0 | DEVSEL0- |

Each of the above internal signals is supplied on a LED test signal bus LTSTSIG1 that is included in master serial input-output bus 245. In response to a write to register SPIODAT, soft resource controller 314 passes a selected internal signal to serial port 230.

Signal DFCACHES indicates that there is data or space of one selected cache line in FIFO module 222 that is used by system bus module 225 to select a predetermined command for accessing system bus 283.

Signal DFCACHETHLA is a look ahead signal for streaming cache lines to improve bus performance from FIFO module 222.

Signal PAUSE requests sequencer module 223 to halt operations as described in the U.S. Patent Application filed by Craig A. Stuber referenced above.

Signal MREQPEND indicates that a memory request is pending for access to system bus 283 by system bus module 225 to transfer data between FIFO module 222 and system memory 282.

Signal FRAME0- is an internal signal that is active when host adapter 240 is acting as a bus master and is the signal supplied to the PCI bus as signal FRAME#.

Signal DEVSEL0- is an internal signal from system bus module 225 that is active when host adapter 240 is acting as a bus target and is the signal supplied to the PCI bus as signal DEVSEL#.

In addition to the three sources of signal LEDREQ described above, when any one of the status bits is set (an OR condition) in slave serial port status register SPIOSTAT in SSPIOC 254, SSPIOC 254 drives a signal on pin LED# active to visually indicate an error, such as a parity error, provided that enable LED error display bit 7 is set. This feature can be used to aid in system debugging.

Referring back to Table 1, in response to command signal STPWREQ, command byte bit D1 is set to the state of bit STPWLEVEL in register DEVCONFIG of system bus module 225 and bit D0 is set to state of bit STPWEN in register SXFRCTL1 of input-output bus module 221. This command signal is issued after the first write of a one to SCSI termination power write enable bit STPWEN in input-output module 221 and there after whenever bit STPWEN changes state. Changing the state of SCSI termination power level bit STPWLEVEL in system bus module 225 does not cause this command signal to be issued. Signal STPWREQ can only be generated when bit SSPIOCPS in register SPIOCAP is one.

Following assertion of a reset signal RST# on system bus 283, SSPIOC 254 keeps SCSI termination power control pin STPWCTL in a float condition (three state) until the first command signal STPWREQ is received as shown by Table 4.

Thereafter, SSPIOC 254 controls SCSI termination power control pin STPWCTL based on values of bits STPWLEVEL and STPWEN.

TABLE 4

Signal on SCSI Termination Power Control pin STPWCTL

| — | STPWLEVEL | STPWEN | STPWCTL |
| --- | --- | --- | --- |
| 0 | — | — | Z (three state) |
| 1 | 0 | 0 | 0 |
| 2 | 0 | 1 | 1 |
| 3 | 1 | 0 | 1 |
| 4 | 1 | 1 | 0 |

Bits STPWLEVEL and STPWEN are transmitted to SSPIOC 254 from bit STPWLEVEL in register DEVCONFIG and bit STPWEN in register SXFRCTL1 when command signal STPWREQ is asserted. Bit STPWEN is used to activate bus terminators 360. Bit STPWLEVEL indicates the voltage needed to deactivate bus terminators 360.

Termination power supplied by bus terminators 360 to input-output bus 284 is turned on or off as indicated by bit STPWCTL, based on the values of bits STPWLEVEL and STPWEN listed in Table 4.

When SSPIOC 254 is not present or if bond wire 249 (FIG. 2B) is present, pin 241 defaults to SCSI termination power control function and causes the output of pin 241 to float until bit STPWEN is written, as described below in reference to FIG. 12B.

Whenever a module of data transfer circuit 220 writes to a register SFXRCTL1 (not shown) in input-output bus module 221, instruction router 311 passes a signal to a single byte write command controller (not shown) of hardware resource controller 313 to transfer the current state of SCSI bus termination power level signal STPWLEVEL and power enable signal STPWEN to bus terminators 360 in support circuit 250. The command cycle executed by serial port 230 in response to command signal STPWREQ for controlling bus terminators 360 is similar to the sequence of actions described above in reference to LED 350, except that bits D0 and D1 in the command byte contain the states of signals STPWLEVEL and STPWEN respectively.

Command signal CHPRSTREQ (Table 1) is issued as a result of setting bit CHPRST in register HCNTRL in system bus module 225, provided that slave present bit SSPIOCPS is one. The action of serial port 230 is different for command signal CHPRSTREQ than that described above for signal LEDREQ. Rather than transmit a command packet with start, stop, and parity bits serial port 230 simply drives a signal on pin 241 to a predetermined voltage for a predetermined number of clock cycles. Specifically in response to an active reset command signal CHPSTREQ, serial port 230 resets all internal registers except for system configuration registers located in system bus module 225. Serial port 230 also executes a soft reset command cycle in which serial port 230 drives a signal on pin 241 to logical zero for 12 or more clock cycles to reset slave serial port input-output circuit 254. In response to this reset packet SSPIOC 254 resets certain registers in SSPIOC 254 that are visible to host adapter 240, such as registers SPIOSTAT, BRDCTL and SEEPROM. Certain flip-flops that hold the address for BIOS accesses are not reset. SSPIOC 254 also drives the signal on pin. STPWCTL to the selected inactive state (bit STPWLEVEL unchanged and bit STPWEN inactive).

The reset packet is issued as soon as possible after the leading edge of signal CHPRST by master serial port input-output circuit 210. In all commands except a soft command, SSPIOC 254 is reset on completion of the current command, and soft commands are aborted if the last command byte is still not sent.

Therefore, master serial port input-output circuit 210 and serial port 230 provide a seamless and compatible interface between resources in support circuit 250 and various host adapter modules. Host adapter 240 turns on and off at least three different resources: slave serial port input-output circuit 254, LED 350 and bus terminators 360, using hardware resource controller 313, command executor 320 and serial port 230 on a single pin 241.

In addition, a module in host adapter 240 can write a data byte on data input bus 325, that is connected to a write data bus CDDAT included in data transfer bus 226, for example by putting an address 1Dh of a master board control register BRDCTL in hardware resource controller 313 on master input-output bus 245, that is connected to a write address bus CDADR included in data transfer bus 226. In response to such a write to master board control register BRDCTL, instruction router 311 drives a signal active on a hardware bus 311H coupled to a board controller included in hardware resource controller 311, if serial port 230 is available and if board control logic 370 exists on support circuit 250.

Instruction router 311 also determines the source of an internal signal on master input-output bus 245 from the state of a sequencer source signal PAC2SPIO on master input-output bus 245. Depending on the source of the internal signal, instruction router 311 drives a stretch signal, such as stretch sequencer signal STRETCHSEQ or a stretch host signal SEEBRDRDY, to the source of the instruction, such as sequencer module 223 or system bus module 225, to wait until the command cycle is completed. On completion of the command cycle, instruction router 311 drives the corresponding stretch signal inactive.

In response to an active instruction signal on hardware bus 311H from instruction router 311, the board controller in hardware resource controller 313 drives board request signal BRDREQ (Table 1) and board write signal BRDSEND active on serial port command bus 323. In response to active command signals BRDREQ and BRDSEND command executor 320 executes a byte write command cycle that is similar to the bit write command cycle described above for LED 350, except that command executor 320 transmits a data packet 462 subsequent to transmission of command packet 461 and then waits for an acknowledge packet 463 from slave serial port input-output circuit 254.

So, board control command signal BRCTLREQ accesses board control register BRDCTL in SSPIOC 254. This command signal is issued when an address for board control logic 370, e.g. 1Dh is accessed provided board control bit BRDCTL in external resource register SPIOCAP is active and soft command enable bit SOFTCMDEN in external resource register SPIOCAP is inactive. When the access is from host processor 281, signal TRDY# on PCI bus 283 is not returned by system bus module 225 until the command is completed. When the access is from sequencer module 223, the sequencer clock is stretched until this command is completed.

Board control register BRDCTL, that is defined in TABLE 5, provides the capability to control reading and writing of external device(s) interconnected to the SSPIOC's memory port which may be shared with EEPROM and SEEPROM.

TABLE 5

Register BRDCTL in SSPIOC 254 and in Hardware Resource Controller 313

| Bit # | Definition |
|---|---|
| 7:5 | BRDDAT [7:5]. |
| 4 | BRDSTB. |
| 3 | BRDCS. |
| 2 | BRDRW. |
| 1:0 | Unused bits (BRDCTL [1:0]). |

Board data bits BRDDAT[7:5] are read/write data bits that are only connected to pins MD[7:5] of slave serial port input-output circuit 254 when bit SEEMS is active. Bits BRDDAT are write bits when board read write bit BRDRW defined in Table 5 is inactive (e.g. zero) and the written value of bits BRDDAT is asserted on pins MD[7:5].

When bit BRDRW is active e.g. one, bits BRDDAT are read bits. One embodiment of slave serial port input-output circuit 254 connects bits BRDDAT [7:5] to pins MD [7:5] to read the current logical state of the signals on pins MD [7:5]. Another embodiment of slave serial port input-output circuit 254 connects bit BRDDAT[7] to pin MD7 and connects BRDDAT[6:5] to SCSI cable detection input pins CBLDET and XCBLDET (not shown) or SCSI termination detection input pins TRMSH1 and TRMSL0 (not shown) depending on the state of bits BRDSTB and BRDCS.

Board strobe bit BRDSTB is coupled to pin MD4 when bit SEEMS is active. When bit BRDSTB is active (e.g. one) pin MD4 is asserted low. Normal use is to store the desired write data in bits BRDDAT[7:5] and a one in bit BRDCS and then store a one in bit BRDSTB to activate external pin MD4 of SSPIOC 254 at a low level and start the strobe to write the data into the board control logic. A zero in bit BRDSTB, ends the strobe.

Board chip select bit BRDCS is a read/write bit connected to pin MD3 when bit SEEMS is asserted. When bit BRDCS is active (e.g. one), output on pin MD3 of SSPIOC 254 is asserted low.

Board read/write bit BRDRW controls the output state of pin MA15 of SSPIOC 254 when bit SEEMS is active. The state of bit BRDRW also controls the data direction of bits BRDDAT[7:5]. When bit BRDRW is inactive e.g. zero bit BRDDAT[7:5] are output and pin MA15 is asserted low e.g. zero.

Unused bits are always read as zero and writes to unused bits are ignored.

The timing provided to external resources is a function of a software routine that matches the device's timing. Bits SEECTL, as indicated, may also be used for board logic control if desired.

After receipt of command packet 461, slave serial port input-output circuit 254 waits for the data packet 462 and then starts transmission of acknowledge packet 463. Slave serial port input-output circuit 254 updates a slave board control register BRDCTL with the data byte retrieved from data packet 462 so that both the master board control register and the slave control register have identical values. For convenience, the same reference numeral BRDCTL is used for the master board control register and the slave board control register. Slave serial port input-output circuit 254 then completes transmission of acknowledge packet 463.

The actions of command executor 320 and hardware resource controller 313 subsequent to receipt of acknowledge packet 463 on pin 241 are similar to the actions described above in reference to acknowledge packet 452 for LED 350. When the acknowledge detect signal ACKDET goes inactive on acknowledge detect line 322, the command cycle is completed and hardware resource controller 313 drives a board ready signal BRDCTLRDY active on hardware bus 311H that is connected to instruction router 313. In response to active board ready signal BRDCTLRDY, instruction router 311 drives the corresponding stretch signal to the host or the sequencer inactive to indicate completion of the write to slave board control register BRDCTL.

In response to a read of a master board control register BRDCTL, the actions of instruction router 311, hardware resource controller 313, command executor 320 and slave serial port input-output circuit 254 are similar to the actions described above in reference to the write to master board control register BRDCTL, except that command executor 320 executes a byte read command cycle in which command executor 320 transmits a command packet 471 (FIG. 4G) and after receipt of acknowledge packet 472, waits for a data packet 473. Command executor 320 passes a data byte retrieved from data packet 473 on received data lines 321 to retrieved data router 312, which in turn passes the retrieved data byte on data input bus 326, that in one embodiment is coupled to a destination data bus CSDAT included in data transfer bus 226, to the module that originated the internal signal, to read data from master board control register BRDCTL. One set of bit definitions for a master board control register BRDCTL and a slave board control register BRDCTL are listed in "A1C-7870 PCI Bus Master Single-Chip SCSI Host Adapter Data Book-Preliminary" available from Adaptec, Inc. of Milpitas, Calif. that was incorporated by reference above.

Soft command signal SOFTREQ (Table 1) is only issued as a result of access by a host processor 281 or sequencer module 223 to serial port control register SPIOCTL and serial port data register SPIODATA in soft resource controller 314. Before issuing a soft command signal SOFTREQ, the firmware or software examines the external resource status register SPIOCAP to determine whether soft commands are supported. The command byte value and number of bytes to be transferred following the command byte is register based and allows all values to be used. The acknowledge detect signal functions the same as in the other command cycles.

In response to an internal signal from a module of data transfer circuit 220, to write or read a register in soft resource 340, instruction router 311 drives corresponding signals active on soft controller lines 311S that are connected to soft resource controller 314. The operation of soft resource controller 314 is similar to the operation of board controller in hardware resource controller 313 described above except that the actions of soft resource controller 314 are controlled by the value of the byte stored in register SPIOCTL that is listed in Table 6.

Soft resource controller 314 includes a first-in-first-out memory element that buffers up to three bytes of data read from soft resource 340 in response to a read instruction from instruction router 311. Command executor 320 buffers a fourth byte of data from soft resource 340.

The address of register 341 in soft resource 340 is identical to the address of the master board control register BRDCTL and instruction router 311 selects register 341 if a bit SOFTCMDEN is active in a register SPIOCAP that is described in Table 2 above and otherwise selects master board control register BRDCTL.

Prior to issuing a soft command signal SOFTREQ, soft command enable bit SOFTCMDEN in external resource status register SPIOCAP must be set. Soft resource controller 314 is clocked only when soft command enable bit SOFTCMDEN is active. Therefore, to conserve power, soft command enable bit SOFTCMDEN is set only when a soft command signal is to be processed. Care should be taken when the firmware in sequencer module 223 issues soft command internal signals because of possible interaction between host processor software and host adapter firmware in sharing soft resource controller 314. The following is one scheme using lock bit L as a semaphore.

If the firmware in sequencer module 223 wants to issue a soft command signal, sequencer module 223 should first check lock bit L. If lock bit L is not set, sequencer module 223 locks serial port 230 by setting lock bit L to one in serial port control register SPIOCTL that is defined in TABLE 6A.

TABLE 6A

Serial port control register SPIOCTL
in soft resource controller 314

| Bit # | Function |
|-------|----------|
| 7 | Send (S). |
| 6 | Last Byte (LB). |

TABLE 6A-continued

Serial port control register SPIOCTL
in soft resource controller 314

| Bit # | Function |
|---|---|
| 5 | Lock (L). |
| 4 | Timer (T). |
| 3:2 | Reserved. Always read as zero. |
| 1:0 | Read (R [1:0]). |

Send bit S is written active (e.g. one) after a byte has been written into register SPIODAT at address 1Dh. After the byte has been shifted out to line SPIO-, soft resource controller 314 clears bit S. When a module in data transfer circuit 220 samples bit S inactive, the next byte in the current command can be loaded into register SPIODAT. After the last byte is shifted out as indicated by bit LB, soft resource controller 314 begins sampling for a response for the current command from line SPIO-.

Last byte bit LB is set when the last byte for the current command is to be sent or received. After the byte has been shifted out or in through line SPIO-, soft resource controller 314 clears last byte bit LB along with bit S.

Lock bit L is a read/write bit without any hardware function. Lock bit L is used by host processor 281 and sequencer module 223 as a semaphore to prevent overwriting each other if both of them issue soft commands. A semaphore is not needed if sequencer module 223 does not use soft commands.

Timer bit T is a hardware timer bit provided for software usage instead of a software timer loop. Timer bit T when written active (e.g. 1) automatically becomes inactive 800 ns after last byte bit LB is cleared, e.g. last byte of command is completely shifted out. The timer is referenced to a 40 MHz clock signal from sequencer module 223.

In one embodiment, instead of last byte bit LB, read bits R[1:0] define how many bytes are to be expected in response to the current command. In such an embodiment, after a byte has been shifted in from line SPIO- and transferred to register SPIODATA, that is defined in table 6B, soft resource controller 314 decrements the value of read bits R[1:0]. Software can read the value to determine when the shifted in data is available. Read bits R[1:0] can have the following values: 0: No bytes expected; 1: One byte expected; 2: Two bytes expected; 3: Three bytes expected. In one embodiment read bits R[1:0] are encoded as data bits D1 and D0 in the soft command byte formed in response to command signal SOFTREQ.

When set, lock bit L in serial port control register SPIO-CTL prevents host processor 281 from interjecting a request during a multiple byte command cycle or when read data is expected. If send bit S is set while a hardware issued command cycle is being executed (e.g. due to automatic hardware action or PCI ROM/EEPROM access), the soft command signal cannot begin until the current command cycle is terminated.

If host processor 281 wants to gain control of soft resource controller 314, host processor 281 first pauses sequencer module 223 and examines lock bit L in register SPIOCTL. If lock bit L is set, host processor 281 un-pauses sequencer module 223 and retries at a later time, until lock bit L is not set. Following this procedure prevents a deadlock of serial port 230. Host processor 281 does not rely on automatic pause (AAP) action to access serial port registers since sequencer module 223 can issue a soft command and overwrite host processor data.

In a soft command cycle, serial port data register SPIO-DAT is used to transfer information to SSPIOC 254, as shown in Table 6B.

TABLE 6B

Serial Port Input-Output Data Register
SPIODATA in Soft resource Controller 314

| BITS | DATA FUNCTION |
|---|---|
| 7:0 | Send command, address, or data byte when bit S is active in register SPIOCTL |
| 7:0 | Read data when bit S is inactive in register SPIOCTL |

Although certain bit definitions for serial port control register SPIOCTL and serial port data register SPIODATA are described herein, these registers can be used with other definitions. For example, when a soft command cycle is used to put serial port 230 in test mode, serial port data register SPIODAT is used as a control register to indicate which internal signal is to be passed to pin 241.

If the command byte in register SPIODATA has a value of a command code as defined in Table 12, e.g. to access register SPIOSTAT, which register SPIOSTAT is defined in Table 7, a serial port status command cycle is implemented to access the serial port status register SPIOSTAT. Serial port status register SPIOSTAT is read when an acknowledge signal NOACK is returned to determine the exact cause. Reading register SPIOSTAT returns the current status and writing a one to a bit clears that bit.

TABLE 7

Serial port status register SPIOSTAT
in slave serial port input-output circuit 254

| Bit # | Definition |
|---|---|
| 7 | ERRLEDENAB Enable LED error display |
| 6–3 | Reserved. |
| 2 | SPIOPARERR received data Parity Error |
| 1 | UNSUPPORTED command attempt |
| 0 | Reserved. |

When bit ERRLEDENAB is set and either bit 2 or 1 is set, the signal on pin LED# is asserted, e.g. zero, to indicate an error condition. Bit ERRLEDENAB defaults to zero after power-on reset.

Bit SPIOPARERR is set when SSPIOC 254 detects a parity error in the shift-in data. Bit SPIOPARERR is cleared when a one is written to bit SPIOPARERR.

Unsupported command bit UNSUPPORTED is set when SSPIOC 254 receives an unrecognized or unsupported command. Unsupported command bit UNSUPPORTED is cleared when a one is written to unsupported command bit UNSUPPORTED.

Similarly to register SPIOSTAT, register SSPIOERRGEN in SSPIOC 254 is accessed by using command signal SOFTREQ (Table 1) with the appropriate command code in register SPIODATA (Table 13). When bit 0 is set to one in register SSPIOERRGEN, slave serial port input-output circuit 254 sets the parity bit so that the packet transmitted on line SPIO- has even parity and so exercises the parity check circuitry in serial port 230. When bit 0 is set to zero in register SSPIOERRGEN, SSPIOC 254 sets the parity bit so that the transmitted packet has odd parity and this is the normal mode. See TABLE 8.

Command signal EIREAD (Table 1) is issued by initialization resource controller 315 following each assertion of a signal on pin RST# (not shown) of host adapter 240. Also, after being reset, SSPIOC 254 automatically sends two initialization packets containing bytes IDDAT and ESTAT to initialization resource controller 315. While waiting for initialization packets, any host processor access causes a target abort response to be returned. In response to the initialization packets, command executor 320 passes byte IDDAT and byte ESTAT to initialization resource controller 315, that in turn writes byte IDDAT into a device identification register DEVICEID1 (PCI configuration register 00h, byte 3) in system bus module 225 that is used for all communications with host processor 281, and saves byte ESTAT in resource status register SPIOCAP (1Bh) that is used by instruction router 311 to determine the existence of various resources on support circuit 250. Byte ESTAT when shifted over line SPIO- is active low. Byte ESTAT is stored active high in register SPIOCAP. An acknowledge packet starting after the leading edge of a reset signal no earlier than 4 clock cycles and no later than 16 clock cycles precedes bytes IDDAT and ESTAT. If initialization resource controller 315 does not receive an acknowledge packet within 16 clock periods after the rising edge of the signal on pin RST#, initialization resource controller 315 times out and assumes that an external slave serial port input-output circuit 254 does not exist.

Until this initialization command cycle is completed, any PCI target access attempted to host adapter 240 is responded to with signal RETRY to ensure that only the shifted in byte IDDAT is accessed by host processor 281 and existing external features have been identified and enabled.

When a slave serial port input-output circuit 254 is not used and device ID substitution is desired, an external device, such as a shift register device or a programmable logic circuit, provide bytes IDDAT and ESTAT. The rules for minimum time before driving line SPIO- and start, parity and stop bits are followed by the external device. However, if byte ESTAT is FFh and parity and stop bits are also e.g. one, the external device can stop driving line SPIO- after shifting out bit 0 of byte ESTAT, and is implemented in an 8-bit device in one embodiment. Allowing the external device to stop driving the SPIO- early is one reason for choosing an odd parity scheme in one embodiment.

During power-on reset of host adapter 240, instruction router 311 passes instruction signals to initialization resource controller 315 to receive a device identification byte IDDAT and a resource status byte ESTAT from slave serial port input-output circuit 254. No command packet is sent by command executor 320 on pin 241. Following reset, slave serial port input-output circuit automatically places bus terminators 360 in a float condition and sends initialization packets containing bytes IDDAT and ESTAT. Device identification byte IDDAT contains the device identification code to be provided by host adapter 240 when register DEVICEID1 (not shown) is accessed by host processor 281. When byte IDDAT value is ffh, an internal device identification value is used. Resource status byte ESTAT contains information to be stored in register SPIOCAP.

When slave serial port input-output circuit 254, a shift register, or a programmable device is absent, an acknowledge packet is not received between 4 clock cycles and 16 clock cycles after signal RST# becoming inactive. In such a case, command executor 320 causes initialization resource controller 315 to use a default device identification code, to set byte ESTAT to FFh, and to pass the default internal signal STPWCTL to pin 241.

When present, slave serial port input-output circuit 254, on being reset, starts transmission of an acknowledge packet on line SPIO- that is connected to pin 241 before command executor 320 times out. While transmitting the acknowledge packet, slave serial port input-output circuit 254 can take any amount of time necessary to obtain the device identification code from, for example, a programmable logic circuit 330 and time required to assemble byte ESTAT by polling various resources, such as LED 350, soft resource 340, bus terminators 360, board control logic 370, SEEPROM 380 and EEPROM 390. After obtaining bytes IDDAT and ESTAT, slave serial port input-output circuit 254 terminates the acknowledge packet and transmits two initialization packets that contain the two obtained bytes.

Support for each command cycle by SSPIOC 254 is indicated by the associated bit being a zero in byte ESTAT. The bit definitions of register SPIOCAP are shown in Table 2. If the initialization command cycle times out or if byte ESTAT is FFh, none of register SPIOCAP bits are set to one.

Instruction router 311 generates instruction signals to access a resource only after determining the presence of the resource on support circuit 250. Instruction router 311 determines existence of a resource from the value of the corresponding bit in an external resource status register SPIOCAP, also referred to as "register SPIOCAP" that is defined in Table 2 below, such as bit BRDCTL for board control logic 370. External resource status register SPIOCAP is initialized to byte ESTAT after reset.

TABLE 2

Register SPIOCAP in Instruction Router 311

| Bit # | Read/ Write | Definition of function enable bits |
| --- | --- | --- |
| 7:6 | R | SOFT [1:0]. |
| 5 | R/W | Soft Commands Enable (SOFTCMDEN). (Default "0".) |
| 4 | R | BRDCTL. |
| 3 | R | SEEPROM. |
| 2 | R | EEPROM. |
| 1 | R | ROM. |
| 0 | R | SSPIOC Present (SSPIOCPS). |

Bits SOFT [1:0] of register SPIOCAP (Table 2) have no hardware assigned function, but allow software/firmware to be aware of external conditions on a board to board basis to allow customization flexibility. One or more ones indicate that external support is present for performing "soft" commands other than pre-defined soft commands.

Soft command enable bit 5 is written active (e.g. one) by host processor 281 or sequencer module 223 to enable "soft" commands. When bit SOFTCMDEN is inactive, the definitions for address 1bh and 1Eh are registers BRDCTL (Table 5) and SEECTL (Table 8), respectively. When bit SOFTCMDEN is active, the definitions for addresses 1Dh and 1Eh are registers SPIODATA (Table 6B and Table 3) and SPIOCTL (Table 6A), respectively. Bit SOFTCMDEN is not affected by the value of bit 5 of byte ESTAT but is read/write from host processor 281 or sequencer module 223.

When bit BRDCTL is a one, external logic is present to control external board control logic 370. Accesses to board control register BRDCTL in host adapter 240 are automatically redirected to board control register BRDCTL in SSPIOC 254. When board control register BRDCTL is a zero, writes to bit BRDCTL are ignored and reads to board control register BRDCTL return all zeros.

When bit SEEPROM is a one, external logic is present to access an external serial EEPROM. Accesses to serial EEPROM control register SEECTL in host adapter 240 are automatically redirected to serial EEPROM control register SEECTL in the external SSPIOC. When bit SEEPROM is a zero writes to serial EEPROM control register SEECTL are ignored and reads from serial EEPROM control register SEECTL return all zeros.

When bit EEPROM is a one and the ROM bit is also a one the external BIOS ROM support is also writable for in place BIOS updates.

When bit ROM is one, external logic is present to access an external BIOS ROM. Bit ROM when stored as a one allows register EXROMCTL in the configuration space of system module 225 to be read with the value one written to bit ROM indicating PCI external BIOS ROM support. When not a one, reading register EXROMCTL returns a 0h value indicating no support for any value written to EXROMCTL.

Slave present bit SSPIOCPS being one indicates that SSPIOC 254 is connected to pin 241 and enables the LED, STPW and SPIORST command cycles. Bit SSPIOCPS is not set if a shift register or programmable logic is used to pass in byte IDDAT.

Command signal ROMREQ is only issued as a result of a host processor 281 access when bit ROM in register SPIOCAP is active e.g. one, bit EXPROMEN in register EXROMCTL is active, bit MSPACEEN in register COMMAND is active and the access is within the 64 KByte memory address spaced stored in register EXROMCTL.

In a memory read command cycle, the command packet is followed by two address packets that identify the double word to be accessed in the external memory SSPIOC 254 uses 18 address bits MA17-MA0, to access memory, such as ROM or EEPROM. Bits MA7-MA0 are sent in the first address byte, bits MA15-MA8 are sent in the second address byte, and bits MA17 and MA16 are sent in the command packet in bits D0 and D1. See FIG. 4I. Also, in a memory read command cycle SSPIOC 254 requires that bits MA1 and MA0 always be 0. SSPIOC 254 issues four ROM commands to complete the double word required for host processor 281 ROM access. In one embodiment bits [17:16] are used to access up to 256K ROM.

If serial port 230 is busy, the host processor's ROM access is terminated with the PCI signal RETRY, without generating a command signal to memory resource controller 316. If the memory port on SSPIOC 254 is busy because the memory port has been reconfigured for SEEPROM, the access is terminated with a PCI Target Abort, without generating a command signal to memory resource controller 316. The state of the memory port can be determined by examining bit SEEMS in register SEECTL.

For memory reads, command signal ROMREQ (Table 1) is issued as a result of a host processor 281 access when bit ROM in register SPIOCAP is active (e.g. 1), bit EXROMEN in register EXROMCTL is active, bit MSPACEEN in register COMMAND is active, and the access is within the 64 KByte memory address space stored in register EXROMCTL. For memory writes, in addition to the above bits for memory reads, the EEPROM bit in register SPIOCAP must also be an active erg. one. In the memory write command cycle, the command packet is followed by two address packets and a data packet containing a data byte that is to be written in the external EEPROM.

All bits in the address bytes are used to identify the byte being written. SSPIOC 254 writes the data byte into the EEPROM, and after completing the write, terminates acknowledge packet indicating that the write is completed, so that host adapter 240 can assert PCI signals TRDY# and STOP# to host processor 281 to terminate the transaction.

In response to instruction signals on master serial input-output bus 245 to access a memory location in a memory resource, such as EEPROM 390, or SEEPROM 380, instruction router 311 passes an active instruction signal on memory bus 311M that is connected to memory resource controller 316.

In response to an active instruction signal to access EEPROM, a parallel memory controller included in memory resource controller 316 drives a ROM request signal ROMREQ (not shown) active on serial port command bus 323 to indicate the request for memory resource EEPROM 390. The parallel memory controller also drives a ROM read signal ROMREAD (not shown) active or alternatively a ROM write signal ROMSEND (not shown) active on serial port command bus 323 to indicate a read command cycle or a write command cycle, respectively.

Figure 4F:
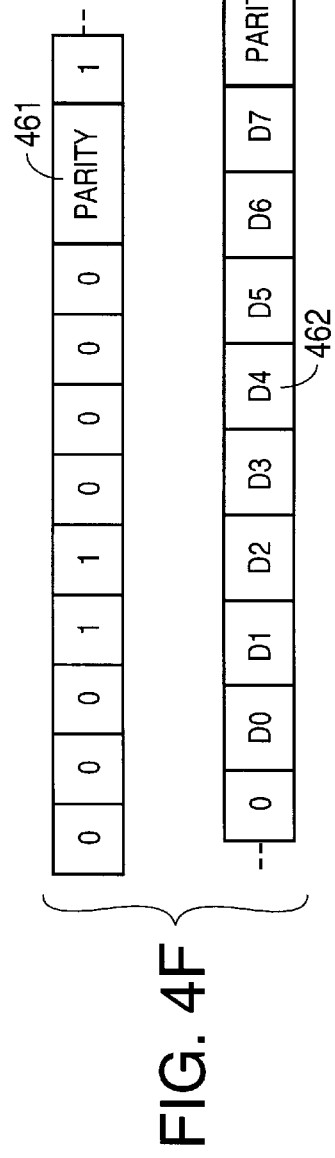

In response to an active signal ROMSEND, command executor 320 executes a memory byte write command cycle that is similar to the memory byte write command cycle described above for the board control register except that command executor 320 transmits two address packets 482 and 483 (FIG. 4H) between command packet 481 and data packet 484.

After receiving all packets 481 to 484, slave serial port input-output circuit 254 starts transmission of acknowledge packet 485, updates EEPROM 390 at the memory location identified by the address contained in address packets 482 and 483 with the data contained in the data packet 484 and then terminates acknowledge packet 485. In one embodiment, slave serial port input-output circuit 254 uses two data bits D0 and D1 of command packet 481 as high order address bits in accessing the memory location. The actions of command executor 320 and memory resource controller 316 subsequent to receipt of acknowledge packet 485 on pin 241 are similar to the actions described above in reference to acknowledge packet 452 for LED 350.

In response to an active ROM read command signal ROMREAD, command executor 320 executes a memory byte read command cycle in which command executor 320 transmits a command packet followed by two address packets 492 and 493. (FIG. 4I)

After receiving all packets 491 to 493, slave serial port input-output circuit 254 starts transmission of an acknowledge packet 494 and while transmitting acknowledge packet 494 retrieves a byte of data from a memory location identified by the address in address packets 492 and 493, completes transmission of acknowledge packet 494 and transmits the retrieved data byte in a data packet 495.

On receipt of data packet 495, command executor 320 passes the data byte retrieved from data packet 495 on received data lines 321 to retrieve data router 312. In response to the data byte on received data lines 321, retrieved data router 312 writes the data byte into a byte assembly register (not shown) in system bus module 225 via data output lines 326. In the embodiment of FIG. 4I, host processor 281 expects a four byte word for each access to ROM. So, during transmission of data packet 495, slave serial port input-output circuit 340 increments the address received in address packets 492 and 493 and retrieves a second byte of data from EEPROM 390. On completion of transmission of data packet 495, slave serial port input-output circuit 230 transmits the second byte in data packet 496, and similarly third and fourth bytes in data packets 497 and 498.

The actions of command executor 320 and retrieved data router 312 in response to the second, third and fourth bytes are similar to that described above for the first byte. When all four bytes have been assembled in the byte assembly register, retrieved data router 312 drives a ROM ready signal SPROMRDY (not shown) active to system bus module 225 which then indicates that all four bytes are available to host processor 281.

Although the above description refers to a memory resource EEPROM 390, a different memory resource, such as a battery backed SRAM, a flash EEPROM or a EEPROM can also be used. Moreover, a ROM can also be used except that instruction router 311 will not permit writing to a ROM based on bit EEPROM of status register SPIOCAP.

Command signal SEEREQ (Table 1) that is generated by memory resource controller 316 is enabled when bit SEEPROM in register SPIOCAP is active and soft command enable bit SOFTCMDEN in register SPIOCAP is inactive. Command signal SEEREQ is issued when master serial EEPROM control register SEECTL (1Eh) is written or read, with the timer SEERDY expired and no other command in process.

When the request is from host processor 281, PCI signal TRDY# is not returned until the command cycle is completed. When the request is from sequencer module 223, the sequencer clock is stretched until the command cycle is completed.

Command signal SEEREQ results in access to slave serial EEPROM control register SEECTL on SSPIOC 254. SSPIOC 254 immediately provides an acknowledge packet for write or read comments, and in the case of reading also immediately sends back as a real data byte the contents of the slave serial EEPROM control register SEECTL; which includes the SEEPROM control signals and serial data out.

Slave serial EEPROM control register SEECTL on SSPIOC 254 provides the capability to control reading and writing an external serial 1-bit EEPROM device that contains a four pin interface (typical devices are NM93C06/C46/C56/C66 that are available from National Semiconductor). The SEEPROM is interconnected to the SSPIOC's memory port which may be shared with a ROM/EEPROM or board logic devices. The data and clock timing required by the external SEEPROM is provided by a software routine that matches the device's timing. Due to the slow clock rate, typically 1 MHz maximum, a hardware timer is provided in master serial EEPROM control register SEECTL to ease software development and provide portability. Table 8 shows the bit definition of register SEECTL.

TABLE 8

SEEPROM control register SEECTL
in memory resource controller 316 and
slave serial port input-output circuit 254

| Bit # | Definition when bit SOFTCMDEN is inactive in register SPIOCAP - Table 2) | SSPIOC 254 I/O pin |
|---|---|---|
| 7 | reserved = 0 | |
| 6 | reserved = 0 | |
| 5 | Serial EEPROM Mode Select bit SEEMS. | |
| 4 | Serial EEPROM Ready bit timer SEERDY. | |
| 3 | Serial EEPROM Chip Select bit SEECS. | SEECS |
| 2 | Serial EEPROM Clock bit SEECK. | MD2 |
| 1 | Serial EEPROM Data Out bit SEEDO. | MD1 |
| 0 | Serial EEPROM Data In bit SEEDI. | MD6 |

Serial EEPROM Mode Select bit SEEMS is a read/write bit which when set active, e.g. one, or set inactive, e.g. zero, causes memory resource controller 316 to send a request to SSPIOC254 for access to SEEPROM 380 or to board control logic 370. An active bit SEEMS reconfigures the SSPIOC memory port to allow SEEPROM control bit SEECTL to redefine pins MD[2.0] (see Table 8) and activate SEEPROM chip select bit SEECS for access of SEEPROM 380 or board control logic. Once SEEPROM mode select bit SEEMS is asserted, access to other resources of SSPIOC 254 such as a ROM and EEPROM is inhibited until SEEPROM mode select bit SEEMS is inactive.

Serial EEPROM Ready bit SEERDY is a read only bit that provides a hardware timer that is used instead of a software timer when accessing SEEPROM 380 or board control logic 370. Each time register SEECTL is written, bit SEERDY goes inactive and after a 800 ns or longer delay when access to SEEPROM 380 is completed becomes active, e.g. one. The state of bit SEERDY must be read active before continuing to the next step of addressing SEEPROM 380.

Serial EEPROM Chip Select bit SEECS is a read/write bit that is used to control SEEPROM chip select pin SEECS of SSPIOC 254. When SEEPROM chip select bit SEECS to active, e.g. one, can drive signal active on pin SEECS only if bit SEEMS is active. Pin SEECS can also be used to qualify the SSPIOC memory interface lines as BRDCTL signals when both SEEPROM 380 and board control logic 370 are present. Pin SEECS requires an external pull down resistor if SEEPROM 380 is present.

Serial EEPROM clock bit SEECK is a read/write bit that controls the state of pin MD2 which is connected to the serial data clock input pin of SEEPROM 380.

Serial EEPROM Data Out bit SEEDO is a read/write bit that controls the state of pin MD1. Pin MD1 is connected to the data input pin of SEEPROM 380. When bit SEEDO and SEEMS are active, e.g. one, pin MD1 is set to a high level for writing a bit into SEEPROM 380. Bit SEEDO can be used with other resources in addition to SEEPROM 380. For example bit SEEDO can be used as a fourth bit in addition to three board data bits BRDDAT[7:5] that are listed in Table 5 for example to write a nibble of data into a four bit register in board control logic 370.

Serial EEPROM Data In bit SEEDI is a read only bit that is used to access data from SEEPROM 380. The value of bit SEEDI reflects the value of pin MD0 which is connected to the data output terminals of SEEPROM 380 when bit SEEMS is active.

One set of bit definitions for a master serial EEPROM control register SEECTL and a slave serial EEPROM control register SEECTL are listed in "AIC-7870 PCI Bus Master Single-Chip SCSI Host Adapter Data Book-Preliminary" available from Adaptec, Inc. of Milpitas, Calif.

A module of host adapter 240 issues an internal signal to access SEEPROM 380 by setting a serial EEPROM mode select bit SEEMS in master serial EEPROM control register SEECTL. In response to a read or write to an address of a master serial EEPROM control register SEECTL in memory resource controller 316, instruction router 311 passes corresponding instruction signals to memory resource controller 316.

Instruction router 311 also drives a signal SEEBRDRDY inactive for at least 800 nanoseconds, and then continues to drive signal SEEBRDRDY inactive until a signal from memory resource controller 316 indicates completion of the access to SEEPROM 380. In response to a read or write internal signal for access to SEEPROM 380, the actions of memory resource controller 316, command executor 320 and slave serial port input-output circuit 254 are similar to the actions described above in reference to read and write for master board control register BRDCTL.

In one embodiment, master serial port input-output circuit 210 and serial port 230 were implemented using the VERILOG code of appendix C and microfiche appendix A in particular, the VERILOG subroutines shown in Table 9. The VERILOG code in appendix C and appendix A microfiche was synthesized using Synopsys compiler version 3.1, that is available from Synopsys of Mountain View, Calif. to generate a gate net list used in a host adapter integrated circuit implemented in one embodiment as 0.8 micron standard cell CMOS integrated circuit.

The VERILOG subroutines shown in Table 9 utilize and generate signals that are specific to a particular embodiment of host adapter 240. Tables 10 and 11 define signals to and from data transfer circuit 220 and serial port 230 respectively so that those skilled in the art can implement the invention in other embodiments.

TABLE 9

VERILOG Code used in Modules of Host Adapter

| Modules of Host Adapter | VERILOG Code of Appendix C and Microfiche Appendix A |
|---|---|
| Software Resource Controller 314 | softctl, softcntrl, softcmdsm, softregs, softtimer, spfifo, spfifoctl, spfiforegs |
| Hardware Resource Controller 313 | brdcntrl, brdctlsm, sbwcsm, sbwcctl, led, stpwr |
| Memory Resource Controller 316 | romctl, spromctl, seecntrl, seectlsm spromsm |
| Initialization Resource Controller 315 | eism, iddatestat, sprstctl |
| Instruction Router 311 | sprw, sprwctl, spstretch, spclkgen and sprwdec |
| Retrieved Data Router 312 | sprdmux |
| Serial Port, Byte Generator 510 | sparbomux |
| Serial Port, Converter 520 | spcnt, spctl, spctlsm, spcntrl and spshft |

TABLE 10

Signals to Data Transfer Circuit from Serial Port

| Signal Name in VERILOG Code | Function | From | To |
|---|---|---|---|
| berren | generate parity error to exercise parity checking circuit | System bus module 225 | Serial port 230 |
| chprstb | reset chip (initialize) (self resetting) | System bus module 225 | MSPIOC 210 and serial port 230 |
| clrparerr_ | clear parity error that is currently being reported (self resetting) | system bus module 225 | serial port 230 |
| crbusy | part of data transfer bus 226 is being read | retrieved data router 312 | Sequencer Module 223 or system bus module 225 |
| clk40 | 40 MHz clock for timing, can stay high to save power in power down mode | Sequencer module 223 | MSPIOC 210 and serial port 230 |

TABLE 10-continued

Signals to Data Transfer Circuit from Serial Port

| Signal Name in VERILOG Code | Function | From | To |
|---|---|---|---|
| cdadr_ [7:0] | part of data transfer bus 226, destination write address | Sequencer Module 223 or system bus module 225 | instruction router 311 |
| cddat [7:0] | part of data transfer bus 226, destination write data | Sequencer Module 223 or system bus module 225 | MSPIOC 210 and serial port 230 |
| cdwen_ | data transfer bus 226, destination write enable | Sequencer module 223 or system bus module 225 | instruction router 311 |
| csadr_ [7:0] | data transfer bus 226, source address | Sequencer module 223 or system bus module 225 | retrieved data router 312 |
| csren_ | data transfer bus 226 source read enable drives CSDAT | Sequencer module 223 or system bus module 225 | retrieved data router 312 |
| ltstsigi [7:0] | LED test bus for test configuration signals | Input output bus module 221 | Soft resource controller 314 |
| mparcken | enables parity checking of received packets | System bus module 225 | Serial port 230 |
| pac2spio | Sequencer is in control of bus 226 | Sequencer module 223 | Instruction Router 311 |
| por | power on reset | System bus module 225 - from PCI reset or chprstb | Initialization Resource Controller 315, MSPIOC 210, serial port 230 |
| rstib_ | PCI reset to initialize various things | System bus module 225 | Initialization Resource Controller 315 MSPIOC 210 serial port 230 |
| sled_ | scsi bus busy signal from SCSI led logic | Input-output bus module 221 | Hardware Resource Controller 313 |
| romdec_ | ROM decode goes true when bits present, enable are active and address is valid. | System bus module 225 | Instruction Router 311 |
| romadr [15:0] | Address of ROM location to be read. | System bus module 225 | Instruction Router 311 |
| romwr | ROM write command | System bus module 225 | Instruction Router 311 |
| stpwenb | SCSI power down bus termination (control bit 0) | Input-Output bus module 221 | Instruction Router 311 |

TABLE 10-continued

Signals to Data Transfer Circuit from Serial Port

| Signal Name in VERILOG Code | Function | From | To |
|---|---|---|---|
| stpwlvlb | SCSI power down bus termination level (control bit 1) | Configuration Register in System bus module 225 | Instruction Router 311 |
| iddat | new device identification | serial port 230 | System bus module 225 |
| csdat [7:0] | part of data transfer bus 226, source read data | retrieved data router 312 | Sequencer module, 223 system bus module 225 |
| eepromen | EEPROM enable | serial port 230 | register SPIOCAP |
| idldrdy | Indicates when byte IDDAT has been stored in register DEVICED1 following a reset | Hardware resource controller 313 | System bus module 225 |
| noack | Send target abort to host processor | serial port 230 | System bus module 225 |
| romrden | ROM present enable | serial port 230 | SPIOCAP register and system bus 225 |
| spromrdy | 4 bytes of ROM data is available for host | memory resource controller 316 | system bus module 225 |
| sspiocps | SSPIOC is present | serial port 230 | register SPIOCAP |
| seems | SEEPROM mode select signal; only SEEPROM and BRDCTL operations allowed (no access to ROM, LED, EEPROM etc.) | Memory resource controller 316 | Instruction router 311 |
| spromclk_ | Clocks each byte from ROM into a 32 bit holding register | Memory resource controller 316 | System bus module 225 |
| spioparerr | Parity error detected in packet received on line SPIO- | Serial port 230 | System bus module 225 |
| spbrden | Board enable | Serial port 230 | Register SPIOCAP |
| spseeen | SEEPROM enable | Serial port 230 | Register SPIOCAP |
| spiobsy_ | Serial port access in progress | Host adapter modules 313, 314, 315 and 316 | Instruction router 311 |
| stretchseq | Stretch clock of cycles, sequencer module 223 | Instruction Router 311 | Sequencer Module 223 |
| spioackdet | Acknowledge packet detected - continue command cycle till acknowledge packet completed | Instruction router 311 | Host adapter modules 313, 314, 315 and 316 |
| seebrdrdy | Board control or SEEPROM related command cycles have completed | Instruction router 311 | System bus module 225 and sequencer module 223 |

TABLE 11

Signals to Serial Port from Data Transfer Circuit

| Signal Name in VERILOG code | Function | From | To |
|---|---|---|---|
| ackdet | Start of acknowledge packet detected, | Serial port 230 | Master serial port input-output circuit 210 |
| xbsy | X Resource controller is currently active and service for a command signal is currently in progress. | Resource controller | Instruction router 311 |
| xread | Command executor 320 is to read data from resource X. | X Resource controller | Command executor 320 |
| xreq | Service request for resource X. | X Resource controller | Command executor 320 |
| xsend | Command executor 320 is to write data to resource X. | X Resource controller | Command executor 320 |
| chprstbsy | Chip reset is currently active | Initialization resource controller 315 | Command executor 320 |
| chprstreq | Service request for chip reset | Initialization resource controller 315 | Command executor 320 |
| clk40b1 | Clock signal for various parts of host adapter 240 | | Command executor 320 |
| eiread | Command executor 320 is to read initialization packets from line SPIO-; this command signal triggered by signal RST# | Initialization resource controller 315 | Command executor 320 |
| ledstate | State of LED | LED controller in hardware resource controller 313 | command executor 320 |

TABLE 11-continued

Signals to Serial Port from Data Transfer Circuit

| Signal Name in VERILOG code | Function | From | To |
|---|---|---|---|
| noack | Timeout before receipt of first bit of an acknowledge packet | Command executor 320 | MSPIOC 210 |
| rstspios_ | Power on reset | Initialization resource controller 315 | Command executor 320 |
| selroma0 | Select first ROM address | Memory resource controller 316 | Command executor 320 |
| selroma1 | Select second ROM address | Memory resource controller 316 | Command executor 320 |
| stpe | SCSI termination power enable | Hardware resource controller 313 | Command executor 320 |
| stpl | SCSI termination power level | Hardware resource controller 313 | Command executor 320 |
| cddat | Data for a destination address | Data transfer bus 226 | Command executor 320 |
| spiowdat | Data to be written into soft resource register 341 | Data transfer bus 226 | Soft resource controller 341 |
| romadr | Address of memory location to be accessed in ROM | Memory resource controller 316 | Command executor 320 |
| xack | Resource X command acknowledge has been detected | Command executor 320 | Various resource controllers in master serial port input-output circuit 210 |
| spnakabrt | noack signal to system abort logic | Command executor 320 | System bus module 225 |

Signal xbsy remains true until the current command service is completed. Examples of signal xbsy include brdbsy, chprstbsy, rombsy, sbwcbsy, seebsy, softbsy and spiobsy.

Signal ackdet indicates that a command packet and any additional packets were successfully sent to slave serial port input-output circuit 254.

Command signal xread triggers signal readspio. Examples of signal xread include brdread, romread, sbwcread, seeread softread and eiread.

Examples of signal xreq include brdreq, chprstreq, ledreg, romreq, seereq, softreq and stpwreq.

Command signal xsend triggers signal sendbyte. Examples of signal xsend include brdsend, romsend, seesend and softsend.

Examples of command signal xack include: brdack, chprstack, ledack, romack, seeack, softack and stpwack.

To summarize, in response to an instruction signal from a module of host adapter 240, master serial port input-output circuit 210 drives a command signal active and in response to the active command signal, command executor 320 generates a command packet and transmits the command packet serially on a single pin 241 that is connected to a slave serial port input-output circuit 254. Hence, host adapter 240 accesses a resource connected to slave serial port input-output circuit 254 by use of just one pin 241. So, host adapter 240 can perform read and write operations to an external register or memory, in addition to turning on and off various external resources, using a serial port 230 with a serial port input-output bus 246 that interfaces to other portion of host adapter 240 and pin 241 that interfaces to the external registers or memory.

Host adapter 240 does not need pins dedicated to access certain resources that were otherwise necessary in prior art host adapters to access various resources for example EEPROM 390. The use of only one pin 241 for serial communication with slave serial port input-output circuit 254 is the smallest possible number of pins for serial communication, and so this invention reduces costs as noted above.

In response to an active command signal on one of serial port command lines 323, a byte generator 510 (FIG. 5) in command executor 320 generates a byte to be transmitted, such as a command byte 410 (FIG. 4A). Command byte 410 includes four command bits C0–C4 preceded by a read-write bit R and followed by two data bits D0–D1. The specific order of these bits is not important to practicing this invention. Table 12 lists the command byte format used by one embodiment of byte generator 510. Byte generator 510 is sometimes referred to herein as a command generator.

TABLE 12

| Signal on command request line | Command Byte Format (FIG. 4A) | | | | Additional Bytes to be sent | Response Bytes |
|---|---|---|---|---|---|---|
| | Bit R 0 = Write 1 = Read | Bits | Bits | | | |
| COMMANDREQ_ I (FIG. 6) [PRIORITY 1 = Highest] | Read | C0–C4 | D1 | D0 | | |
| RST# [1] | | NONE when RST# becomes inactive, command is automatically performed | | | 0 | 2 (IDDAT/ ESTAT) |
| CHPRSTREQ [2] | | All 11 bits zero | | | one bit of zero after 11 zero bits | 0 |
| ROMREQ [3] | 1 | 03h | A17 | A16 | 2 addr | 4 |
| | 0 | 04h | A17 | A16 | 2 addr and 1 data | 0 |
| BRDREQ [4] | 1 | 07h | 0 | 0 | 0 | 1 |
| | 0 | 07h | 0 | 0 | 1 data | 0 |
| SEEREQ [5] | 1 | 06h | 0 | 0 | 0 | 1 |
| | 0 | 06h | 0 | 0 | 1 data | 0 |
| STPWREQ [6] | 0 | 02h | (a) | (b) | 0 | 0 |
| SOFTREQ [7] | (d) | 10-1Fh | (d) | (d) | (d) | (d) |
| SOFTREQ [7] (test mode) | 0 | 01h | 1 | 0 | 0 (e) | 0 |
| SOFTREQ [7]1 (SPIOSTAT) | 10h | 0 | 1 | 0 | 1 | |
| | 0 | 10h | 0 | 0 | 1 data | 0 |
| SOFTREQ [7] | 1 | 11h | 0 | 1 | 0 | 1 |

TABLE 12-continued

| Signal on command request line | Command Byte Format (FIG. 4A) | | | | | |
|---|---|---|---|---|---|---|
| | Bit R 0 = Write 1 = Read | Bits C0–C4 | Bits D1 | D0 | Additional Bytes to be sent | Response Bytes |
| COMMANDREQ_I (FIG. 6) [PRIORITY 1 = Highest] | | | | | | |
| (SPIO ERREGEN) | 0 | 11h | 0 | 0 | 1 data | 0 |
| LEDREQ [8] | 0 | 01h | 0 | (c) | 0 | 0 |

Figure 5:
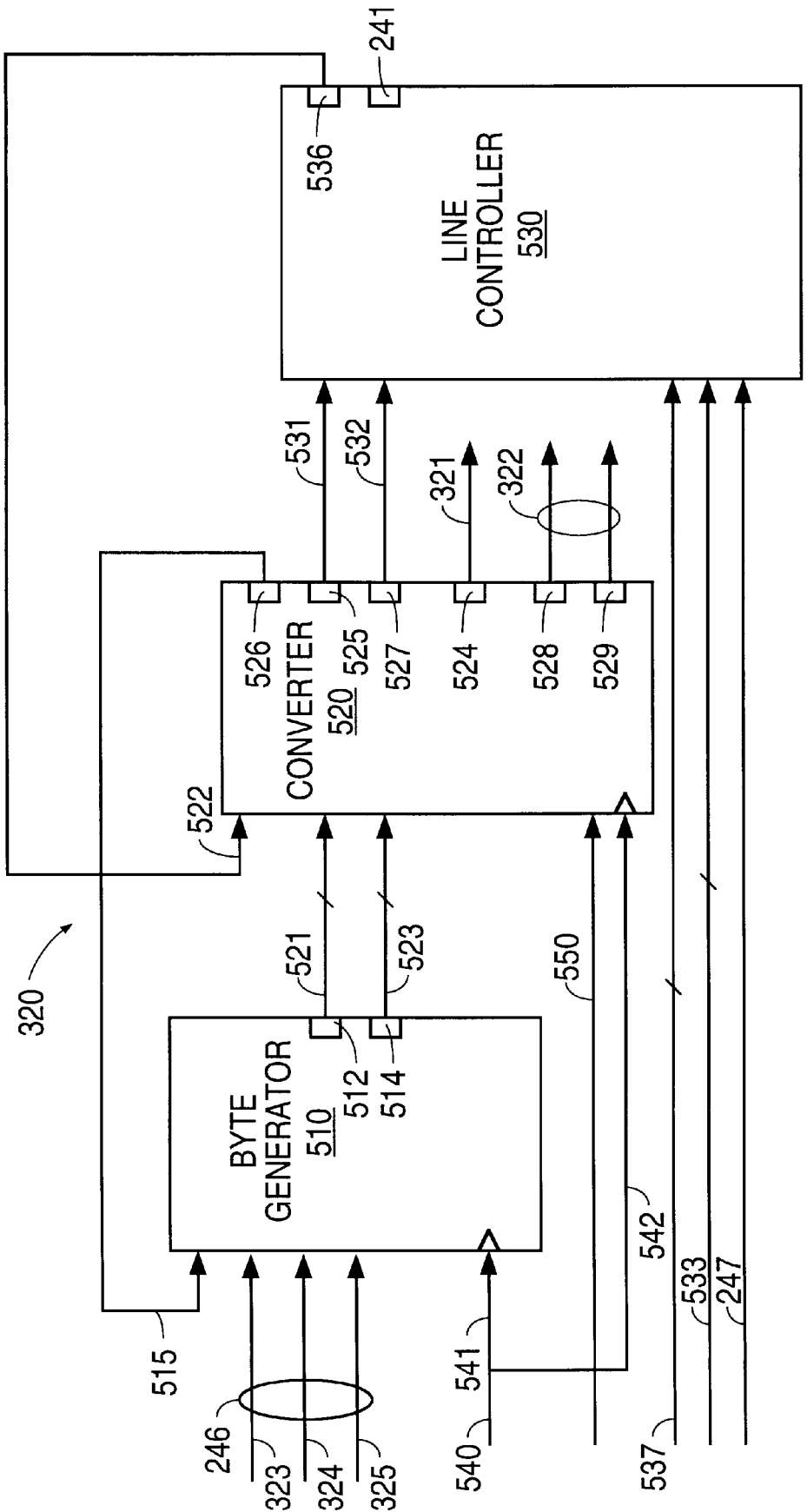
FIG. 5 illustrates modules of the serial port of FIG. 3.

(a) state of bit STPWEN;
(b) state of bit STPWLEVEL;
(c) change in status of input-output bus 284 if bit DIAGLEDEN is a zero or state of bit DIAGLEDON if bit DIAGLEDEN is one;
(d) to be defined at time of use;
(e) a real-time internal signal of data transfer circuit 220 is passed to pin 241;

In response to an active write signal on a command send line COMMANDSEND_I in a set of command send lines COMMANDSEND_1, COMMANDSEND_2, . . . COMMANDSEND_N, within serial port command bus 323, command send logic element 620 (FIG. 6), which in this embodiment is a logic OR gate, drives a send byte signal SENDBYTE active on one of control terminals 512 that are connected to input control bus 521 of converter 520 (FIG. 5). The signals on command send line COMMANDSEND_I can be, for example one of signals XSEND, such as board send signal BRDSEND or ROM send signal ROMSEND.

When a resource controller, such as a hardware resource controller 313 (FIG. 3), drives a signal xREAD on a command read line COMMANDREAD_I, the same resource controller also drives a signal xREQ active on one of command request lines COMMANDREQ_I in a set of command request lines COMMANDREQ_1 . . . COMMANDREQ_N within serial port command bus 323. The set of command request lines are input lines to command prioritizer 630. If only one signal on one of command request lines COMMANDREQ_I is active, command prioritizer 630 drives a signal XACK active on a command acknowledge line COMMANDACK_I, in a set of command acknowledge lines COMMANDACK_1 . . . COMMANDACK_N and also drives a signal active on a command pending line COMMANDPEND_I in a set of command pending lines COMMANDPEND_1, . . . COMMANDPEND_N.

If more than one line in the set of command request lines carries an active signal when a signal on a command request line goes active, command prioritizer 630 (FIG. 6) drives active signals on the command acknowledge line and the command pending line corresponding to the highest priority command request line that has an active signal. Assuming that among the command request lines that carry an active signal, the command request line COMMANDREQ_I has the highest priority, command prioritizer 830 drives a signal active on command acknowledge line COMMANDACK_I that is part of status bus 322 and a signal active on a command pending line COMMDPEND_I. Command prioritizer 630 prioritizes the command request lines in the order of decreasing priority as listed in TABLE 12 above and processes any remaining active command signals sequentially according to the priority of the active command signal.

In response to an active signal on a command pending line COMMANDPEND_I, command encoder 640 supplies an 8-bit command code on command code bus CMDCODE to extension multiplexer 670. Specifically, each active signal on a command pending line COMMANDPEND_I to command encoder 640 addresses a different location in a command look-up table. The byte passed through extension multiplexer 670 is determined by the signal on a port busy line PORTBUSY that is the output line of command busy logic element 650 which in turn is driven by the signals on command busy lines COMMANDBSY_1 . . . COMMANDBSY_N. For active signals LEDREQ or STPWREQ, command encoder 640 uses a LED state signal LEDSTATE, to encode bit D0, or the SCSI termination power level signal STPL and the SCSI termination power enable signal STPE respectively to encode bits D0 and D1 of the 8-bit command code. In the embodiment, command busy logic element 650 is a logic OR gate.

Since initially, all of the signals on the command busy lines are inactive, extension multiplexer 670 passes the signals on command code bus CMDCODE as the signals on hardware command data bus HWCDAT that is a first input bus of write data multiplexer 680. The byte passed through write data multiplexer 680 is determined by the signal on soft cycle line SOFT that is the output of soft data multiplexer 690 that is a logic OR gate in this embodiment. Since initially, signals SOFTACK and SOFTBSY of this embodiment on command acknowledge line COMMANDACK_N and command busy line COMMANDBSY_N are inactive, the signal on soft cycle line SOFT is also inactive and write data multiplexer 680 passes the signals on hardware command data bus HWCDAT as the signals on shift out bus SHFTOUT that is coupled to shift-out byte terminals 514.

In response to an active send byte signal SENDBYTE, on an input control bus 521 (FIG. 5) that is coupled to control terminals 512, a packet input-output controller in converter 520 formats the byte received on parallel bus 523, that is coupled to data terminals 514, into a packet and transmits the packet serially on serial data terminal 527 that is connected to serial data line 532 of line controller 530. Simultaneously, a shifter state machine in converter 520 drives a control signal on drive terminal 525 that is connected to a drive line 531 of line controller 530.

In response to an active signal on drive line 531, line controller 530 passes the signal on serial data line 532 to pin 241.

When the signal on drive line 531 goes inactive, line controller 530 stops driving the signal on pin 241 and couples pin 241 via an input buffer (not shown in FIG. 5) to serial data received terminal 536 that is connected to a serial data received line 522 of converter 520.

In response to an active read signal on a command read line COMMANDREAD_I in a set of command read lines COMMANDREAD_1, COMMANDREAD_2 . . . COMMANDREAD_N within serial port command bus 323, command read logic element 610 drives a read serial port signal READSPIO active on one of control terminals 512 coupled to converter 520 (FIG. 5). A read signal can be, for example one of resource read signals xREAD, such as board read signal BRDREAD and ROM read signal ROMREAD. In this embodiment, command read logic element 616 is a logic OR gate.

In response to an active read serial port signal READSPIO, a packet controller in converter 520 retrieves a byte from a packet of data received serially on serial data line 522 and supplies the retrieved byte on received data terminals 524 that are coupled to received data bus 321 of command executor 320 (FIG. 3).

If the received packet is an acknowledge packet, during reception of the packet converter 520 drives an acknowledge detect signal ACKDET active on transmit status terminal 526 that is coupled to a transmit status line 515 of byte generator 510. In response to an active acknowledge detect signal ACKDET, byte generator 510 disables an acknowledge timer. If the acknowledge timer times out, byte generator 510 drives a no-acknowledge signal NOACK active on status bus 322 to abort the command cycle currently being executed.

Figure 6A:
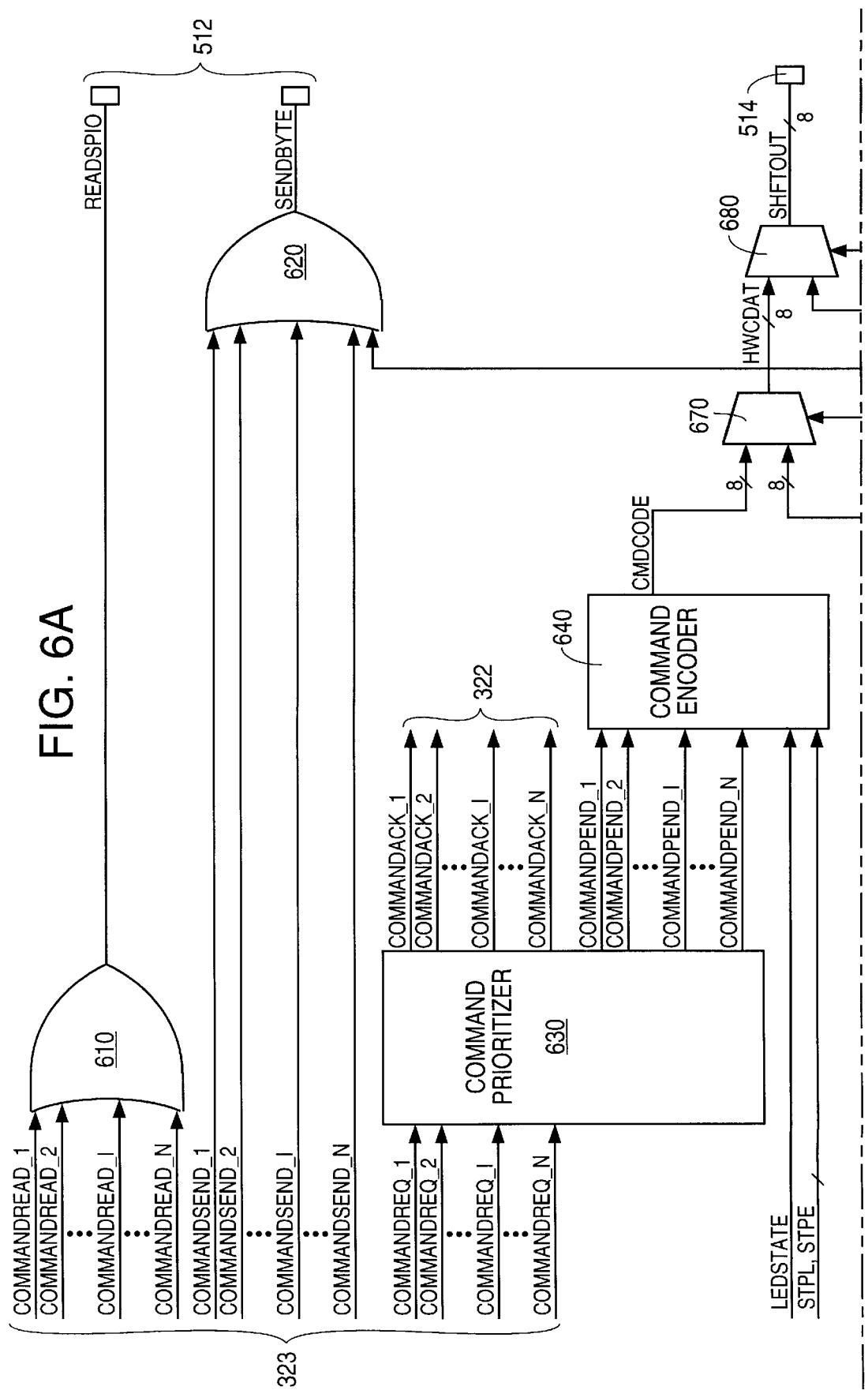
FIG. 6 (including FIGS. 6A and 6B) shows an illustrative low level block diagram for the byte generator of FIG. 5.

If during the current command cycle, additional bytes are to be transferred, such as a data byte for a byte write command cycle, the respective resource controller, such as hardware resource controller 313 drives a signal SELBYTE active on select byte line 661 to indicate to command cycle extender 660 which of two address bytes on serial port address bus 324 and the data byte on serial port data bus 325 is to be passed to extend command bus EXTCMD (FIG. 6). In such a case, extension multiplexer 670 supplies the signals on extension command bus EXTCMD to hardware command data bus HWCDAT because port busy line PORTEUSY has an active signal.

The active signal on port busy line PORTBUSY is generated due to an active signal on one of command busy lines COMMANDBSY_I related to the command cycle currently in progress. Write data multiplexer 680 passes the data byte or the address byte, that is selected by the signal on select byte line SELBYTE, to shift-out byte terminals 514. Converter 520 formats the selected byte into a packet which is transmitted by line controller 530 in a manner similar to that described above for transmission of the command byte.

Instead of selecting a data byte from serial port data bus 325, byte generator 510 can supply a data byte from serial port write data bus SPIOWDAT when the current command cycle relates to a soft command. For a soft command, when a signal on command acknowledge line COMMANDACK_N and on command busy line COMMANDBSY_N goes active, soft logic element 690 drives a signal active on soft cycle line SOFT that in turn causes write data multiplexer 680 to couple the serial port write data bus SPIOWDAT to the shift-out byte terminals 514.

In one embodiment, in response to an active signal on a parity error check enable line in error control bus 550, converter 520 checks the parity of every packet received from line controller 530 and in case of an error, drives a signal active on a parity error terminal 529 that is connected to status bus 322. In response to an active signal on a clear error flag line in error control bus 550, converter 520 drives a signal inactive on parity error terminal 529 that is coupled to a line in status bus 322. Moreover, during execution of a command cycle, if converter 520 times out, for example due to non-receipt of an acknowledge packet, converter 520 drives a signal active on a command error terminal 528 active that is connected to status bus 322.

One embodiment of converter 520 includes a shifter state machine 720 (FIG. 7) that creates a number of signals that control operation of a packet controller 740 that is also included in converter 520. In response to an active signal SENDBYTE on input control bus 521 as illustrated in FIG. 9A at time T1, shifter state machine 720 transitions from an idle state 810 (FIG. 8) along a branch 812 to a send state 820 and drives a serial port enable signal SPIOEN active on one of packet controller terminals 726 that are connected to packet controller bus 742 of packet controller 740. In response to an active serial port enable signal SPIOEN, packet controller 740 passes a byte of data received on parallel bus 523 serially out on serial data terminal 527, with a start bit preceding the byte and a parity bit and a stop bit following the byte, which is passed by line controller 530 (FIG. 5) to pin 241 (FIG. 3) as illustrated in FIG. 9A between times T2 and T3.

Shifter state machine 720 also drives a counter-on signal CNTRON (FIG. 9A) active on counter terminal 723 (FIG. 7) that is connected to a counter input line 713 of counter 710. Counter 710 increments a count as long as a counter-on signal CNTRON is active at a rising edge of clock signal CLK40B. Counter 710 supplies various count signals, CNT0, CNT8, CNT9 and CNTA after 0, 8, 9 and 10 clock cycles respectively for which counter-on signal CNTRON is active.

The signals that trigger or are driven by shifter state machine 720 are listed in TABLE 13.

TABLE 13

| SIGNAL | FUNCTION |
|---|---|
| NOACK | No ack packet received within a predetermined time period for an acknowledge window timeout |
| EITO | No initialization information received |
| READSPIO | To read information on serial port pin |
| CNTRON | Allows counter to increment |
| ACKDET | Ack packet has been received |
| STRTDET | Start bit has been received |
| SETNOACK | Drive signal NOACK active at rising edge |
| ENEITO | Enable signal EITO at rising edge |
| CNT0 | Counter has not yet incremented |
| CNT8 | Counter has incremented 8 times |
| CNT9 | Counter has incremented 9 times |
| CNTA | Counter has incremented 10 times |
| SENDBYTE | To send a byte |
| BYTESENT | Byte has been sent |
| SPIOEN | Enable output on serial port pin |
| TO | ((ENEITO) and (CNT0)) or ((ENEITO)) and ((CNTA)) |
| ACKWIN | Wait window for ack packet |
| SETEITO | Drive signal EITO at rising edge. |
| STRTWIN | Wait window for start bit |

Figure 8:
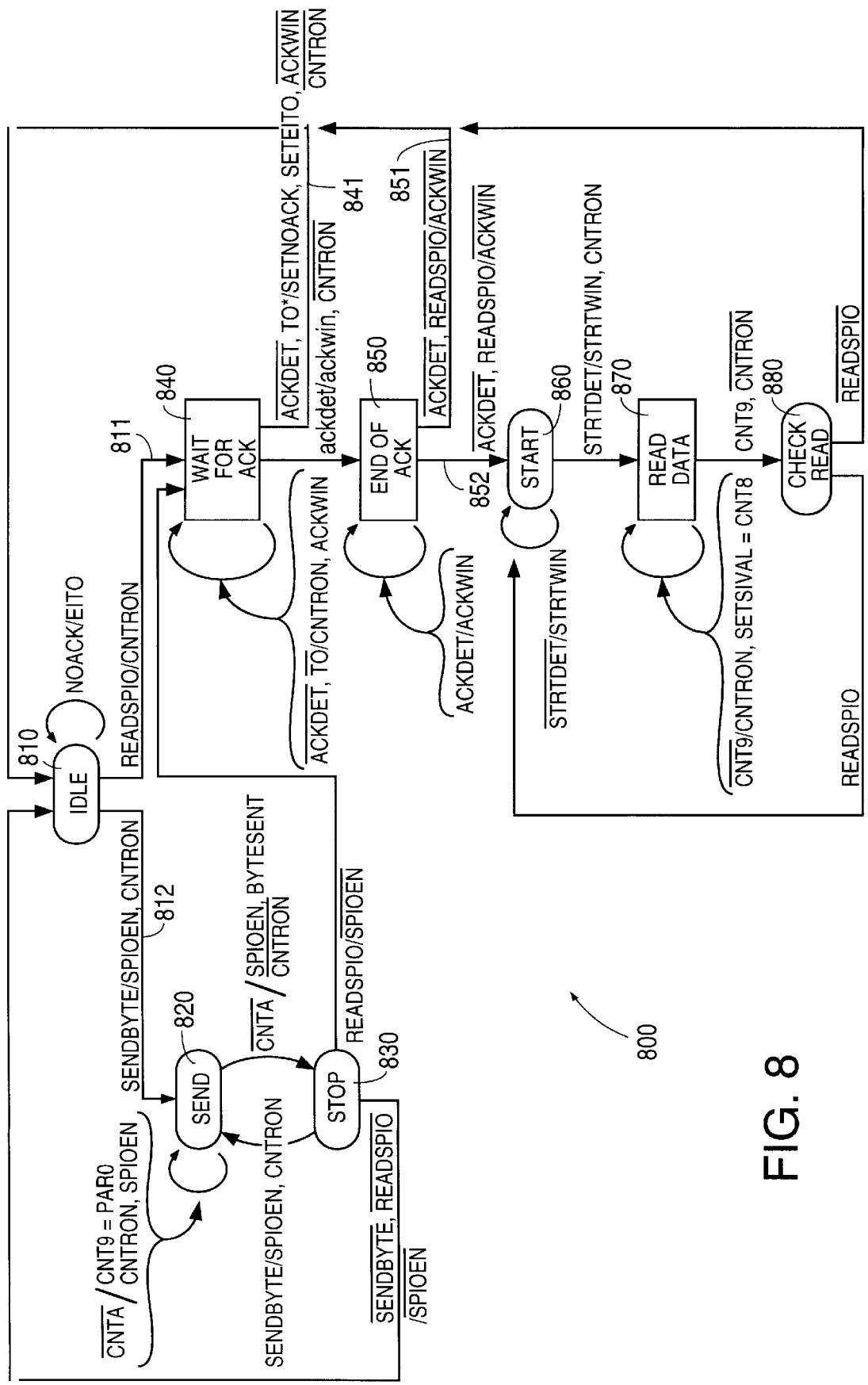
FIG. 8 shows an illustrative state diagram for the shifter state machine of FIG. 7.
Figures 9A, 9B:
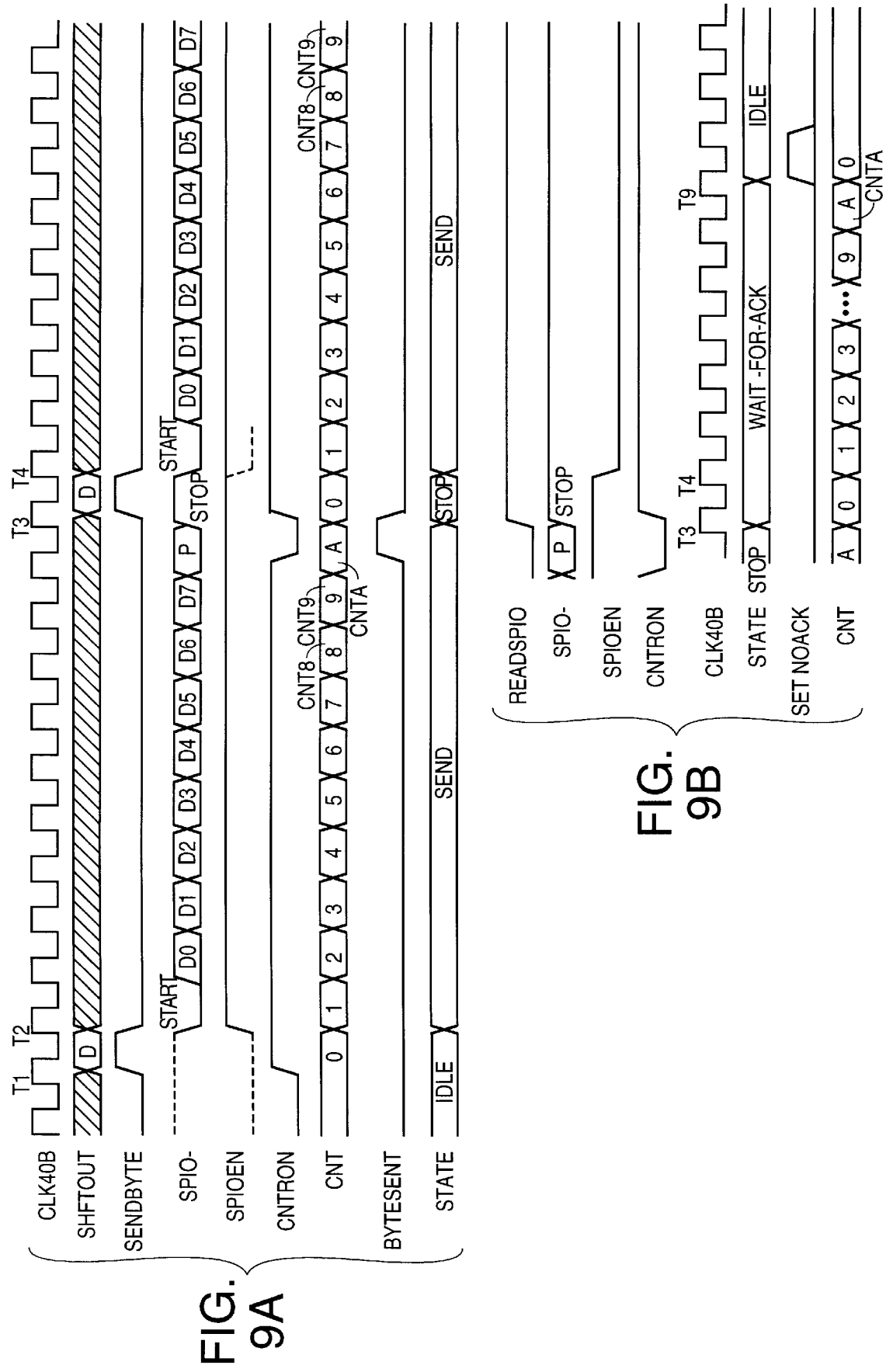
FIGS. 9A–9C illustrate the timing of signals controlled by the shifter state machine of FIG. 8.

In FIG. 8 when a number of signals are required for a transition or alternatively a number of signals are driven active, the signals are listed separated by a comma ",". When signals are connected by a slash "/" the signals preceding the slash are triggers for shifter state machine 720 to drive the signals following the slash. Also when two signal names are connected by an "=", a signal preceding the "=" goes active when the signal following the "=" goes active.

In this embodiment, when counter signal CNT9 from counter 710 goes active a generated output parity bit PARO is shifted out to line SPIOO, by packet controller 740 and shifter state machine 720 transitions from send state 820 to stop state 830 (FIG. 8). During transition, shifter state machine 720 drives counter-on signal CNTRON inactive, continues to drive serial port enable signal SPIOEN active. In response to active serial port enable signal SPIOEN and active byte send signal BYTESENT, packet controller 740 clocks out a stop bit on pin 241 to complete the 11 bits for a packet. In response to inactive counter-on signal CNTRON, counter 710 drives counter signal CNTA inactive and counter signal CNT0 active.

Depending on the command cycle being executed, if send byte signal SENDBYTE is active when shifter state machine 720 is in stop state 830, for example, to write a data packet 462 (FIG. 4F), shifter state machine 720 transitions back to send state 820 (FIG. 8). During the transition, shifter state machine 720 drives serial port enable signal SPIOEN active and also drives counter-on signal CNTRON active to restart counter 710 (FIG. 7).

In stop state 830, if a read serial port signal READSPIO is active on input control bus 521 (FIG. 5), shifter state machine 720 transitions to the wait-for-ack state 840, at time T3 (FIG. 9B).

Shifter state machine 720 can also transition from idle state 810 directly to wait-for-ack state 840 via branch 811 if the read serial port signal READSPIO is active, for example, immediately after reset, to receive device identification byte IDDAT and external resource status byte ESTAT.

Figure 7:
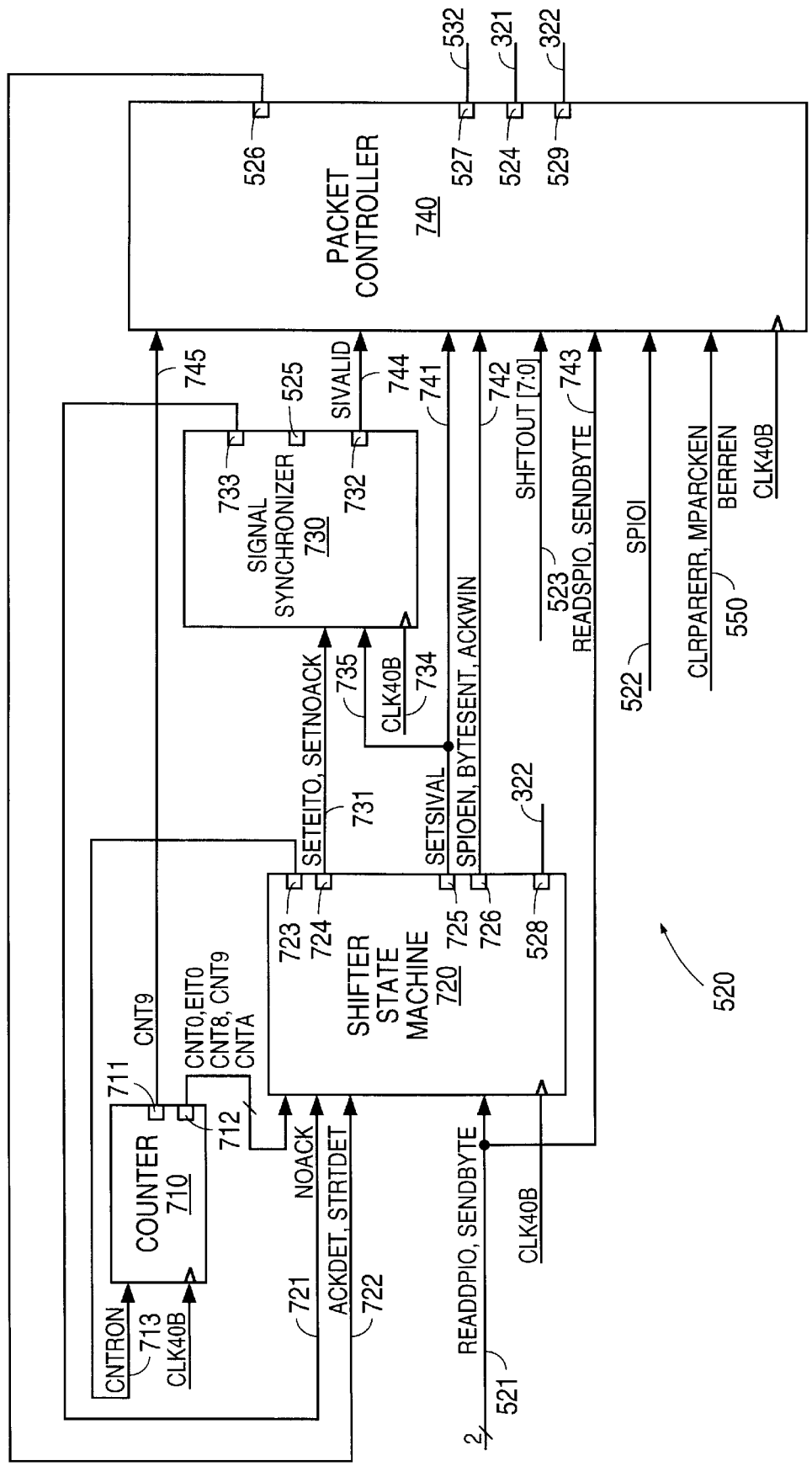
FIG. 7 shows an illustrative low level block diagram of the converter of FIG. 5.

While shifter state machine 720 is in wait-for-ack state 840, shifter state machine 720 drives an acknowledge window signal ACKWIN active on packet controller terminal 726 (FIG. 7). In response to the active acknowledge window signal ACKWIN, packet controller 740 waits for an active acknowledge detect signal ACKDET that indicates receipt of a first bit of an acknowledge packet on serial data receive line 522. In response to an active acknowledge detect signal ACKDET, shifter state machine 740 transitions from wait-for-ack state 840 (FIG. 8) to end-of-ack state 850 and drives signal CNTRON inactive.

While in wait-for-ack state 840, if shifter state machine 720 times out, e.g. after ten clock cycles, shifter state machine 720 transitions via branch 841 to idle state 810 and drives set no acknowledge signal SETNOACK, set initialization timeout signal SETEITO active, counter-on signal CNTRON inactive, and acknowledge window signal ACKWIN inactive during the transition. In response to an active set no acknowledge signal SETNOACK, signal synchronizer 730 (FIG. 7) drives a no acknowledge signal active on status terminal 733 that is connected to a status line 721 of shifter state machine 720, at the next rising edge of a clock signal CLK40B that is a buffered version of clock signal CLK40 driven by oscillator 260 (FIG. 2A).

In end-of-ack state 850, shifter state machine 720 continues to drive acknowledge window signal ACKWIN active until acknowledge detect signal ACKDET goes inactive. When packet controller 740 receives the last bit of the acknowledge packet, also referred to as the third bit, packet controller 740 drives the acknowledge detect signal ACKDET inactive.

In response to an inactive acknowledge detect signal ACKDET, if read serial port signal READSPIO is inactive, shifter-state machine 720 drives acknowledge window signal ACKWIN inactive and transitions to idle state 810 via branch 851. Branch 851 is a normal transition for shifter state machine 720 for certain command cycles, in which no further bytes are to be received, such as the bit write command cycles triggered by the command signals STPWREQ and LEDREQ.

Figure 4G:
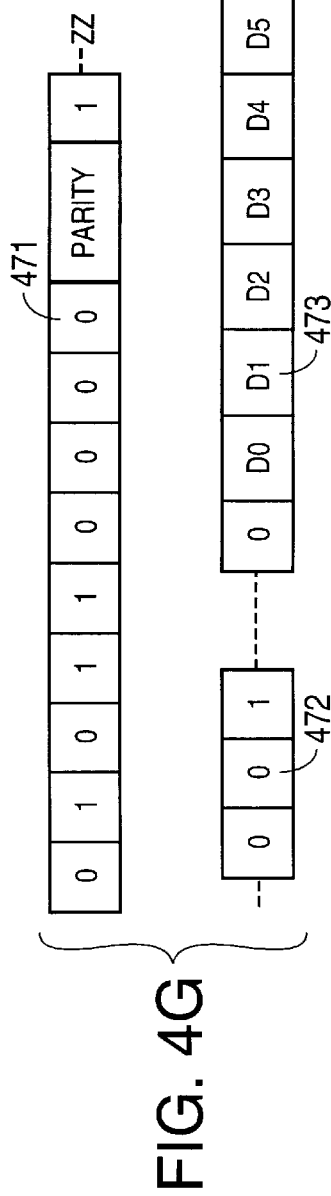
Figure 4H:
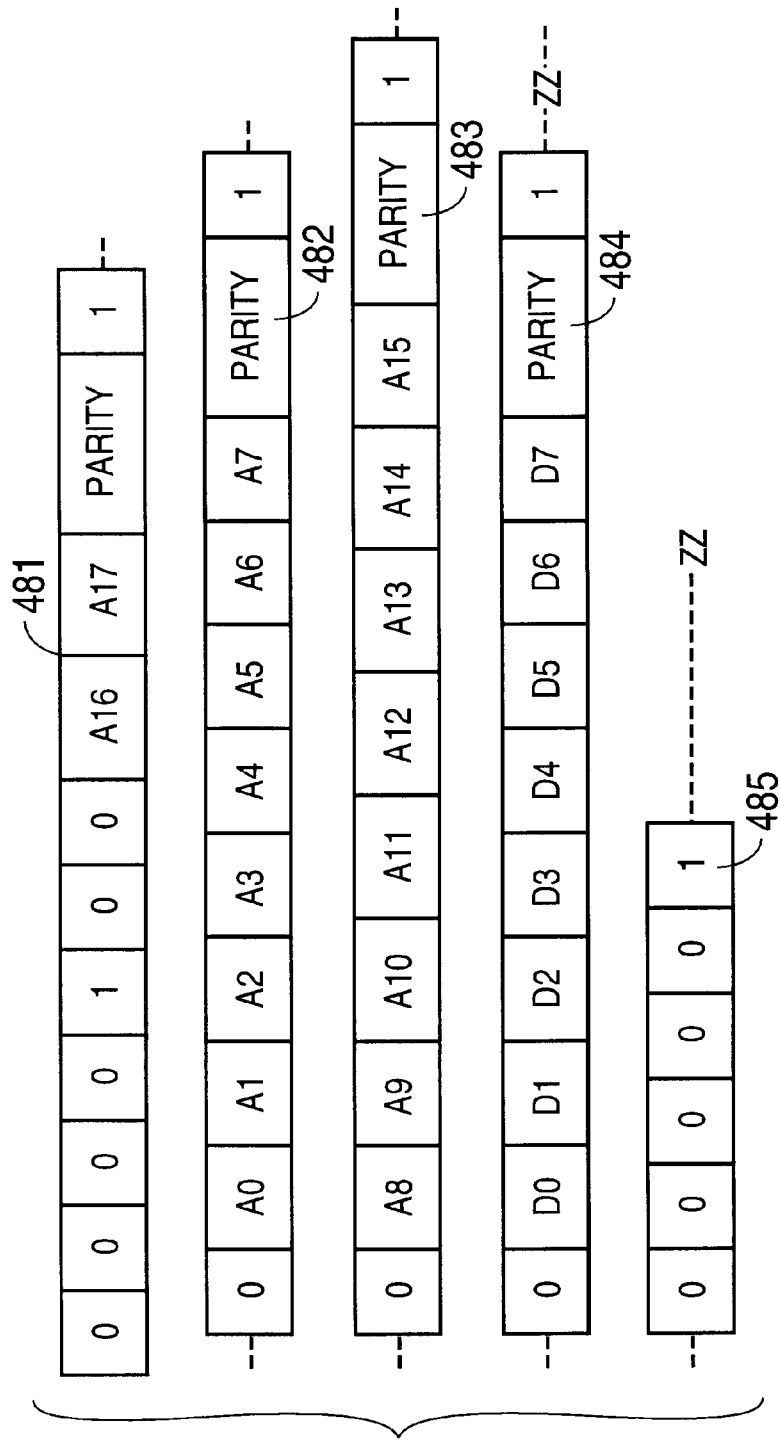
Figure 41:
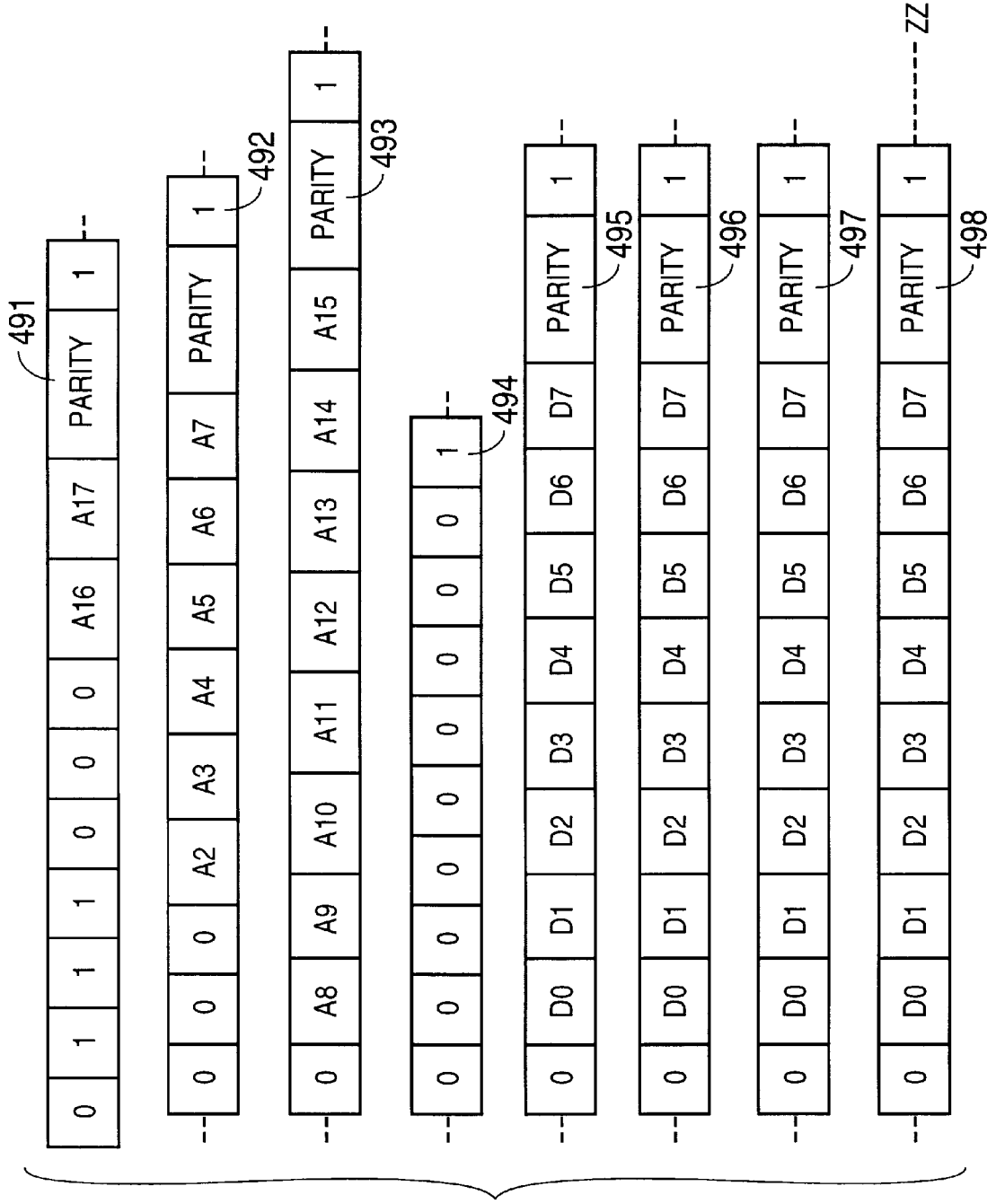
Figure 9C:
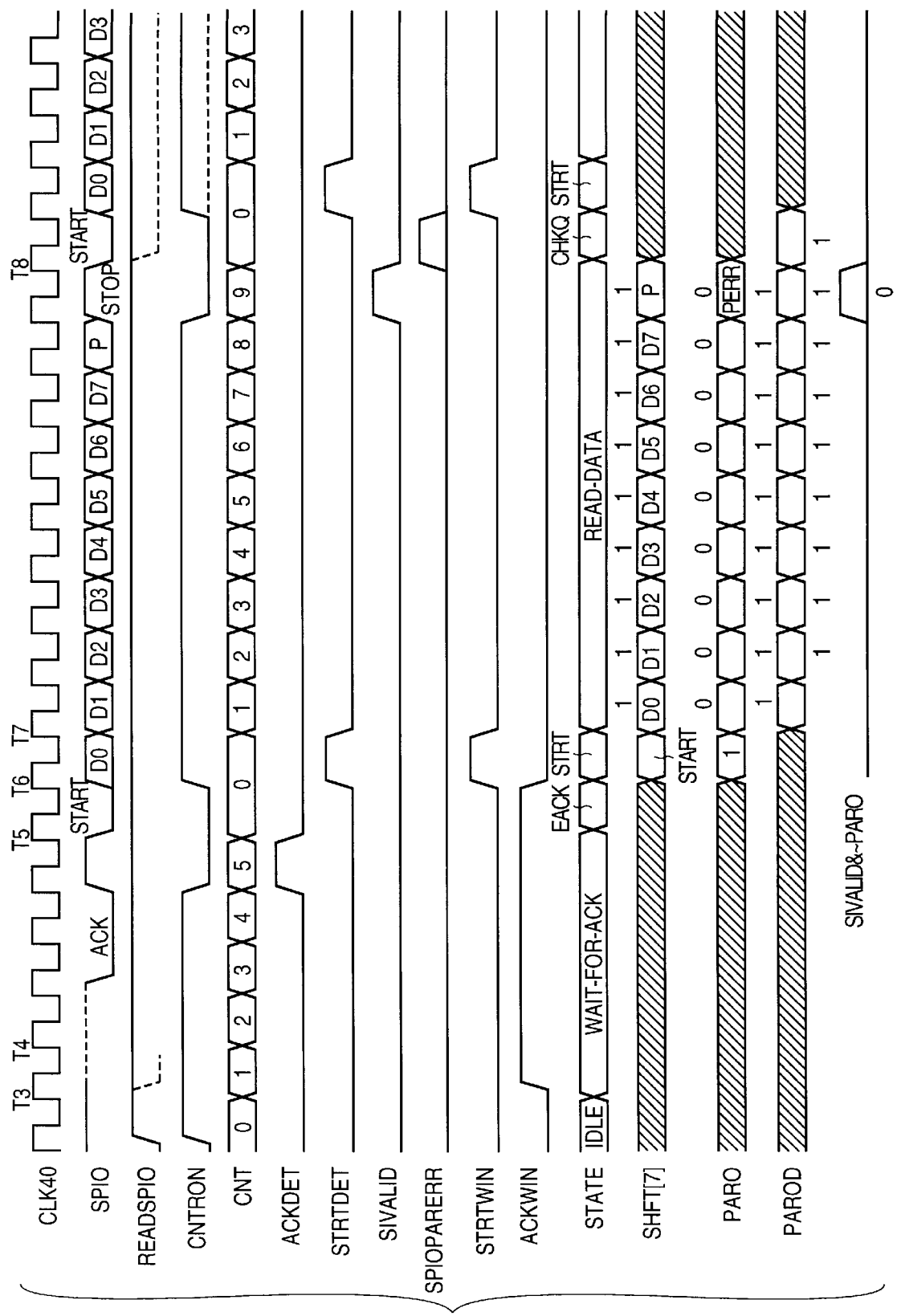

In response to an inactive acknowledge detect signal ACKDET, if read serial port signal READSPIO is active, for example, during execution of a byte read command cycle illustrated in FIG. 4G, shifter state machine 720 transitions to start state 860 (FIG. 8) and drives acknowledge window signal ACKWIN inactive, as illustrated in FIG. 9C at time T6.

In start state 860, shifter state machine 720 drives a start window signal STRTWIN active as long as a start detect signal STRTDET remains inactive. In response to active start window signal STRTWIN, packet controller 740 becomes sensitive to a start bit of a packet. In response to a start bit, packet controller 740 drives the start detect signal STRTDET active on receive status terminals 526 that are coupled to receive status bus 722 of shifter state machine 720.

In response to an active start detect signal STRTDET (FIG. 9C), shifter state machine 720 drives the start window signal STRTWIN inactive and also drives a counter-on signal CNTRON active on counter terminal 723 and transitions to read data state 870, for example as illustrated at time T7 of FIG. 9C.

In read data state 870, shifter state machine 720 drives the counter-on signal CNTRON active and also drives a set shift-in valid signal SETSIVAL active on set shift-in terminal 725 (FIG. 7) that is coupled to set shift-in line 741 and waits for counter signal CNT9 to go active. In response to an active set shift-in valid signal SETSIVAL on set shift-in line 741, packet controller 740 clocks in serial port input signal SPIOI serially from serial data received line 522 into a shift register (not shown in FIG. 7).

Nine clock cycles after counter-on signal CNTRON goes active, counter 710 drives counter signal CNT9 active. At this point, packet controller 740 has clocked in a total of ten bits from the serial data received line 522, i.e., a start bit before counter-on signal CNTRON goes active, followed by a byte, and a parity bit after the byte.

In response to an active counter signal CNT8, shifter state machine 720 drives set shift-in valid signal SETSIVAL active to enable parity of the byte in the received packet to be checked. In response to an active counter signal CNT9, shifter state machine 720 transitions to check read state 880 (FIG. 8) and drives counter-on signal CNTRON inactive, as illustrated at time T8 of FIG. 9C. In check read state 880 the parity is checked as described below, and if read serial port signal READSPIO is active, for example, during the execution of a memory read command cycle illustrated in FIG. 4I, shifter state machine 720 returns to start state 860 (FIG. 8). If the read serial port signal READSPIO is inactive, shifter state machine 720 returns to idle state 810.

Packet controller 740 includes a shifter circuit 1010 and a parity circuit 1020. In response to an active send byte signal SENDBYTE, parity circuit 1020 loads the value of signal SENDBYTE as a start bit in to send output register 1023.

In response to an active chip reset signal CHPRSTBSY, parity circuit 1020 drives a serial port output signal SP100 active (low) on serial data terminal 527. In response to the active chip reset signal CHPRSTBSY, line controller 530 passes serial port output signal SP100 to pin 241 as illustrated in FIG. 12B.

In response to the active send byte signal SENDBYTE, on the next rising edge of buffered clock signal CLK40B a parallel input multiplexer 1012 in shifter circuit 1010 passes shift out signals SHFTOUT[7:0] on parallel input terminal D1 that is connected to parallel bus 523 simultaneously, in parallel, one bit to each stage in a shift register 1014 also included in shifter circuit 1010.

Figure 10A:
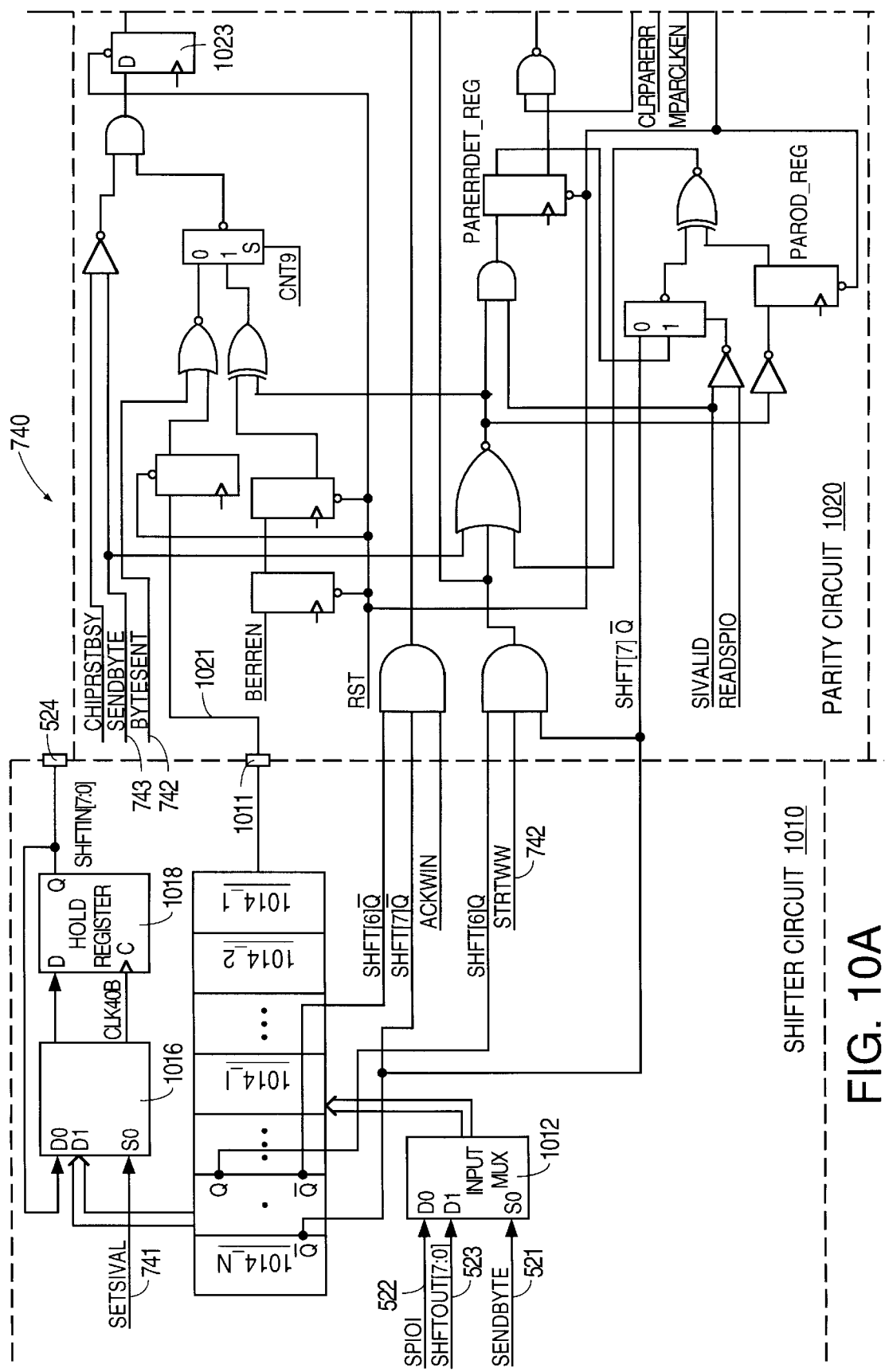
FIG. 10 (including FIGS. 10A and 10B) shows an illustrative low level block diagram for the packet input-output controller of FIG. 7.

Stages 1014_1, 1014_2, ... 1014_I, ... and 1014_N of shift register 1014 are connected in series so that a bit stored in a stage, such as stage 1014_N is transferred to a successive stage, in the direction from 1014_N to 1014_1 with stage 1014_N as the serial shift-in stage and stage 1014_1 as the serial shift-out stage on each rising edge of signal CLK40B. In FIG. 10, there are a total of eight stages in shift register 1014. On each rising edge of buffered clock signal CLK40B, the bit stored in the last stage 1014_1 drives a signal on output terminal 1011 that is coupled to an input line 1021 of parity circuit 1020.

In one embodiment, a stage, such as one of stages 1014_1, ... 1014_N is implemented by a two to one multiplexer 1110 (FIG. 11) and a storage element such as flip-flop 1120. On each rising edge of buffered clock signal CLK40B, a signal from the previous stage drives terminal D0 of multiplexer 1110, except that serial port input signal SPIOI received at pin 241 drives the first stage. A signal from input multiplexer 1012 (FIG. 10) drives terminal D1 of multiplexer 1110. Moreover, signal SENDBYTE drives terminal S0 of multiplexer 1110. In response to active signal SENDBYTE, multiplexer 1110 passes the signal on terminal D1 to flip-flop 1120 and otherwise supplies the signal on terminal D0 to flip-flop 1120.

If read serial port signal READSPIO is inactive, parity circuit 1020 passes a signal on input line 1021 to serial data terminal 527. Parity circuit 1020 computes the parity of the signals on input line 1021. In response to active counter-on signal CNT9, parity circuit 1020 clocks a parity bit on serial data terminal 727 based on the computed parity for the packet out parity bit. In response to an active signal byte sent signal BYTESENT, parity circuit 1020 clocks a stop bit on serial data terminal 527 to complete transmission of packet.

When byte error enable signal BERREN goes active on an error control bus 550, parity circuit 1020 passes the incorrect parity bit to serial data terminal 527, and so exercises the parity circuit in a slave serial port input-output circuit 254. In response to an active read serial port signal READSPIO after completing the transmission of the packet shifter state machine 720 drives serial port enable signal SPIOEN inactive. In response to the inactive serial port enable signal SPIOEN, line controller 530, three states output driver 1220 (FIG. 12B), that is connected to pin 241. So, output from pin 241 is inhibited and pin 241 is usable as an input line controller 530 waits for an acknowledge packet to be returned from SSPIOC 254 to pin 241 and passed as signal SPIOI by input buffer 1223.

When send byte signal SENDBYTE is inactive, parallel input multiplexer 1012 only transfers serial port input signal SPIOI from serial port input line 522 that is coupled to pin 241, to the input pin of first stage 1014-N of shift register 1014.

Figure 11:
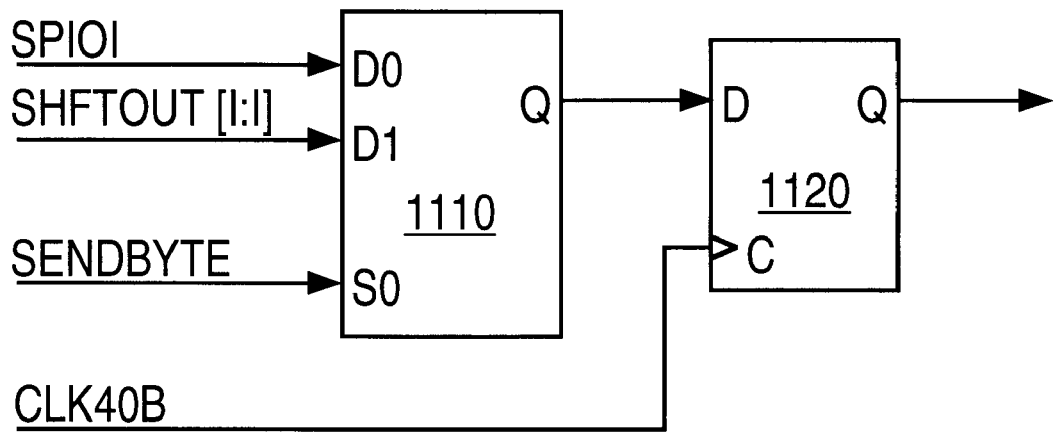
FIG. 11 illustrates a multiplexer and flip-flop used to implement a shifter stage in the shift register of FIG. 10.

In response to an active set shift-in valid signal SET-SIVALID on set shift-in valid line 741, an output multiplexer 1016 simultaneously, in parallel, passes the bits shifted in from pin 241 and stored in each of the stages of shift register 1014 into an eight-bit hold register 1018. Hold register 1018 in turn passes the redeived bits as signals SHFTIN[7:0] to received data terminals 524. Shift register 1014 also passes the received bits to output terminal 1011. When shift-in valid signal SIVALID goes active, and if a signal MPARCKEN is active on a parity error control bus 550, parity circuit 1020 compares the computed parity with a received parity bit on input line 1021 and drives a parity error detected signal SPIOPARERR active on packet error terminal 529 in case of errors. When clear parity error signal CLRPARERR- goes active on error control bus 550, parity circuit 1020 drives a serial port parity error signal SPIO-PARERR inactive until the next parity error is detected Although one embodiment of a parity circuit 1020 is illustrated in FIGS. 10 and 11, any other parity circuit can be used in accordance with this invention.

One embodiment of line controller 530 (FIG. 5) includes a control enabled output driver 1210 (FIG. 12A) that is controlled by drive signal SPIODRV on drive line 531. In response to an active drive signal SPIODRV, output driver 1210 passes a serial port output signal SPIOO from serial data line 532 to pin 241. An inactive drive signal SPIODRV disables output driver 1210 and so provides a high impedance to pin 241 and input buffer 1220 passes the signal received on pin 241 as serial port input signal SPIOI to serial data line 722.

In response to an active LED test signal LEDTST, line controller 530 passes one of eight internal signals [TSTSIGNI[7:0] that is selected by the value of bits TESTSEL[2:0] described above, to output driver 1220. In response to the active LED test signal LEDTST, output driver 1220 passes the selected internal signal to pin 241.

In response to an active package input signal PKG1- that is passed by bond wire 249 of FIG. 2B, line controller 530, drives the serial port input signal SPIOI inactive (e.g. one) irrespective of the signal on pin 241.

In response to an inactive status signal SSPIOCPS, line controller 530 uses two multiplexers 1230 and 1240 (FIG. 12B) and a flip-flop 1250 to switch the connection of pin 241 to either (1) drive line 531 and serial data line 532 or (2) default command bus 533 that carries bus termination signals STPWLEVEL and STPWEN, depending on whether or not status signal SSPIOCPS on default command bus 533 is active or inactive respectively, which indicates the presence or absence of a slave serial port input-output circuit. In the absence of a slave serial port input-output circuit, line controller 530 drives a first bus termination signal STPWCTL on pin 241 to control turning on or off power to bus terminators of an input-output bus as described above.

A slave serial port input-output circuit 254 (FIG. 3) is implemented in one embodiment using the VERILOG code in microfiche appendix B with Synopsys Synthesizer version 3.1 in SMOS gate array SLA 20000 available from SMOS Systems, Inc. of San Jose, Calif.

In response to a start bit on slave serial port pin 341, hereinafter slave pin 341, that is connected to line SPIO-, a shift register 1310 in slave serial port in put-output circuit 254 shifts data in serially from slave pin 341 and transfers the shifted in data to sequencer 1330. In one embodiment, shift register 1310 transfers 11 bits of the shifted in data to sequencer 1330. The 11 bits comprise the received packet including a start bit, a command byte, a parity bit and a stop bit as described above. In this embodiment, when all of the 11 bits have the value zero, sequencer 1330 determines that the received packet contains a reset command byte indicative of signal CHIPRSTREQ as described above.

In another embodiment, shift register 1310 transfers 12 bits of the shifted in data to sequencer 1330. In this embodiment, if each of the 12 bits is zero, sequencer 1330 interprets the 12 bits as the reset command byte.

In response to a packet from shift register 1310, sequencer 1330 transitions through a sequence of states that is specific to the command byte in the received packet and generates control signals that drive command executor 1370. In response to a packet that contains a reset command packet, sequencer 1330 that is waiting in wait-for-start state 1420 FIG. 14) initializes all of the state variables and continuous in wait-for-start state 1420.

In one embodiment, sequencer 1330 is encoded as a "one-hot" state machine 1400 (FIG. 14) having flip-flops associated with each of 36 states as listed at page 19 of Microfiche Appendix B.

In response to a reset signal on a reset pin 1501 (FIG. 15) that is coupled to a reset line of system bus 250, such as the PCI bus, the slave serial port input-output circuit 254 is reset and sequencer 1330 starts in a hard reset state 1410, initializes variables, goes to reset acknowledge state 1411 and signals command executor 1370 to receive device identification byte IDDAT and external resource status byte ESTAT from for example, a programmable logic circuit 330.

In reset acknowledge state 1411, sequencer 1330 also causes acknowledge multiplexer 1320 to send an acknowledge packet on pin 341 that is coupled to line SPIO- for as long as sequencer 1330 stays in reset acknowledge state 1411. Sequencer 1330 stays in reset acknowledge state 1411 for a variable number of clock cycles depending one the time needed by ID-ESTAT detector 1375 which depends on, for example presence or absence of programmable logic circuit 330 (FIG. 3).

In response to a reset signal on pin 1501, ID-ESTAT detector 1375 clocks in bytes IDDAT and ESTAT from a programmable logic circuit 330. While waiting for bytes IDDAT and ESTAT, if ID-ESTAT detector 1375 times out, for example, due to absence of programmable logic circuit 330, then ID-ESTAT detector 1375 uses a default byte as byte IDDAT and creates byte ESTAT by sensing the signals on various pins for presence or absence of pull up or pull down resistors on plug-in board 270, as described below in reference to FIG. 16. ID-ESTAT detector 1375 then signals sequencer 1330, when bytes IDDAT and ESTAT are assembled and ready for transmission to host adapter 240.

In response to the signal from ID-ESTAT detector 1375, sequencer 1330 transitions to send identification state 1412 and supplies signals for multiplexer 1360 to pass byte IDDAT to shift register 1310. In send identification state 1412, sequencer 1330 loops back for ten clock cycles, indicated in FIG. 14 by "X10" for a total of eleven clock cycles in send identification state 1412. In send identification state 1412, shift register 1310 clocks out byte IDDAT in an initialization packet on pin 341. In one embodiment, an exclusive OR gate (not shown) computes and stores a parity bit for a byte stored in shift register 1310 on a clock cycle immediately subsequent to the clock cycle in which the byte is stored.

Then sequencer 1330 transitions from send identification state 1412 to send external status state 1413, waits for twelve clock cycles during which time shift register 1310 clocks out byte ESTAT as a packet on pin 341 and then transitions to wait-for-start state 1420.

Figure 14:
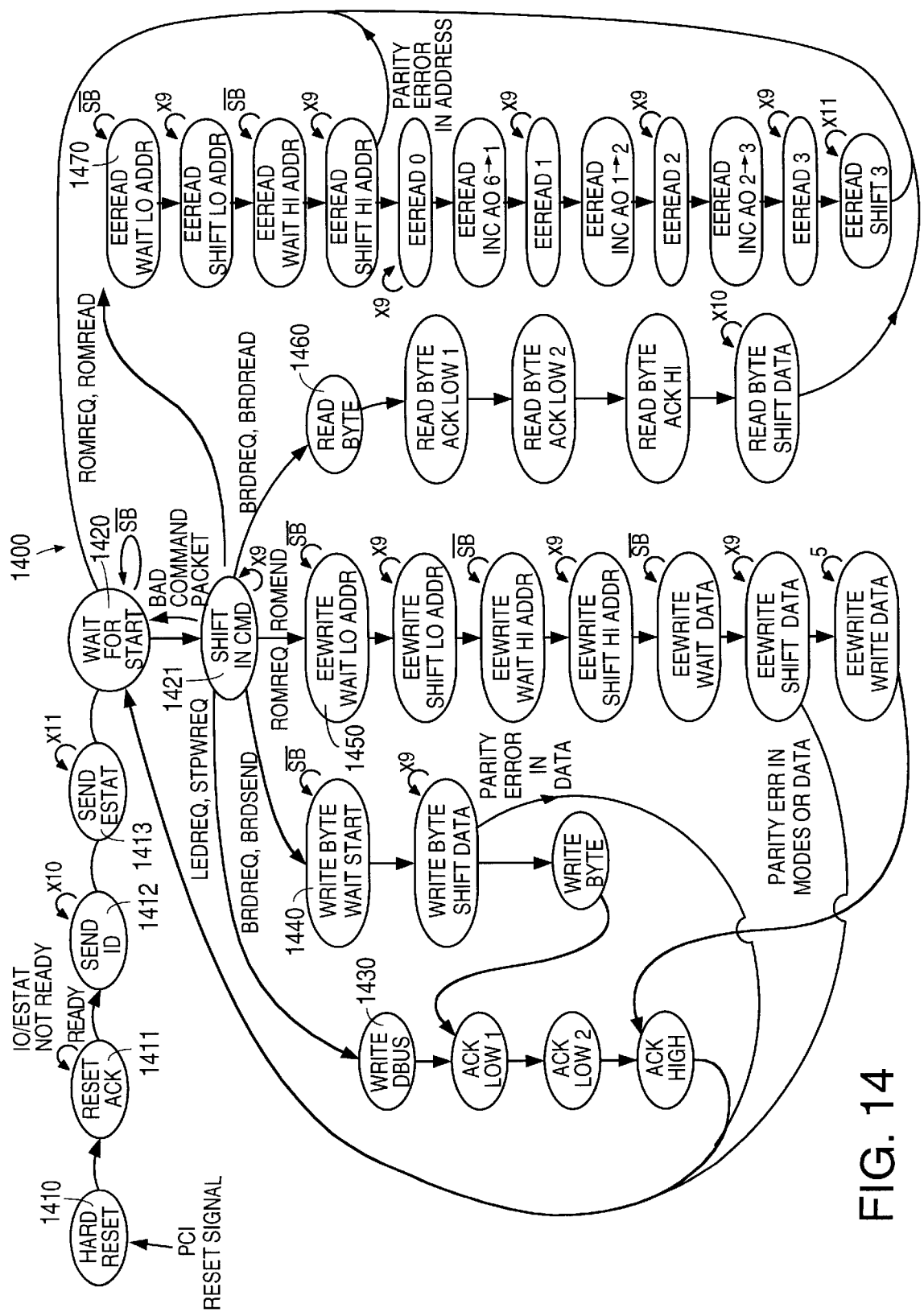
FIG. 14 shows an illustrative state diagram for sequencer module 1330 of FIG. 13.

In response to a signal from shift register 1310 indicating receipt of a start bit that is denoted in FIG. 14 as "SB", sequencer 1330 transitions from wait-for-start state 1420 to shift-in-command state 1421. Sequencer 1330 loops back in shift-in-command state 1421 for nine clock cycles while shift register 1310 clocks in the rest of the packet from pin 341.

If sequencer 1330 is unable to decode the received command, sequencer 1330 transitions back to wait-for-start state 1420.

If sequencer 1330 receives a command byte originating from a valid command signal such as LED request signal LEDREQ or bus terminator request STPWREQ, sequencer 1330 transitions to write data bits state 1430, and causes board control register and monitoring circuitry 1374 in command executor 1370 to use bits D0 and D1 from the command byte to drive signals to the corresponding resources such as LED 350 or bus terminators 360. Simultaneously, sequencer 1330 also causes acknowledge multiplexer 1320 to transmit an acknowledge packet on pin 341. On completion of the transmission of the acknowledge packet, sequencer 1330 returns to wait-for-start state 1420.

In response to other command packets, sequencer 1330 transitions to the corresponding state, such as write byte wait start state 1440 eewrite-wait-low address state 1460 and eeread-wait-low address state 1470. The actions of sequencer 1330 in such states are similar to the actions described above in respect to write data bits state 1430, except that sequencer 1330 causes shift register 1310 to clock in additional address or data packets as necessary and also causes command executor 1370 to perform actions indicated by the respective command bytes such as writing or reading internal registers BRDCTL or SPIOSTAT or memories ROM or EEROM.

In one embodiment if there are any errors, sequencer 1330 sets a bit in a status register and causes command executor 1370 to turn-on LED 350 (FIG. 3).

In one embodiment, command executor 1370 includes board control register and monitoring circuitry that detects the presence or absence of cables connected and terminators installed for input-output bus 284 (FIG. 4) and so there is no need for board control logic 370 external to slave serial port input-output circuit 254.

Command executor 1370 also includes an ID-ESTAT detector 1375 that (1) receives device identification byte IDDAT from a programmable array logic, henceforth PAL, and (2) senses signals on various pins such as memory address pins MA16 and MA17 (FIG. 16) for ROM, to detect the presence or absence of various predetermined devices on support circuit 250, such as EEPROM 390, SEEPROM 380, board control logic 370, bus terminators 360 and LED 350 (FIG. 3). Any pin of slave serial port input-output circuit 254 that is normally connected to a predetermined device carries, an active signal when the predetermined device is present on support circuit 250 and an inactive signal to indicate absence of the predetermined device, as described below in reference to FIG. 16.

In addition to predetermined devices, other devices can also be sensed and controlled by slave serial input-output circuit 254. For example, in response to command SOFT-REQ (Table 3) serial port 230, can send a command packet that causes slave serial port input-output circuit 254 to merely passes to a soft resource 341 information contained in packets received subsequent to the command packet and so allows future expansion in the numbers and types of soft resources included in support circuit 250 (FIG. 3).

One example of a soft resource 341 is a debugger that is polled by sequencer module 223 during boot-up and if present, sequencer module 223 loads in additional firmware or data or both firmware and data from debugger 341, executes the loaded firmware and writes status to debugger 341.

Figure 15:
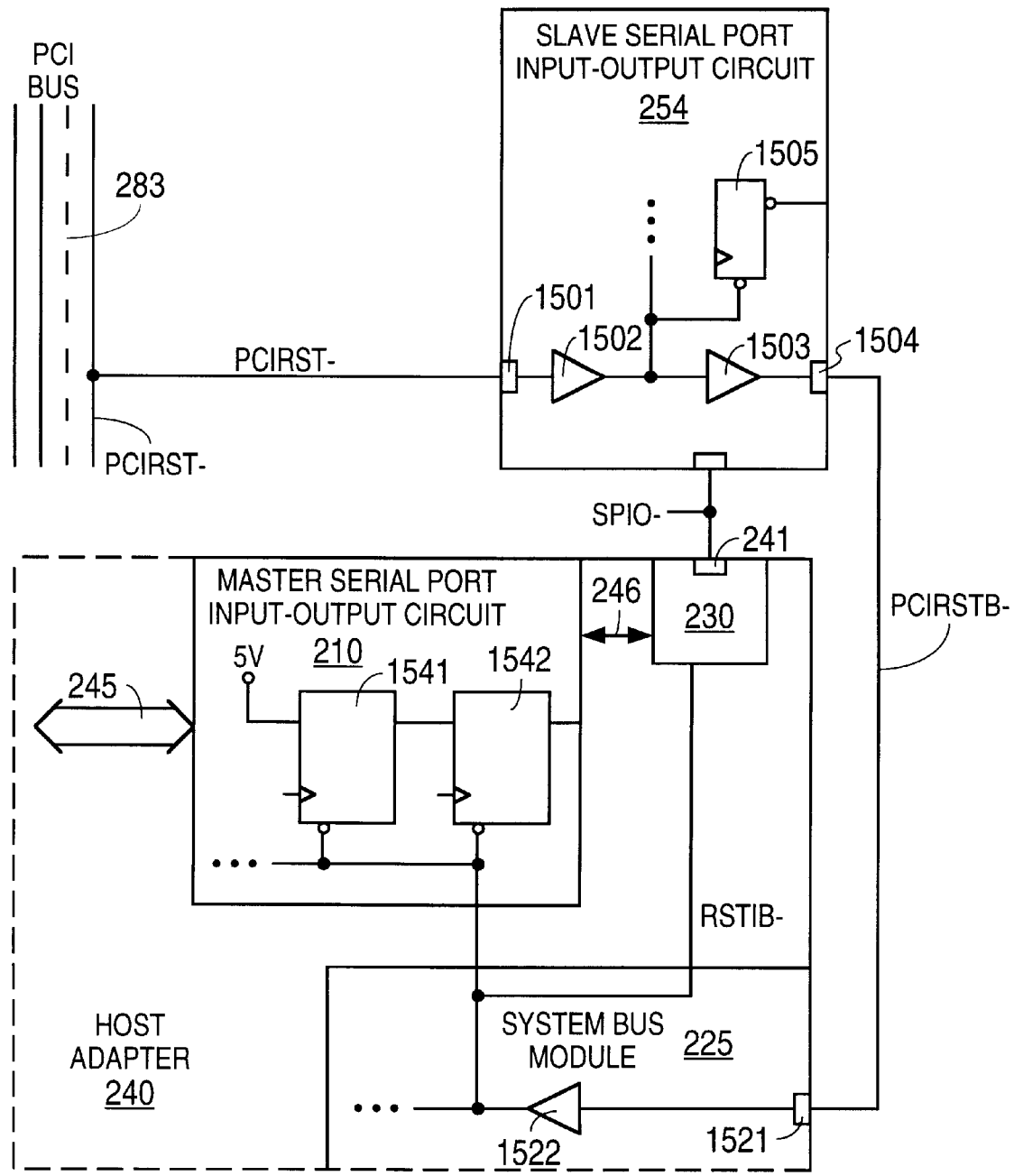
FIG. 15 illustrates an apparatus and method for imposing a single load on the PCI bus in one embodiment.

In one embodiment, host adapter 240 and slave serial port input-output circuit 254 are coupled to impose a single load on system bus 250, such as a PCI bus as illustrated in FIG. 15. A reset input terminal 1501 of slave serial port input-output circuit 254 is coupled to a system bus reset line of system bus 283 that carries signal PCIRST-.

In response to an active signal PCIRST-, slave serial port input-output circuit 254 buffers signal PCIRST- in input buffer 1502 for internal use by flip-flop 1505, for example to generate reset command signal CHPRSTREQ. Slave serial port input-output circuit 254 buffers the buffered signal PCIRST- in output buffer 1503 and drives signal PCIRSTB- on output terminal 1504 for external use by host adapter 240.

Host adapter 240 receives signal PCIRSTB- from slave serial port input-output circuit 254 at reset input pin 1521 that is different from serial port pin 241. Host adapter 240 passes signal PCIRSTB- through input buffer 1522 and reset line RSTIB- to serial port 230. Master serial port input-output circuit 210 uses flip-flops 1541 and 1542 to double synchronize the reset signal from input buffer 1522.

In response to an active signal on reset line RSTIB-, serial port 230 resets all state machines to their initial states. In response to command signal CHIPRSTREQ, serial port 230 generates a packet containing a reset command code that resets slave serial port input-output circuit 254.

As noted above, slave serial port input-output circuit 254 senses the presence or absence of various resources from the signals on one or more lines connected to the resource. For example, when ID-ESTAT detector 1375 senses a low signal on memory chip select line MCS# (FIG. 16), ID-ESTAT detector 1375 determines that there is no EEPROM 390 that is coupled to slave serial port input-output circuit 254.

Similarly, when ID-ESTAT detector 1375 senses a high signal on SEEPROM chip select line SEECS (FIG. 16), ID-ESTAT detector 1375 determines that serial EEPROM 380 is absent. In the absence of EEPROM 390 or serial EEPROM 380, memory chips select line MCS# or serial EEPROM chip select line SEECS is coupled for example by a resistor to a first voltage e.g. high or a second voltage e.g. low respectively.

In one embodiment, in response to a high signal on memory chip select line MCS#, ID-ESTAT detector 1375 senses signals at a number of high address lines, such as first memory address line MA17 and second memory address line MA16. If ID-ESTAT detector 1375 senses a low signal on first memory address line MA17 and also a low signal on second memory address line MA 16, ID-ESTAT detector 1375 determines that the size of EEPROM 390 is only 64 kilobytes. If ID-ESTAT detector 1375 senses a high signal on second memory address line MA16, and either (1) a low signal on first memory address line MA17 or (2) a high signal on first memory address line MA17, the size of EEPROM 390 is 128 kilobytes or 256 kilobytes respectively.

In response to a low signal on memory write line MWR#, ID-ESTAT detector 1375 determines that a read only memory ROM is coupled to slave serial port input-output circuit 254, rather than an EEPROM.

Figure 16A:
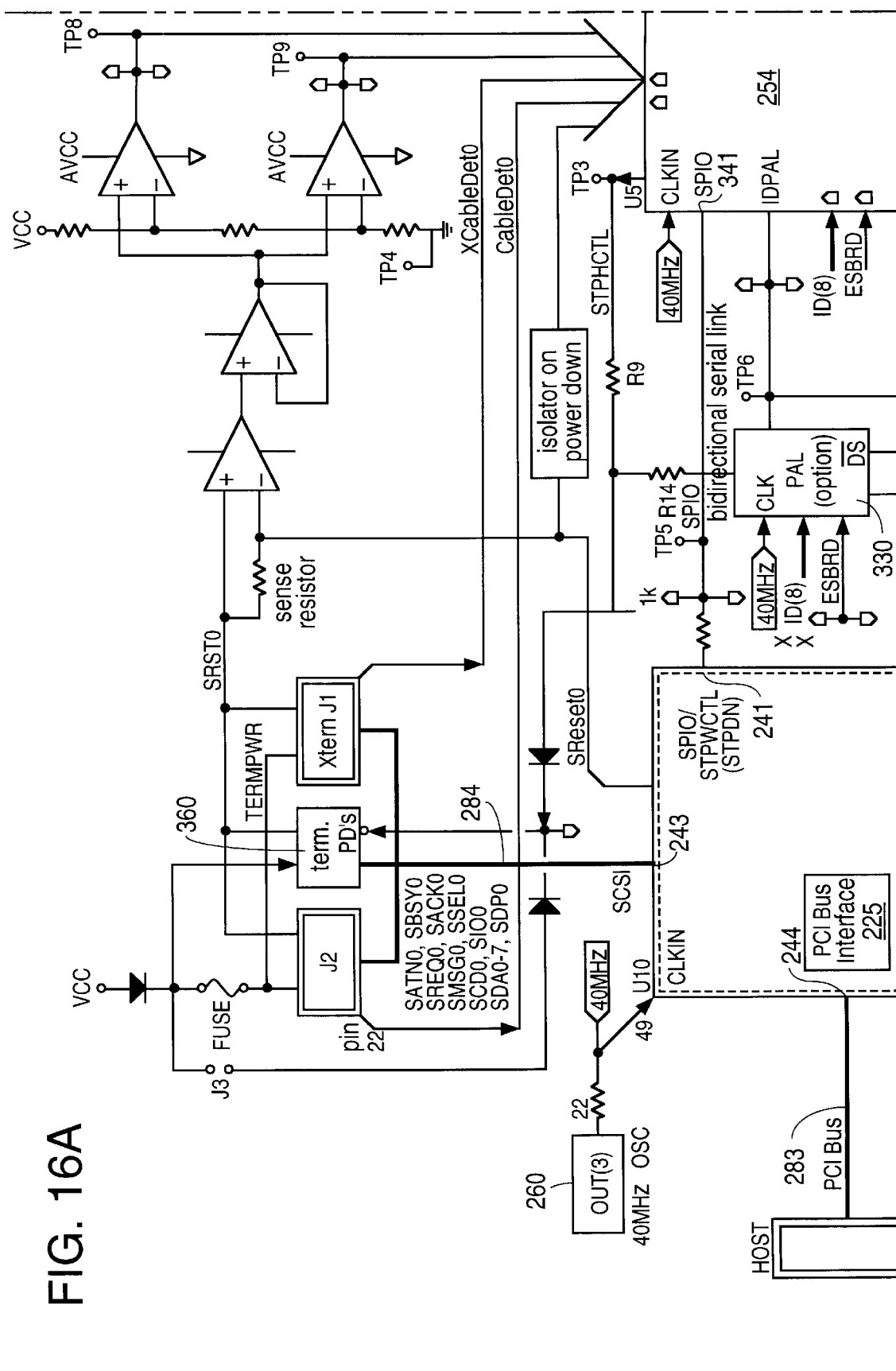
FIG. 16 (including FIGS. 16A, 16B, 16C and 16D) shows an illustrative circuit diagram for implementing host adapter plug-in board of FIG. 3.
Figure 16B:
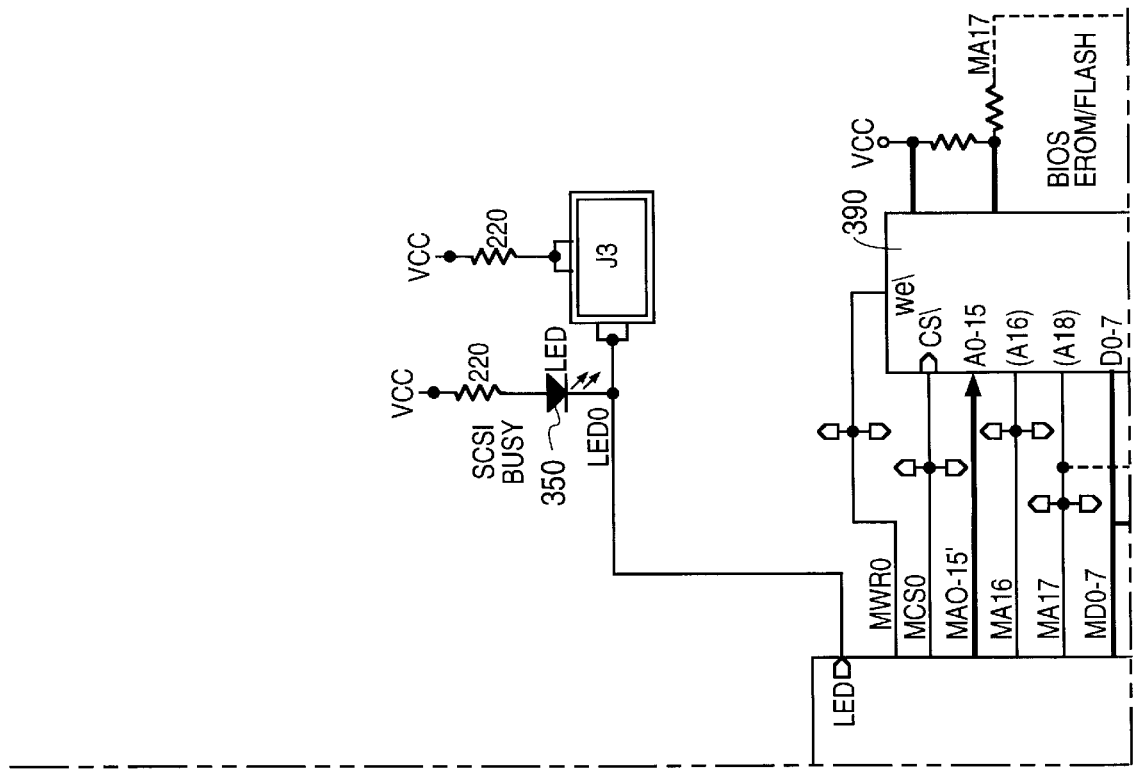
Figure 16C:
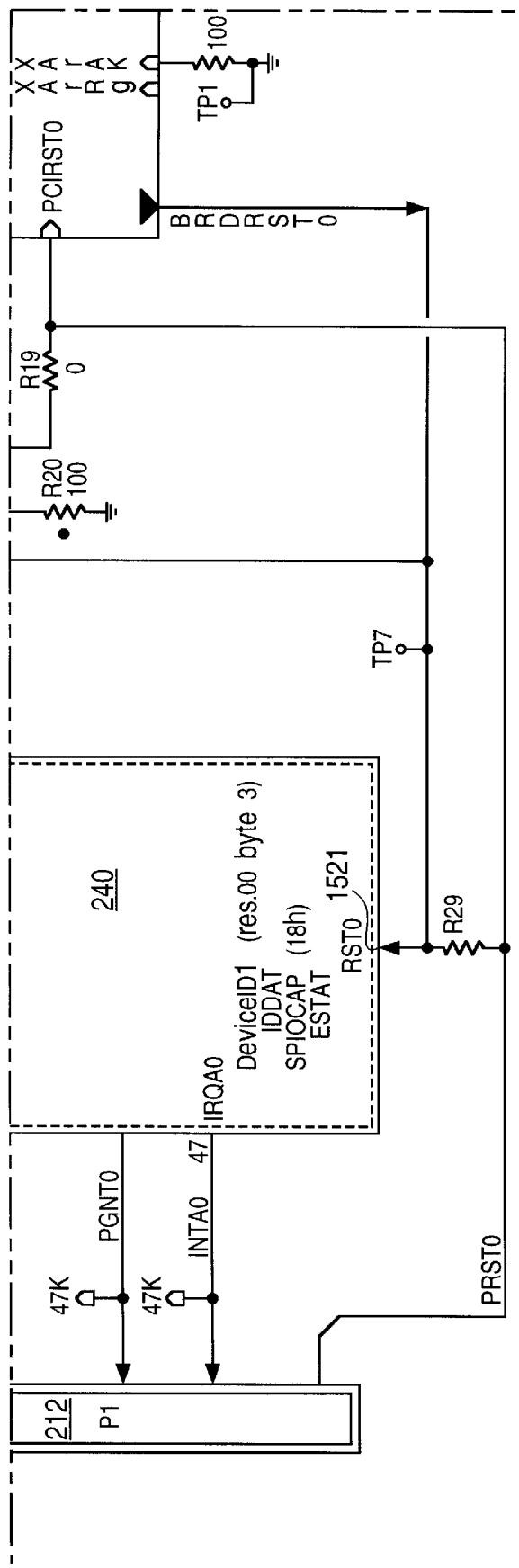

FIG. 16 illustrates certain variations in circuitry by an asterisk "*". For example, a programmable logic circuit (PAL) 330 is directly connected to line SPIO- in the absence of slave serial port input-output circuit 254 to provide device identification byte IDDAT and external resource status byte ESTAT, that is FFh in this case. Programmable logic circuit 330 provides bytes IDDAT and ESTAT encoded in packets of the type illustrated in FIG. 4A. In one embodiment, device identification byte IDDAT and external resource status byte ESTAT are visible to host processor 281 as register 00, byte 3, and as register 1Bh respectively of host adapter 240.

In this embodiment, host adapter 240 and slave serial port input-output circuit 254 operate synchronously by using clock signals derived from the same oscillator 215. Sequencer module 223 drives a signal CLK40B, that is a buffered version of the same clock signal CLK40 used for timing by other modules, such as system bus module 225 and input-output bus module 221. When a power-down bit is set in an internal register of sequencer module 223, sequencer module 223 clamps signal CLK40B high, until the power-down bit is reset, to reduce power consumption in host adapter integrated circuit 240.

Note the following in reference to the implementation illustrated in FIG. 16:

Bus 284 is an 8 bit SCSI bus with 10 Mhz data transfer: during SCSI data transfer, bus 284 operates in PCI DMA master mode (256B takes 25.6 us @ 10 MB/sec). All data transfers across host PCI bus 283 are DMA to maximize data rate (256B takes 1.9 us). All diodes are 1N4148 unless noted otherwise. SSPIOC and R (R29 and R14) are mutually exclusive, but one of the two must be installed.

| ESTAT presence bits are as follows: | | | | | |
|---|---|---|---|---|---|
| 7–5 | 4 | 3 | 2 | 1 | 0 |
| SoftCmden | BRDCTL | SEEPROM | flash | ROH | SSPIO |

Optional PAL 330 generates 18 bit serial stream on RST (5 bit counter). During Reset cycle, current sinked to connectors is sensed.

|  | TP9 | TP0 |
|---|---|---|
| <1½ terminators | −0 | 0 |
| 1½ to 2½ terminators | −0 | 1 |
| invalid | −1 | 0 |
| >2½ terminators | −1 | 1 |

| SSPIOC DECODING | | | |
|---|---|---|---|
| ROMCS0 | A17 | A16 | ROM/flash Memory size |
| 0 | x | x | not installed |
| 1 | 0 | 0 | 64kB |
| 1 | 0 | 1 | 128kB |
| 1 | 1 | 1 | 256kB |
| MWR0 | = 0 | | Memory is Read Only |
|  | = 1 | | Memory is Read/Write (flash) |
| SEECS | = 0 | | Serial EEPROM installed |
|  | = 1 | | Serial EEPROM not installed |
| IDPAL | = 0 | | extra PAL not installed |
|  | = 1 | | extra (ID & ES input pins) |
|  | = 0&1 | | extra PAL installed |

Figure 17:
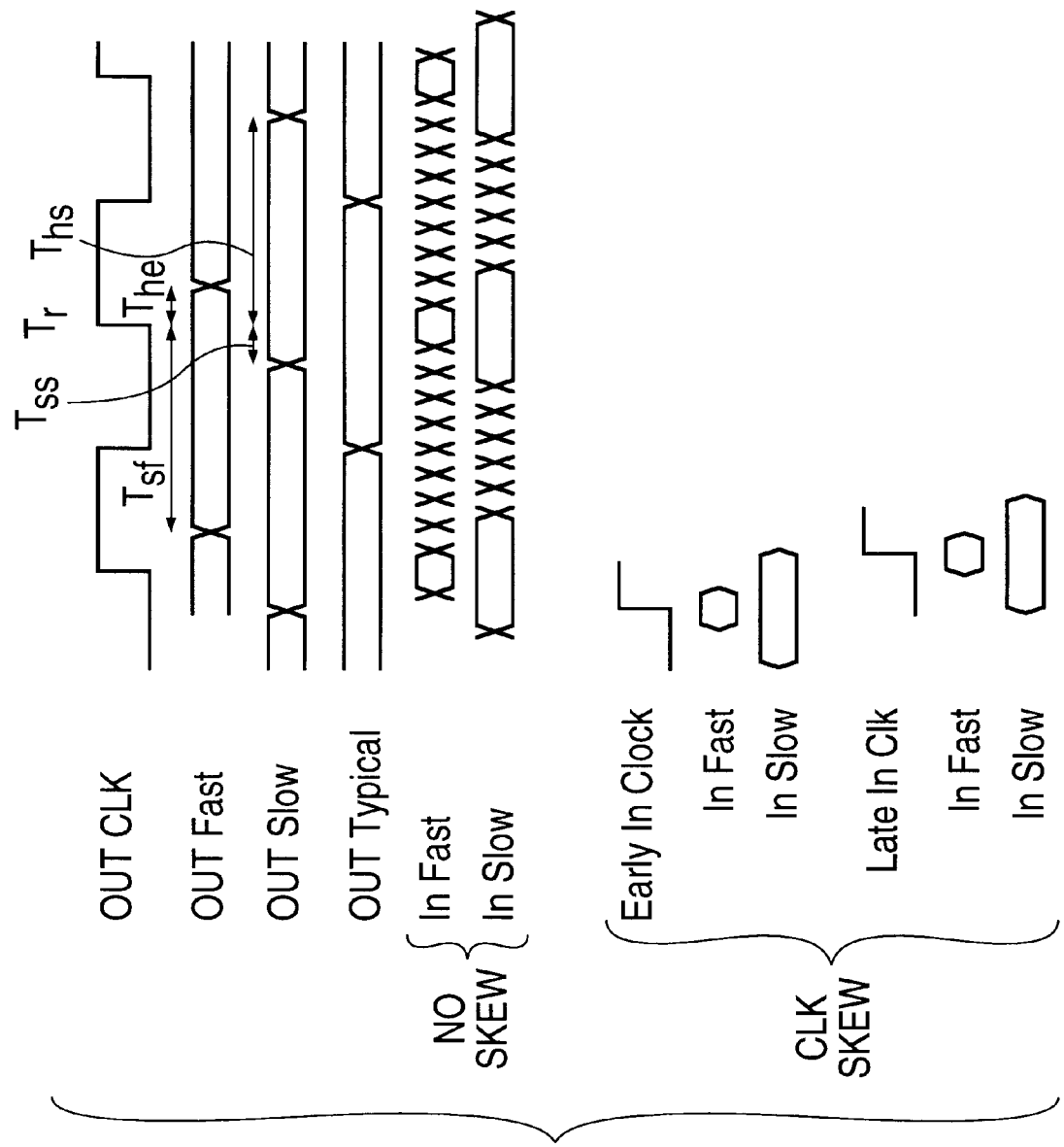
FIG. 17 illustrates skew acceptable in the clock signals of host adapter and the slave serial port input-output circuit of FIG. 3.

When host adapter 240 drives a signal on line SPIO-, a serial port 230 that exhibits slow characteristics can have a setup time Tss and a hold time Ths as illustrated in FIG. 17. A serial port 230 that exhibits fast characteristics can have a set time Tsf and a hold time Thf also illustrated in FIG. 17. So either a fast or a slow slave serial port input-output circuit 254 can sample signal SPIO- at rising edge Tr (FIG. 17) of a clock signal, when there is no skew in the clock signals of serial port 230 and slave serial port-input-output circuit 254.

However, a slave serial port input-output circuit 254 can have a positive skew or a negative skew in its clock signal as compared to the clock signal of serial port 230 depending on the layout of plug-in board 270. Positive skew or negative skew can result in EARLY IN CLOCK or LATE IN CLOCK respectively, with the set up and hold times for fast characteristics and slow characteristics centered around the respective rising edges as shown in FIG. 17. So a serial port 230 that exhibits fast characteristics must output no faster than a slave serial port input-output circuit 254 that exhibits slow input characteristics. Examples of timing characteristics are listed in Tables 14A–14C.

TABLE 14A

| Minimum timing required by slave port 230 of host adapter 240 | |
|---|---|
| Serial Port 230 | Slave serial port input-output circuit 254 provides: |
| set up: 0.66 ns | 8.33 ns |
| hold: 2.48 ns | 5.08 ns |

The above set-up times are also applicable when a programmable logic circuit is directly connected to pin 241 instead of a slave serial port input-output circuit 254 to provide bytes IDDAT and ESTAT to host adapter 240.

TABLE 14B

Minimum timing provided to slave serial port
input-output circuit 254

| Serial Port 230 | Slave serial port input-output circuit 254 requires: |
|---|---|
| set up: 3.38 ns | .97 ns |
| hold: 6.99 ns | 2.07 ns |

The above setup times in tables 14A and 14B are based on a 40 MHz clock with 25 ns cycle and output timing is measured with a 15 pF load.

In one embodiment, programmable logic circuit 330 passes bytes IDDAT and ESTAT into SSPIOC 254 after reset. SSPIOC 254 then passes these bytes to host adapter 240. Table 14C shows the timing requirements imposed on programmable logic circuit 330 by SSPIOC 254.

TABLE 14C

For a shift register in a programmable logic circuit

| hold: | −1.93 ns |
|---|---|
| setup: | 8.86 ns |

One embodiment of support circuit 1800 (FIG. 18) includes a plurality of slave serial port input-output circuits, such as SSPIOC 254A, SSPIOC 254B and SSPIOC 254C that are all connected to the same serial port input-output line SPIO- that is coupled to the serial port pin 241 of host adapter 240. Each of the slave serial port input-output circuits 254A, 254B and 254C receive the same clock signals CLK40 from oscillator 260 that is also supplied to host adapter 240. Each slave serial port input-output circuit allows host adapter 240 to access a resource that is connected to that particular slave serial port input-output circuit similar to the above description in reference to SSPIOC 254 and host adapter 240. For example, host adapter 240 can access resources 1810 and 1820 through SSPIOC 254A, resources 1830 and 1840 through SSPIC 254B and resource 1850 through SSPIOC 254C.

Figures 18, 19:
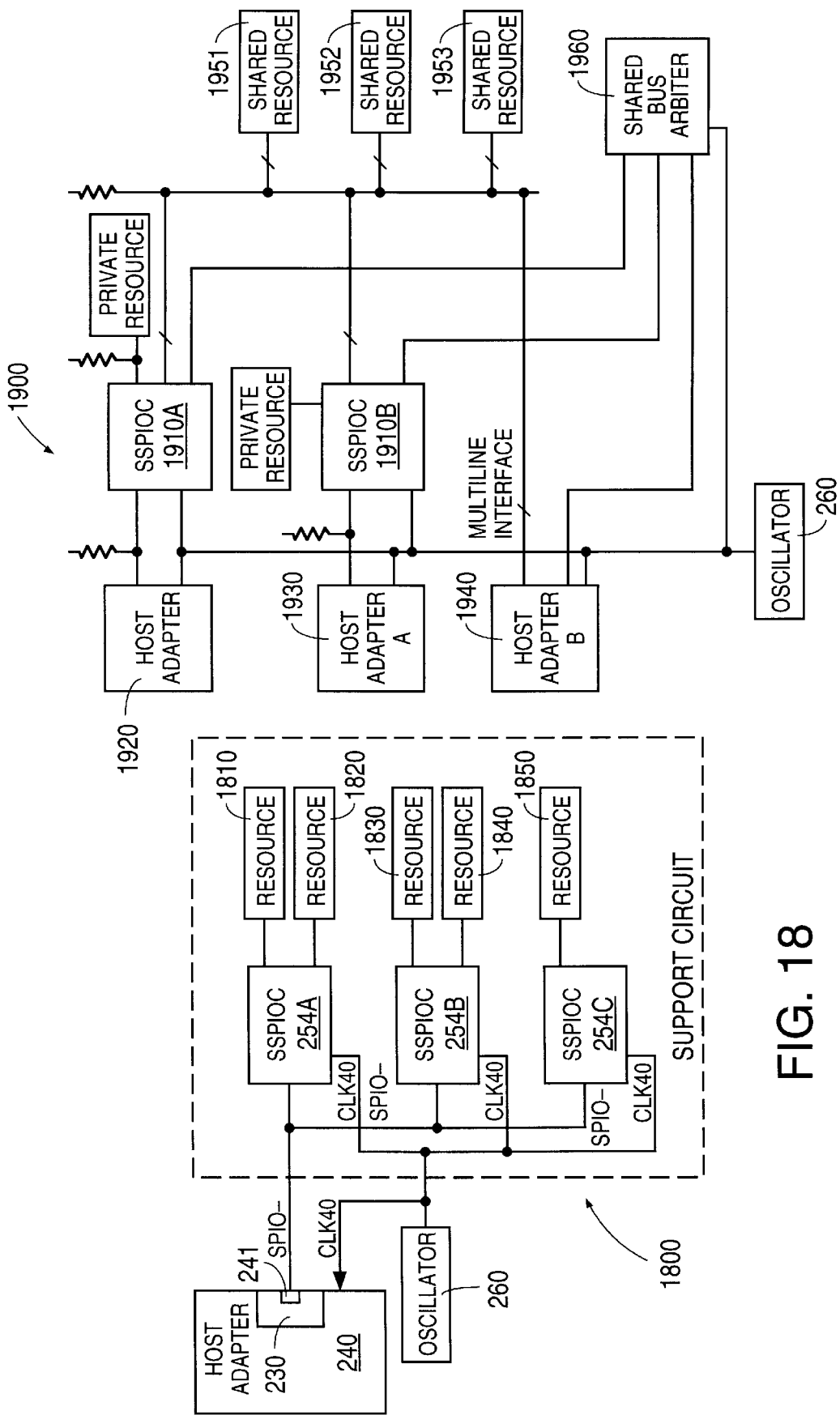
FIG. 18 shows an illustrative high level block diagram of an embodiment of a computer system including a host adapter of this invention connected to multiple slave devices.
FIG. 19 shows an illustrative high level block diagram of an embodiments of a computer system including multiple host adapters of this invention.

In the embodiment of FIG. 18, SSPIOC 254A has a design identical to the design for slave serial port input-output circuit 254 described above. Therefore, slave serial port input-output circuit 254A sends two initialization packets containing bytes IDDAT and ESTAT to host adapter 240 following reset.

The other two slave serial port input-output circuits, SSPIOC 254B and SSPIOC 254C are similar to slave serial port input-output circuit 254 except that SSPIOC 254B and SSPIOC 254C respond to command packets containing command bytes of values different from the values listed in Table 12 above, for example command byte values 05 and 08 respectively. The command byte values to which each slave serial port input-output circuit responds is mutually exclusive from the command byte to which another slave serial port input-output circuit responds in order to eliminate the possibility of contention for line SPIO-, avoid collision of packets and eliminate need for control lines.

In another embodiment, a slave serial port input-output circuit such as SSPIOC1910A (FIG. 19) or SSPIOC1910B includes a memory port interface of the type described in "AIC-7870PCI Bus Master Single-Chip SCSI Host Adapter-Data Book-Preliminary", at for example, pages 5-18 to 5-21.

In the embodiment of FIG. 19, SSPIOC 1910A and SSPIOC 1910B are coupled to host adapters 1920 and 1930 respectively and allow these two host adapters to share one or more common memory resources, such as shared resources 1951, 1952 and 1953 through a shared bus arbiter 1960. Computer system 1900 (FIG. 19) also includes a host adapter 1940 of the type described in "AIC-7870PCI Bus Master Single-Chip SCSI Host Adapter Data Book-Preliminary" referenced above that can also access shared resources 1951, 1952, and 1953 via shared bus arbiter 1960.

The use of a predetermined protocol as described above in which one or more slave integrated circuits always wait for a master integrated circuit eliminates possibility of contention for the shared serial port input-output line, avoids collision of packets and so eliminates need for control lines in addition to the shared serial port input-output line between a master integrated circuit and the slave integrated circuits.

Although the present invention has been described in connection with the above described illustrative embodiments, the present invention is not limited thereto. For example, instead of a pin, a surface mount lead can be used. Various modification and adaptations of the above discussed embodiments are encompassed by the appended claims.

APPENDIX C

```
/*******************************************************
************************
Function:
Read/write decoder
*******************************************************
************************/
module sprwdec ( csadr_, csren_, cdadr_, cdwen_,
crbusy, por, softcmden, rd1b,
    rd1d, rd1e, rdbrdctl_, rdseectl_, rdspiodat_,
spiobsy, spiobsy_,
    wrbrdctl_, wrspiocap_, wrseectl_, wrspioctl_,
wrspiodat_ );
input       [7:0] csadr_, cdadr_;
input       csren_, cdwen_, crbusy, por, softcmden;
output      rd1b;           // reading address 1b
output      rd1d;           // reading address 1d
output      rd1e;           // reading address 1e
output      rdbrdctl_;      // read BRDCTL (1D)
output      rdseectl_;      // read SEECTL (1E)
output      rdspiodat_;     // read SOFTDAT (1E)
output      spiobsy;        // CIO read
output      spiobsy_;       // CIO read
output      wrbrdctl_;      // write BRDCTL (1D)
output      wrspiocap_;     // write ESTAT (1B)
output      wrseectl_;      // write SEECTL (1E)
output      wrspioctl_;     // write SPIOCTL (1E)
output      wrspiodat_;     // write SPIODAT (1D)
// ---------------------------------------------
----------------------
// csadr_ decode
// complement signals
nouf02 iv0 ( .NQ(softcmden_), .A(softcmden) );
inv01 iv1 ( .NQ(csadr4), .A(csadr_[4]) );
inv01 iv2 ( .NQ(csadr3), .A(csadr_[3]) );
inv01 iv3 ( .NQ(csadr2), .A(csadr_[2]) );
inv01 iv4 ( .NQ(csadr1), .A(csadr_[1]) );
inv01 iv5 ( .NQ(csadr0), .A(csadr_[0]) );
inv01 iv6 ( .NQ(csren), .A(csren_) );
// block decode: 00011
and05 an0 ( .Q(blkrd), .A(csadr_[7]), .B(csadr_[6]),
.C(csadr_[5]),
    .D(csadr4), .E(csadr3) );
// register decode: 011, 101, 110
nand03 an1 ( .NQ(nrd1b), .A(csadr_[2]), .B(csadr1   ),
.C(csadr0   ) );
nand03 an2 ( .NQ(nrd1d), .A(csadr2   ), .B(csadr_[1]),
.C(csadr0   ) );
nand03 an3 ( .NQ(nrd1e), .A(csadr2   ), .B(csadr1   ),
.C(csadr_[0]) );
nand03 an4 ( .NQ(dec1b1d1e), .A(nrd1b), .B(nrd1d),
```

APPENDIX C-continued

```
.C(nrd1e) );
nbuf02  nb0  ( .NQ(rd1b), .A(nrd1b) );
nbuf02  nb1  ( .NQ(rd1d), .A(nrd1d) );
nbuf02  nb2  ( .NQ(rd1e), .A(nrd1e) );
// set and reset busy
nand03 an5  ( .NQ(adrok__), .A(blkrd), .B(dec1b1d1e),
.C(csren) );
or02     or0   ( .Q(setrbsy__), .A(adrok__), .B(crbusy) );
nor02    nr0   ( .NQ(rstrbsy__), .A(csren__), .B(por) );
nrslt    nl0   ( .NQ(bsy__), .Q(bsy), .NS(setrbsy__),
.NR(rstrbsy__) );
buf0104 bf0 ( .Q(spiobsy__), .A(bsy) );
buf0103 bf1 ( .Q(spiobsy__), .A(bsy__) );
// read strobes
nand03 nd10 ( .NQ(rdbrd__), .A(rd1d), .B(spiobsy),
.C(softcmden__) );
nand03 nd11 ( .NQ(rdsee__), .A(rd1e), .B(spiobsy),
.C(softcmden__) );
nand03 nd12 ( .NQ(rdspiodat__), .A(rd1d), .B(spiobsy),
.C(softcmden) );
buf0102 iv30 ( .Q(rdbrdctl__), .A(rdbrd__) );
buf0102 iv31 ( .Q(rdseectl__), .A(rdsee__) );
// ---------------------------------------------
---------------------
// write decode
inv01    iv11    ( .NQ(cdadr4), .A(cdadr__[4]) );
inv01    iv12    ( .NQ(cdadr3), .A(cdadr__[3]) );
inv01    iv13    ( .NQ(cdadr2), .A(cdadr__[2]) );
inv01    iv14    ( .NQ(cdadr1), .A(cdadr__[1]) );
inv01    iv15    ( .NQ(cdadr0), .A(cdadr__[0]) );
nbuf02   iv16    ( .NQ(cdwen), .A(cdwen__) );
// block decode: 00011
and05 an10 ( .Q(blkwr), .A(cdadr__[7]), .B(cdadr__[6]),
.C(cdadr__[5]),
       .D(cdadr4), .E(cdadr3) );
// register decode: 011, 101, 110
and03 an11 ( .Q(wr1b), .A(cdadr__[2]), .B(cdadr1   ),
.C(cdadr0   ) );
and03 an12 ( .Q(wr1d), .A(cdadr2   ), .B(cdadr__[1]),
.C(cdadr0   ) );
and03 an13 ( .Q(wr1e), .A(cdadr2   ), .B(cdadr1   ),
.C(cdadr__[0]) );
and02 an14 ( .Q(wspiocap), .A(blkwr), .B(wr1b) );
and03 an15 ( .Q(wbrdctl), .A(blkwr), .B(wr1d),
.C(softcmden__) );
and03 an16 ( .Q(wseectl), .A(blkwr), .B(wr1e),
.C(softcmden__) );
and03 an17 ( .Q(wspiodat), .A(blkwr), .B(wr1d),
.C(softcmden) );
and03 an18 ( .Q(wspioctl), .A(blkwr), .B(wr1e);
.C(softcmden) );
and02 an19 ( .Q(wrspiocap), .A(cdwen), .B(wspiocap) );
and02 an1a ( .Q(wrbrdctl), .A(cdwen), .B(wbrdctl) );
and02 an1b ( .Q(wrseectl), .A(cdwen), .B(wseectl) );
and02 an1c ( .Q(wrspiodat), .A(cdwen), .B(wspiodat) );
and02 an1d ( .Q(wrspioctl), .A(cdwen), .B(wspioctl) );
nbuf02 nb19 ( .NQ(wrspiocap__), .A(wrspiocap) );
nbuf02 nb1a ( .NQ(wrbrdctl__), .A(wrbrdctl) );
nbuf02 nb1b ( .NQ(wrseectl__), .A(wrseectl) );
nbuf02 nb1c ( .NQ(wrspiodat__), .A(wrspiodat) );
nbuf02 nb1d ( .NQ(wrspioctl__), .A(wrspioctl) );
endmodule
```

We claim:

1. A host adapter integrated circuit comprising:

a first plurality of pins couplable to a first bus;

a second plurality of pins couplable to a second bus;

a data transfer circuit connected to said first and second pluralities of pins;

wherein said data transfer circuit transfers information between said first and second pluralities of pins; and a serial port coupled to said data transfer circuit, and said serial port having only one pin, said pin being a bidirectional pin, wherein said serial port serially drives a plurality of signals on said pin in response to receipt of said plurality of signals from said data transfer circuit, and serially receives another plurality of signals from said pin;

wherein said serial port further comprises a plurality of serially coupled storage elements;

wherein data from said serially coupled storage elements are serially provided to said pin in response to a first signal; and further wherein data from said pin are serially stored in said serially coupled storage elements in response to a second signal.

2. The host adapter integrated circuit of claim 1 wherein said first bus is an input and output bus connected to a peripheral device and said second bus is a system bus connected to a host processor; and further wherein said serially connected storage element have a parallel input terminals wherein data from said second bus are provided to said parallel input terminals and are latched in parallel in said serially coupled storage elements in response to a third edge in said buffered clock signal.

3. The host adapter integrated circuit of claim 2 wherein data from said serially coupled storage elements are written on said system bus in parallel in response to a read strobe.

4. The host adapter integrated circuit of claim 2 further comprising:

a hold register coupled to said serially coupled storage elements wherein upon transfer of data from said serially coupled storage elements to said hold register, said data is provided to a plurality of received data terminals in response to a fourth edge in said buffered clock signal.

5. The host adapter integrated circuit of claim 1, wherein:

said serial port waits for at least a predetermined time period after power-on reset for an initialization signal on said pin prior to driving said plurality of signals on said pin.

6. An apparatus comprising:

a first integrated circuit having a first serial port wherein said first serial port has only a first bidirectional pin;

a second integrated circuit having a second serial port wherein said second serial port has only a second bidirectional pin; and a bidirectional line connecting said first bidirectional pin to said second bidirectional pin;

wherein said second integrated circuit generates an acknowledge packet on said second bidirectional pin in response to a command packet from said first integrated circuit on said first bidirectional pin.

7. The apparatus of claim 6 further comprising:

a system bus coupled to said first serial port; and an oscillator; and farther wherein said first integrated circuit further comprises a clock pin coupled to said oscillator and said first integrated circuit generates a buffered clock signal in response to a signal on said clock pin; and said second integrated circuit further comprises a clock pin coupled to said oscillator.

8. The apparatus of claim 7 wherein said first serial port further comprises:

a command generator circuit having a serial port input-output bus coupled to said system bus, and a parallel output bus wherein in response to a signal on said serial input-output bus, said command generator circuit drives a command on said parallel bus.

9. The apparatus of claim 8 wherein said command comprises a byte of information.

10. The apparatus of claim 8 wherein said command includes a plurality of command bits.

11. The apparatus of claim 10 wherein said command includes a plurality of data bits.

12. The apparatus of claim 10 wherein said serial port input-output bus further comprises a plurality of serial port command lines.

13. The apparatus of claim 8 wherein said first serial port further comprises:

a converter circuit connected to said parallel bus, and said converter circuit having a serial data terminal wherein said converter circuit formats said command received on said parallel bus into a packet and serially transmits said packet on said serial data output terminal.

14. The apparatus of claim 13 wherein said packet includes a start bit.

15. The apparatus of claim 13 wherein said packet includes a stop bit.

16. The apparatus of claim 13 wherein said packet includes a parity bit.

17. The apparatus of claim 13 wherein said first serial port further comprises:

a line controller circuit connected to said serial data output terminal of said converter circuit and coupled to said first bidirectional pin wherein said line controller circuit transfers data from said serial data output terminal of said converter circuit to said first bidirectional terminal.

18. A method for serially transferring information on a bidirectional line between a first device and a second device, the method comprising:

(1) in said first device:
waiting for at least a predetermined time period after a power-on reset signal for an initialization signal on said bidirectional line; and (2) in said second device:
transmitting said initialization signal on said bidirectional line in response to said power-on reset signal; and driving a signal on said bidirectional line, subsequent to said initialization signal, only in response to a signal from said first device on said bidirectional line.

19. The method of claim 18 wherein said second device drives an acknowledge signal on said bidirectional line within a predetermined time of receiving said signal from said first device.

20. The method of claim 19 further comprising:

waiting by said first device for completion of said acknowledge signal from said second device before driving another signal on said bidirectional line by said first device.

21. The method of claim 18 wherein each of said devices is an integrated circuit, said method further comprising:

driving a common clock signal to each of said devices.

22. An apparatus comprising:

a first plurality of pins couplable to a first bus;

a circuit connected to said first plurality of pins, wherein said circuit transfers information to and from said first plurality of pins; and a serial port coupled to said circuit, and said serial port having only one pin, said pin being a bidirectional pin for receipt and transmission of signals, wherein:

said serial port serially drives a plurality of signals on said pin in response to receipt of said plurality of signals from said circuit; and said serial port waits for at least a predetermined time period after power-on reset for an initialization signal on said pin prior to driving said plurality of signals on said pin.

23. The apparatus of claim 22 further comprising:

a clock pin;

wherein said circuit includes a plurality of modules, and a first module in said plurality of modules receives a clock signal from said clock pin and supplies a buffered clock signal to the other modules in said plurality of modules.

* * * * *